(12) United States Patent
Baek et al.

(10) Patent No.: US 11,627,515 B2
(45) Date of Patent: *Apr. 11, 2023

(54) METHOD FOR SUPPORTING LAWFUL INTERCEPTION OF REMOTE PROSE UE IN NETWORK

(71) Applicant: Samsung Electronics Co., Ltd., Gyeonggi-do (KR)

(72) Inventors: Youngkyo Baek, Seoul (KR); Sung Hwan Won, Seoul (KR); Sunghoon Kim, Seoul (KR); Songyean Cho, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/173,577

(22) Filed: Feb. 11, 2021

(65) Prior Publication Data
US 2021/0250843 A1 Aug. 12, 2021

Related U.S. Application Data

(63) Continuation of application No. 15/763,386, filed as application No. PCT/KR2016/010783 on Sep. 26, 2016, now Pat. No. 10,924,975.
(Continued)

(51) Int. Cl.
*H04W 40/22* (2009.01)
*H04W 8/20* (2009.01)
(Continued)

(52) U.S. Cl.
CPC ......... *H04W 40/22* (2013.01); *H04L 61/5007* (2022.05); *H04L 63/08* (2013.01);
(Continued)

(58) Field of Classification Search
CPC ......... H04W 40/22; H04W 8/20; H04W 8/24; H04W 12/06; H04W 12/80; H04W 76/10;
(Continued)

(56) References Cited

U.S. PATENT DOCUMENTS 8,750,179 B2  6/2014 Purnadi et al.
8,904,167 B2  12/2014 Escott et al.
(Continued)

FOREIGN PATENT DOCUMENTS

CN  101137204  3/2008
CN  101166359  4/2008
(Continued)

OTHER PUBLICATIONS

3GPP, 3rd Generation Partnership Project; Technical Specification Group Services and System Aspects; Study on Extended Architecture Support for Proximity-based Services.
(Continued)

*Primary Examiner* — Kiet Tang
(74) *Attorney, Agent, or Firm* — The Farrell Law Firm, P.C.

(57) ABSTRACT

The disclosure relates to a communication technique for converging, with an IoT technology, a 5G communication system for supporting a higher data transmission rate than a 4G system, and a system therefor. The disclosure may be applied to intelligent services, such as smart homes, smart buildings, smart cities, smart cars or connected cars, health care, digital education, retail businesses, and security and safety related services, on the basis of 5G communications technologies and IoT-related technologies. A method for operating relay UE in a mobile communication system includes transmitting, to a network node connected to the relay UE, a remote UE report message including remote UE information about a remote UE accessing a network via the
(Continued)

relay UE, wherein the remote UE information includes IP address information allocated to the remote UE; starting a timer upon transmitting the remote UE report message to the network node; receiving, from the network node, a response message in reply to the remote UE report message; and stopping the timer upon receipt of the response message from the network node. the IP address information includes an IP address and port information of the remote UE in case that IPv4 is used as an address type.

13 Claims, 43 Drawing Sheets

Related U.S. Application Data

(60) Provisional application No. 62/232,100, filed on Sep. 24, 2015.

(51) Int. Cl.
| | |
|---|---|
| *H04W 88/04* | (2009.01) |
| *H04L 9/40* | (2022.01) |
| *H04W 12/06* | (2021.01) |
| *H04W 12/80* | (2021.01) |
| *H04L 61/5007* | (2022.01) |
| *H04W 8/24* | (2009.01) |
| *H04W 76/10* | (2018.01) |
| *H04W 8/00* | (2009.01) |
| *H04L 61/4588* | (2022.01) |
| *H04L 101/385* | (2022.01) |
| *H04L 101/654* | (2022.01) |

(52) U.S. Cl.
CPC .............. *H04L 63/306* (2013.01); *H04W 8/20* (2013.01); *H04W 8/24* (2013.01); *H04W 12/06* (2013.01); *H04W 12/80* (2021.01); *H04W 76/10* (2018.02); *H04W 88/04* (2013.01); *H04L 61/4588* (2022.05); *H04L 2101/385* (2022.05); *H04L 2101/654* (2022.05); *H04W 8/005* (2013.01)

(58) Field of Classification Search
CPC ..... H04W 88/04; H04W 8/005; H04W 76/14; H04W 76/27; H04W 76/30; H04W 76/45; H04W 76/50; H04L 61/5007; H04L 63/08; H04L 63/306; H04L 61/4588; H04L 2101/385; H04L 2101/654
See application file for complete search history.

(56) References Cited

U.S. PATENT DOCUMENTS

| | | | |
|---|---|---|---|
| 10,004,016 B2 | 6/2018 | Shi et al. | |
| 10,264,498 B2 | 4/2019 | Watfa et al. | |
| 10,355,965 B1 | 7/2019 | Oroskar et al. | |
| 2005/0024553 A1 | 2/2005 | Fukuta et al. | |
| 2006/0039316 A1* | 2/2006 | Ogushi | H04W 8/26 370/328 |
| 2007/0238468 A1* | 10/2007 | Buckley | H04M 7/0057 455/445 |
| 2012/0028640 A1 | 2/2012 | Guo et al. | |
| 2012/0093061 A1 | 4/2012 | Charbit et al. | |
| 2012/0258740 A1 | 10/2012 | Mildh et al. | |
| 2012/0327947 A1 | 12/2012 | Cai et al. | |
| 2013/0044668 A1 | 2/2013 | Purnadi et al. | |
| 2013/0044708 A1 | 2/2013 | Kim et al. | |
| 2013/0053032 A1 | 2/2013 | Guo | |
| 2013/0083773 A1 | 4/2013 | Watfa et al. | |
| 2013/0203414 A1 | 8/2013 | Zong et al. | |
| 2013/0267229 A1 | 10/2013 | Gopalakrishnan | |
| 2014/0016537 A1 | 1/2014 | Khobare et al. | |
| 2014/0321428 A1 | 10/2014 | Godin et al. | |
| 2015/0029866 A1 | 1/2015 | Liao et al. | |
| 2015/0282017 A1 | 10/2015 | Wang et al. | |
| 2015/0295826 A1 | 10/2015 | Sitharaman | |
| 2015/0326302 A1* | 11/2015 | Stojanovski | H04W 12/069 370/315 |
| 2016/0050601 A1 | 2/2016 | Jeong et al. | |
| 2016/0066259 A1 | 3/2016 | Guo et al. | |
| 2016/0135143 A1 | 5/2016 | Won et al. | |
| 2016/0197927 A1* | 7/2016 | Ma | H04W 48/04 726/4 |
| 2016/0204847 A1 | 7/2016 | Ryu | |
| 2016/0381491 A1 | 12/2016 | Watfa et al. | |
| 2017/0006524 A1 | 1/2017 | Jung et al. | |
| 2017/0013501 A1 | 1/2017 | Kim et al. | |
| 2017/0078867 A1 | 3/2017 | Ianev et al. | |
| 2017/0099623 A1 | 4/2017 | Shi et al. | |
| 2017/0111280 A1 | 4/2017 | Zhang et al. | |
| 2017/0251396 A1 | 8/2017 | Centonza et al. | |
| 2017/0303186 A1 | 10/2017 | Centonza et al. | |
| 2018/0027479 A1 | 1/2018 | Ahmad et al. | |
| 2018/0234942 A1 | 8/2018 | Kim | |
| 2018/0242214 A1 | 8/2018 | Watfa et al. | |
| 2018/0248919 A1 | 8/2018 | Gustafsson | |
| 2018/0279174 A1 | 9/2018 | Yannick et al. | |

FOREIGN PATENT DOCUMENTS

| | | |
|---|---|---|
| CN | 101355793 | 1/2009 |
| CN | 102754361 | 10/2012 |
| CN | 102811497 | 12/2012 |
| CN | 102821381 | 12/2012 |
| EP | 3 145 244 | 1/2020 |
| JP | 2014-522207 | 8/2014 |
| JP | 2015-504623 | 2/2015 |
| KR | 1020150113777 | 10/2015 |
| KR | 1020160093569 | 8/2016 |
| WO | WO 2010/026287 | 3/2010 |
| WO | WO 2011/060837 | 5/2011 |
| WO | WO 2015/026111 | 2/2015 |
| WO | WO 2015/119427 | 8/2015 |
| WO | WO 2016/072814 | 5/2016 |

OTHER PUBLICATIONS (Release 13), 3GPP TR 23.713 V1.5.0, Jul. 2015, 81 pages.
LG Electronics, "Clarification on TMGI Advertisement Procedure and Resolving the Related FFS", S2-151612, SA WG2 Meeting #109, May 25-29, 2015, 5 pages.
Qualcomm Incorporated, Alcatel Lucent, "TMGI and ECGI Advertisement", S2-151794, SA WG2 Meeting #109, May 25-29, 2015, 8 pages.
International Search Report dated Nov. 15, 2016 issued in counterpart application No. PCT/KR2016/008685, 3 pages.
Office Action dated May 18, 2017 issued in counterpart U.S. Appl. No. 15/058,794, 23 pages.
Office Action dated Jun. 1, 2017 issued in counterpart U.S. Appl. No. 15/231,663, 8 pages.
Notice of Allowance dated Nov. 22, 2017 issued in counterpart U.S. Appl. No. 15/058,794, 13 pages.
European Search Report dated Jan. 31, 2018 issued in counterpart application No. 16759143.7-1214, 10 pages.
Chinese Office Action dated Aug. 3, 2020 issued in counterpart application No. 201680061602.5, 15 pages.
PCT/ISA/210 Search Report issued on PCT/KR2016/010783 (pp. 6).
PCT/ISA/237 Written Opinion issued on PCT/KR2016/010783 (pp. 6).
3GPP; TSGSSA; Architecture enhancements for dedicated core networks; Stage 2 (Release 13)', 3GPP TR 23.707 V13.0.0, Dec. 17, 2014, pp. 42.
Ericsson, 'Evaluation of Decor solutions', S2-143947, 3GPP TSG-SA WG2 #106, San Francisco, USA, Nov. 11, 2014, pp. 7.
NEC, 'Update to MMEGI/NRI for dedicated networks re-selection solution', S2-144068, 3GPP TSG-SA WG2 #106, San Francisco, USA, Nov. 11, 2014, pp. 5.

(56) References Cited

OTHER PUBLICATIONS

Intel, 'Resolving Editor's Notes for MME triggered re-direction to dedicated MME solution', S2-144156, 3GPP TSG-SA WG2 #106, San Francisco, USA, Nov. 11, 2014, pp. 5.
Chinese Office Action dated Apr. 27, 2020 issued in counterpart application No. 201680025607.2, 20 pages.
Chinese Office Action dated Jan. 26, 2021 issued in counterpart application No. 201680025607.2, 18 pages.
U.S. Office Action dated Feb. 19, 2021 issued in counterpart U.S. Appl. No. 16/895,339, 25 pages.
U.S. Notice of Allowance dated Jul. 14, 2021 issued in counterpart U.S. Appl. No. 16/895,339, 14 pages.
Korean Office Action dated Mar. 28, 2022 issued in counterpart application No. 10-2016-0025244, 7 pages.
CN Notification of Reexamination dated Sep. 29, 2022 issued in counterpart application No. 201680025607.2, 11 pages.
CN Notification of Reexamination dated Jan. 20, 2023 issued in counterpart application No. 201680025607.2, 7 pages.

\* cited by examiner

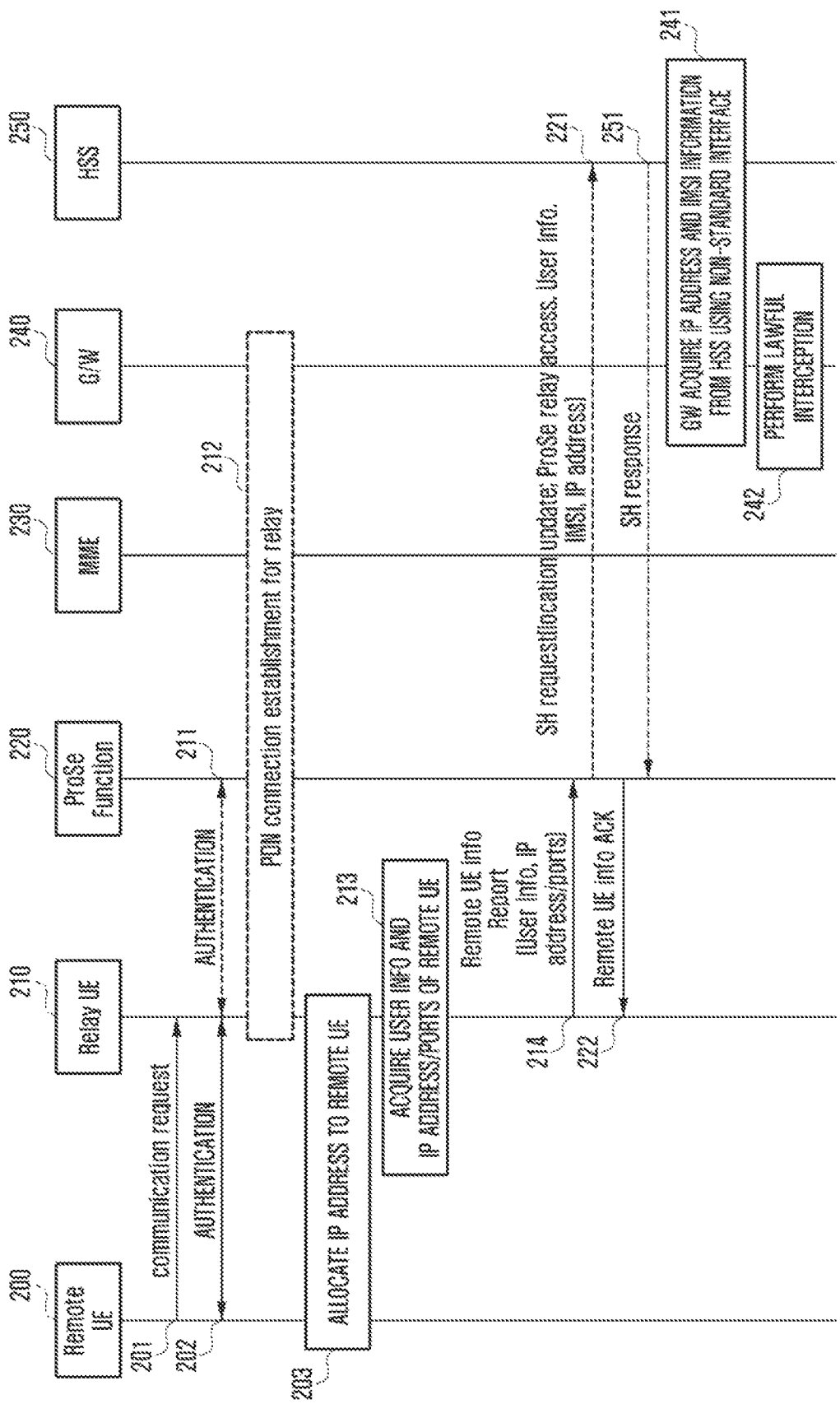

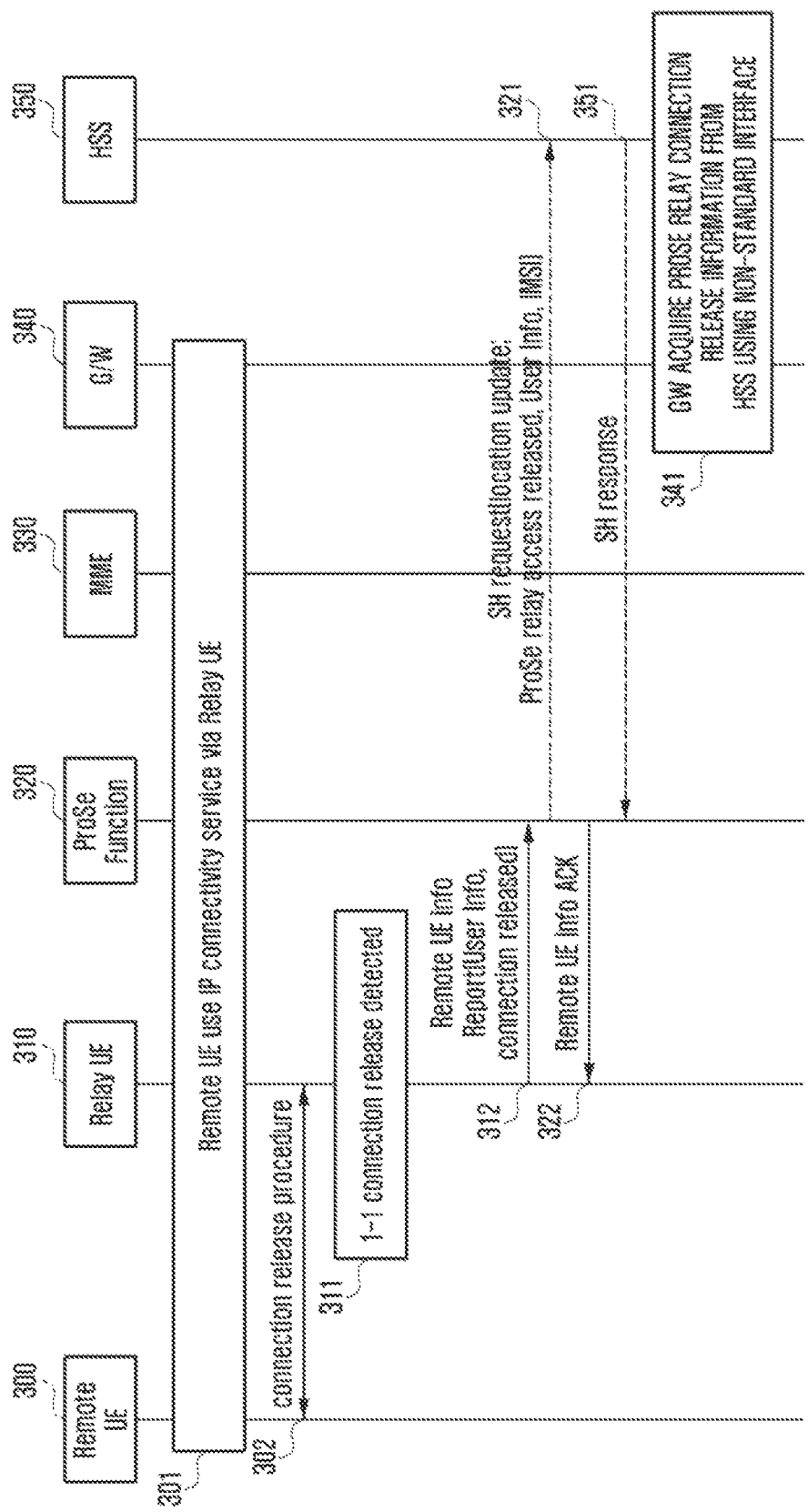

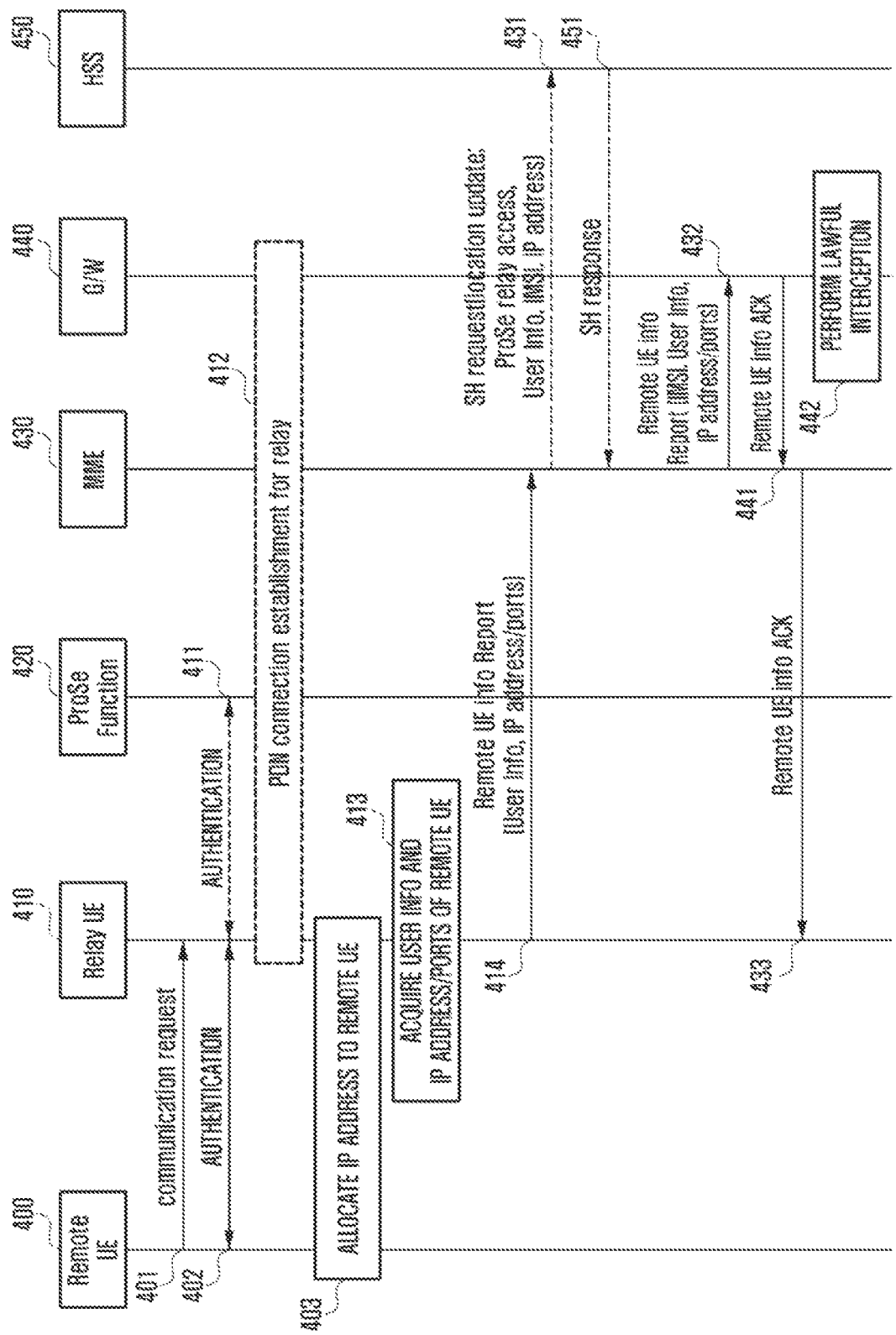

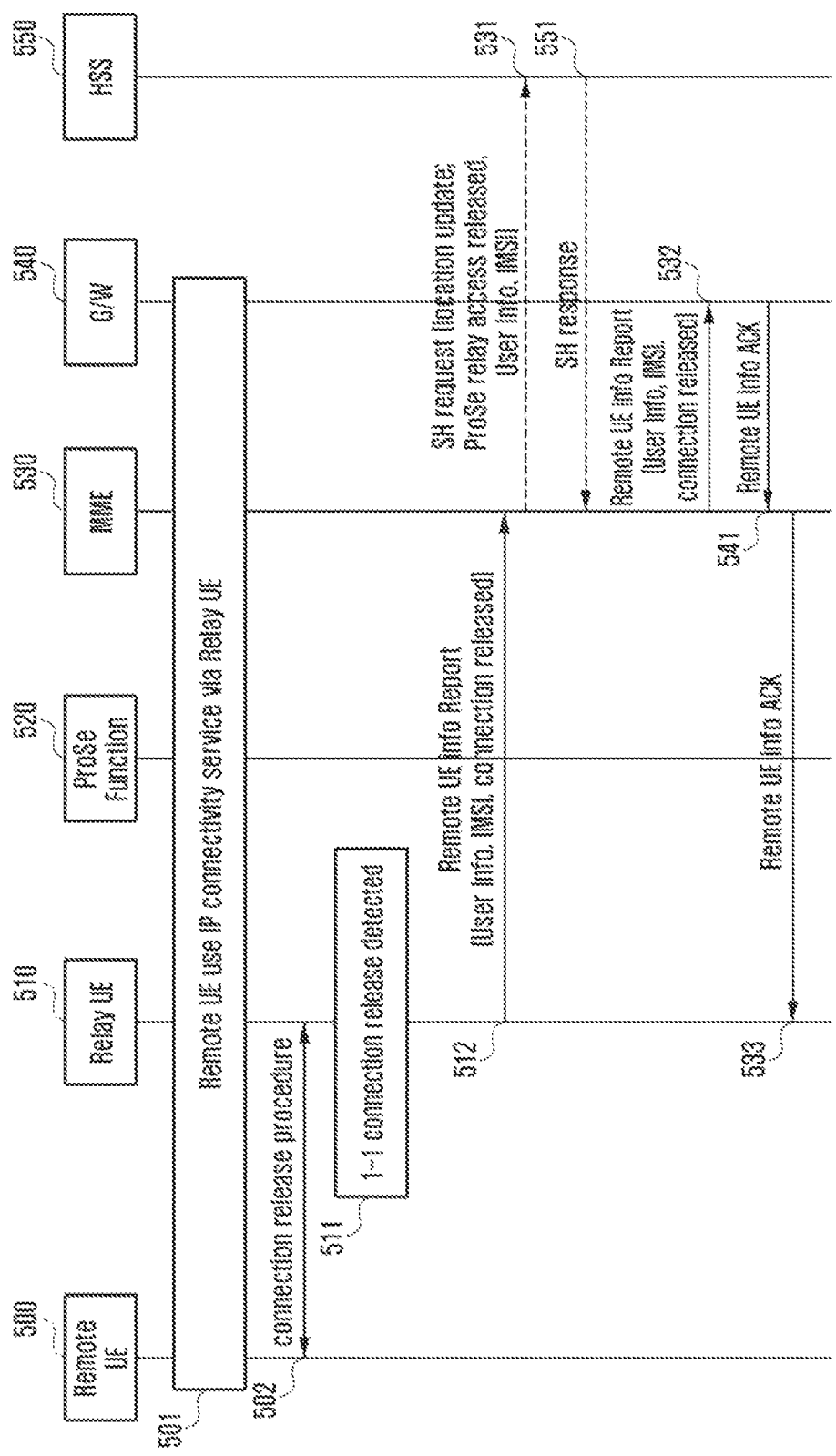

FIG. 40

| Indication (Control Data/ User Data) | NAS Security indication | Acknowledge indication | NAS PDU |
|---|---|---|---|
| 4000 | 4010 | 4020 | 4030 |

FIG. 42

| NAS Security indication | isLastP (True/False) | NAS PDU |
|---|---|---|
| 4200 | 4210 | 4220 |

METHOD FOR SUPPORTING LAWFUL INTERCEPTION OF REMOTE PROSE UE IN NETWORK

CROSS-REFERENCE TO RELATED APPLICATION(S)

This application is a Continuation of U.S. Ser. No. 15/763,386, which was filed in the U.S. Patent and Trademark Office (USPTO) on Mar. 26, 2018, which is a National Phase Entry of PCT International Application No. PCT/KR2016/010783, which was filed on Sep. 26, 2016, and claims priority to U.S. Provisional Patent Application No. 62/232,100, which was filed in the USPTO on Sep. 24, 2015, the entire content of each of which is incorporated herein by reference.

BACKGROUND

1. Field

The present invention relates to a method for supporting a lawful interception on a remote user equipment (UE) accessing a network via a proximity services (ProSe) UE-network relay.

2. Description of Related Art

In order to meet the increasing demand for wireless data traffic since the commercialization of 4th generation (4G) communication systems, the development focus is on the 5$^{th}$ generation (5G) or pre-5G communication system. For this reason, the 5G or pre-5G communication system is called a beyond 4G network communication system or post long-term evolution (LTE) system. Implementation of the 5G communication system in millimeter wave (mmW) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM)(FQAM) and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

In order to meet the increasing demand for wireless data traffic, discussions are underway about communication technologies in various fields. Examples of the communication technologies include device-to-device communication, frequency aggregation system for use of multiple cells, and multiantenna systems for use of massive antenna arrays.

SUMMARY

The present invention aims to provide a method for facilitating lawful interception on a remote UE accessing a network via a ProSe UE-network relay.

Also, the present invention aims to provide a method for transmitting a small size message in a cellular IoT (CIoT) network structure.

Also, the present invention aims to provide a method for managing the quality of group communication.

Also, the present invention aims to provide a method for registering with a mobile communication operator's network and an application server.

Also, the present invention aims to provide an efficient broadcast-related signaling transmission method.

Also, the present invention aims to provide a call connection method for a public safety network.

Also, the present invention aims to provide a method for identifying a signaling and connection mode for a CIoT service.

In accordance with an aspect of the present invention, an operation method of a relay user equipment (UE) in a mobile communication system includes transmitting a remote UE report message including remote UE information about a remote UE accessing a network via the relay UE to a mobility management entity (MME) connected to the relay UE and receiving a response message from the MME in reply to the remote UE report message.

Preferably, the remote UE information comprises Internet protocol (IP) address information allocated to the remote UE and user information associated with the remote UE.

Preferably, the IP address information is an IP address or IPv6 prefix of the remote terminal for a case of using Internet Protocol version 6 (IPv6) and an IP address and port information of the remote terminal for a case of using Internet protocol version 4 (IPv4).

Preferably, the user information includes at least one of International Mobile Subscriber Identity (IMSI), mobile subscriber integrated services digital network number (MSISDN), a session initiation protocol (SIP) uniform resource identifier (URI), and user information for proximity-based service (ProSe).

Preferably, the method further includes starting a timer upon transmitting the remote UE report message to the MME and stopping the timer upon receipt of the response message from the MME.

Preferably, the remote UE report message is a control message for packet data network (PDN) connection in order for the relay UE to use the remote UE as a relay.

In accordance with another aspect of the present invention, an operation method of a mobility management entity (MME) in a mobile communication system includes receiving a remote user equipment (UE) report message including remote UE information about a remote UE accessing a network via a relay UE from the relay UE and transmitting a response message from the relay UE in reply to the remote UE report message.

In accordance with another aspect of the present invention, a relay user equipment (UE) operating in a mobile communication system includes a transceiver configured to transmit and receive signals and a controller configured to control to transmit a remote UE report message including remote UE information about a remote UE accessing a network via the relay UE to a mobility management entity (MME) connected to the relay UE and receive a response message from the MME in reply to the remote UE report message.

In accordance with still another aspect of the present invention, a mobility management entity (MME) operating in a mobile communication system includes a transceiver configured to transmit and receive signals and a controller configured to control to receive a remote user equipment (UE) report message including remote UE information about a remote UE accessing a network via a relay UE from the relay UE and transmit a response message from the relay UE in reply to the remote UE report message.

The method and apparatus of the present invention is advantageous in terms of facilitating lawful interception on a remote UE accessing a network via a ProSe UE-network relay.

Also, the method and apparatus of the present invention is advantageous in terms of facilitating small size message transmission in a CIoT network structure.

Also, the method and apparatus of the present invention is advantageous in terms of facilitating management of group communication quality.

Also, the method and apparatus of the present invention is advantageous in terms of facilitating registration with a mobile communication operator's network and an application server.

Also, the method and apparatus of the present invention is advantageous in terms of facilitating transmission of broadcast-related signaling.

Also, the method and apparatus of the present invention is advantageous in terms of facilitating a call connection in a public safety network.

Also, the method and apparatus of the present invention is advantageous in terms of facilitating identification of a signaling and connection mode for a CIoT service.

BRIEF DESCRIPTION OF DRAWINGS

The above and other aspects, features, and advantages of certain embodiments of the present disclosure will be more apparent from the following description taken in conjunction with the accompanying drawings, in which:

FIG. 2 is a signal flow diagram illustrating a procedure for a relay UE to transmit information about lawful interception on a remote UE according to embodiment 1 of the present invention;

FIG. 3 is a signal flow diagram illustrating a procedure for notifying a network of disconnection with a remote UE according to embodiment 1 of the present invention;

FIG. 4 is a signal flow diagram illustrating a procedure for a relay UE to transmit lawful interception information on a remote UE to a network according to embodiment 1 of the present invention;

FIG. 5A is a signal flow diagram illustrating a procedure for notifying a network of disconnection with a remote UE according to embodiment 1 of the present invention;

FIG. 40 is a diagram illustrating another exemplary NAS message according to embodiment 7-2 of the present invention;

FIG. 42 is a diagram illustrating a method for use of an indication indicating whether the current NAS PDU is the last one of the successively transmitted NAS PDUs.

DETAILED DESCRIPTION

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Embodiment 1

Figure 1:
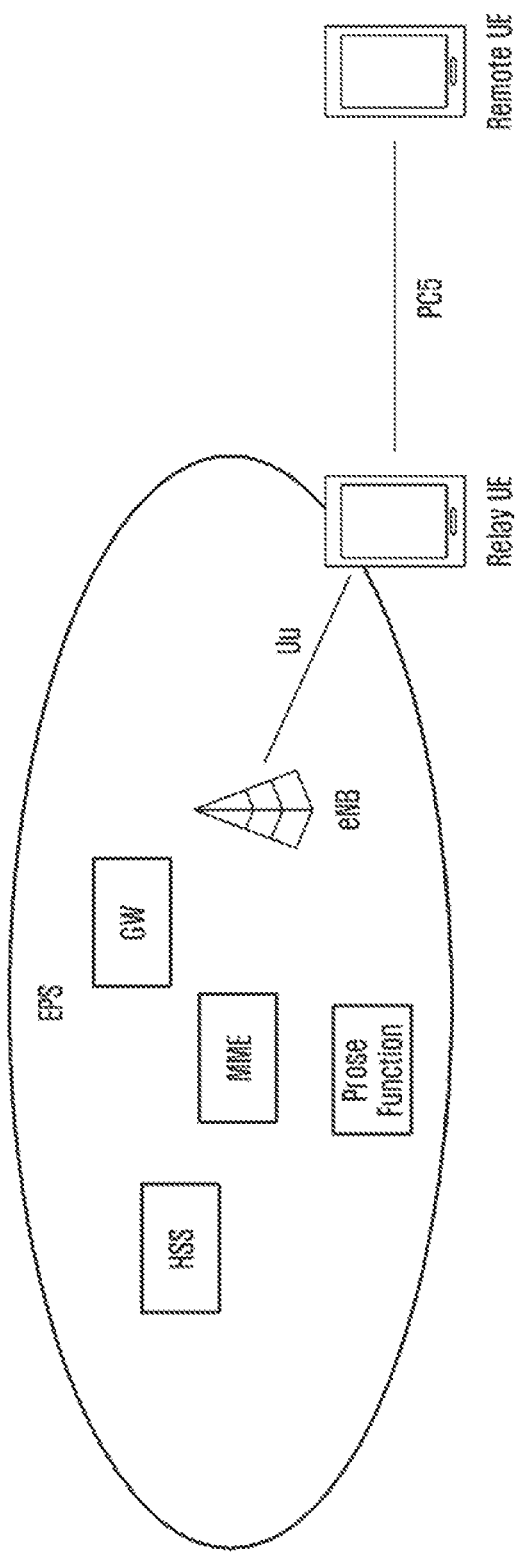
FIG. 1 is a diagram illustrating the ProSe network architecture according to embodiment 1 of the present invention.

In order to provide a D2D proximity service via a ProSe UE-network (ProSe UE-NW) relay, ProSe network architecture may be proposed as shown in FIG. 1.

FIG. 1 is a diagram illustrating the ProSe network architecture according to embodiment 1 of the present invention.

The relay UE (UE-NW relay UE) is located within the coverage of a base station (evolved Node B or eNB) and relays the service provided in the cellular network to a remote UE.

In order to accomplish this, the UE-NW relay UE is registered as a relay with an evolved packet core (EPS) network and prepares for the relay service by receiving information necessary for providing the relay service and establishing a packet data network (PDN) connection to provide the remote UE with an IP service. If the relay service is prepared, the UE-NW relay UE may broadcast an announcement message to advertise its presence as a relay or receive a discovery solicitation message that a remote UE transmits to discover a relay and, if a predetermined condition is fulfilled, transmit a discovery response message such that the remote UE discovers the UE-NW relay UE.

The remote UE selects one of the found UE-NW relay UEs and sets up a connection with the corresponding UE-NW relay UE to receive a service provided through the network.

The present invention is directed to a method of lawful interception on a remote UE connected to an EPC network via a UE-NW relay UE.

FIG. 2 is a signal flow diagram illustrating a procedure for a relay UE to transmit information about the lawful interception on a remote UE according to embodiment 1 of the present invention.

The remote UE 200 transmits a communication request message to connect to the ProSe UE-NW relay UE 210 at step 201. Next, the remote UE and ProSe UE-NW relay UE authenticate each other mutually through steps 202 and 211 and then, if necessary, the ProSe UE-NW relay UE 210 may establish a PDN connection for relay at step 212.

The remote UE 200 is allocated or sets an IP address via the ProSe UE-NW relay UE 210 at step 203. At step 203, the ProSe UE-NW relay UE 210 may acquire the IP address or port information along with the IP address for the remote UE 200.

The ProSe UE-NW relay UE 210 may acquire user information (User Info) of the remote UE 200 through steps 201, 202, and 211. The User Info may include at least one of international mobile subscriber identity (IMSI), mobile subscriber integrated services digital network number (MSISDN), session initiation protocol uniform resource identifier (SIP URI), and User information for ProSe.

The ProSe UE-NW relay UE 210 which has acquired the user information sends, at step 214, the ProSe function 220 a remote UE Info Report message including the information on the remote UE 200, i.e. IP address (or IP address and port information) and User Info of the remote UE 200. The User Info may include at least one of IMSI, MSISDN, SIP URI, and User Info for ProSe. In response to the remote UE Info Report message, the ProSe function 220 may transmit to the ProSe UE-NW relay UE 210 an ACK message at step 222.

At step 221, the ProSe function 220 may transmit to the HSS 250 the information on the connection of the remote UE 200 that has been received as above. The message transmitted at step 221 may include at least one of a message type for location update, a ProSe relay access type indicative of a remote UE attempting a connection via a ProSe UE-NW relay UE, an IP address (or IP address and port information) allocated to the remote UE 200, and an IMSI and user information of the remote UE 200.

The User Info may include at least one of IMSI, MSISDN, SIP URI, and User Info information for ProSe. In reply, the HSS 250 may transmit to the ProSe function a response message at step 251.

Meanwhile, a lawful interception agent acquires the IP address and port information of the remote UE 200 from the HSS 250 or the ProSe function 220 at step 241 and performs lawful interception at step 242.

FIG. 3 is a diagram illustrating a procedure of updating the remote UE-related information in an EPC network when the connection between a remote UE 300 and a relay UE 310 is released in the case where lawful interception is performed using the method of FIG. 2 according to the first embodiment of the present invention.

The remote UE 300 is receiving a service via a relay at step 301. If the connection between the remote UE 300 and the relay UE 31 is released at step 302, the relay UE 310 sends the ProSe function a Remote UE Info Report message to update the information on the remote UE 300 at step 312.

The Remote UE Info Report message may include the user information of the remote UE 300 and a connection release indicator indicative of connection release. The User Info may include at least one of IMSI, MSISDN, SIP URI, and User Info information for ProSe.

If the updated remote UE information is received, the ProSe function 320 sends the HSS 350 the updated information of the remote UE 300 in association with the connection at step 321.

The message transmitted at step 321 may include at least one of the information on the message type for location update, the information on the ProSe relay access released type informing of the release of the remote UE that is connected via the ProSe UE-NW relay UE, and the IMSI information and user information of the remote UE 300.

The user information may include at least one of IMSI, MSISDN, SIP URI, and User Info information for ProSe. In reply, the HSS sends the ProSe function a response message at step 351.

FIG. 4 is a signal diagram illustrating a procedure for a relay UE 410 to transmit lawful interception information on a remote UE 400 to the EPS network according to the first embodiment of the present invention.

The relay UE 410 transmits to the ProSe function 420 the user ID and IP address/port information for supporting lawful interception on the remote UE 400 in the EPC network; this information is relayed to the HSS 450 in order for the GW 440 to perform lawful interception on the remote UE 400.

In the case where the relay UE 410 transmits the user ID and IP address/port information of the remote UE 400 to the GW 440 via the MME 430 to support lawful interception, the information on the remote UE 400 may be conveyed by an NAS message transmitted from the relay UE 410 to the MME 430.

The remote UE 400 transmits a communication request message to the ProSe UE-NW relay UE 410 for connection thereto at step 401. The remote UE 400 and the ProSe UE-NW relay UE 410 complete mutual authentication at steps 402 and 411 and, if necessary, the ProSe UE-NW relay UE 410 may establish a new PDN connection for relay at step 412.

An IP address is allocated or configured to the remote UE 400 via the ProSe UE-NW relay UE 410 at step 403. At step 403, the ProSe UE-NW relay UE 410 may acquire the IP address (or IP address and port information) of the remote UE 400.

The ProSe UE-NW relay UE 410 may acquire User Info of the remote UE 400 through steps 401, 402, and 411. The User Info may include at least one of IMSI, MSISDN, SIP URI, and User Info information for ProSe.

The ProSe UE-NW relay UE 410 which has acquired the above information may transmit, at step 414, the MME 430 a remote UE Info Report message including the remote UE information, i.e. IP address information allocated to the remote UE and User Info of the remote UE.

The IP address information may include an IP address or IPv6 prefix information in case of using IPv6 or an IP address and port information in case of using IPv4.

The User Info may include at least one of IMSI, MSISDN, SIP URI, and User Info information for ProSe. In reply, the MME 430 may transmit an ACK message to the ProSe UE-NW relay UE 410 at step 432.

Meanwhile, the MME 430 may transmit to the HSS 450 the information on the connection of the remote UE at step 431. The message transmitted at step 431 may include at least one of a message type for location update, a ProSe relay access type indicative of the remote UE attempting connection via the ProSe UE-NW relay UE, IP address information allocated to the remote UE, and IMS and User Info of the remote UE 400.

The user information may include at least one of IMSI, MSISDN, SIP URI, and User Info information for ProSe. In reply, the HSS 450 may transmit a response message to the MME 430 at step 451.

The information transmitted by the HSS 450 may be used for location update, UE identification, or UE authentication procedure in interoperation with the HSS 450 and S-CSCF during the use of the IMS service.

Meanwhile, the MME 430 may transmit to the G/W 440 the information on the connection of the remote UE 400 at step 432. The Remote UE Info Report message may include the IP address information allocated to the remote UE, IMSI information of the remote UE, and User Info.

The User Info may include at least one of IMSI, MSISDN, SIP URI, and User Info information for ProSe. In reply, the G/W 440 may transmit a response message to the MME 430 at step 441.

Accordingly, the lawful interception agent performs lawful interception using the IP address and ports information of the remote UE by means of the G/W 440 at step 442.

FIG. 5A a diagram illustrating a procedure of updating a remote UE-related information in an EPC network when a connection between the remote UE 500 and a relay UE 510 is released when the lawful interception is performed using the method of FIG. 4 according to the first embodiment of the present invention.

The remote UE 500 is receiving the service via a relay at step 501. If the connection between the remote UE 500 and the relay UE 510 is released at step 502, the relay UE 510 transmits to the MME, at step 512, a Remote UE Info Report message to update the information on the remote UE 500. The Remote UE Info Report message may include the User Info of the remote UE 500, a connection release indicator indicative of connection release, and IP address information. The User Info may include at least one of IMSI, MSISDN, SIP URI, and User Info information for ProSe.

The IP address information may include an IP address or IPv6 prefix information in case of using IPv6 or an IP address and port information in case of using IPv4.

If the updated remote UE information is received, the MME 530 may transmit the updated information to the HSS 550 at step 531. The message transmitted at step 531 may include at least one of the information on the message type for location update, the information on the ProSe relay access released type informing of the release of the remote UE that is connected via the ProSe UE-NW relay UE, and the IMSI information and user information of the remote UE 500. The user information may include at least one of IMSI, MSISDN, SIP URI, and User Info for ProSe. In reply, the HSS 550 may transmit a response message to the MME 530 at step 551.

Upon receipt of the updated remote UE information, the MME 530 may transmit to the G/W 540, at step 532, the updated information on the connection of the remote UE. The Remote UE Info Report message transmitted at step 532 may include the ProSe relay access released type informing of the release of the remote UE 500 that is connected via the ProSe UE-NW relay UE and IMSI and User Info of the remote UE 500.

The User Info may include at least one of IMSI, MSISDN, SIP URI, and User Info information for ProSe. In reply, the G/W 540 may transmit a response message to the MME 530 at step 541.

In the embodiments of FIGS. 4 and 5A, the steps for the relay UE to transmit the remote UE Info Report to the MME, i.e., steps 414/433 and 512/533, may be implemented by using a separate NAS message as exemplified above.

According to an alternative embodiment, it may be possible to transmit the remote UE Info Report using the legacy ESM STATUS message without ACK as follows.

Figure 5B:
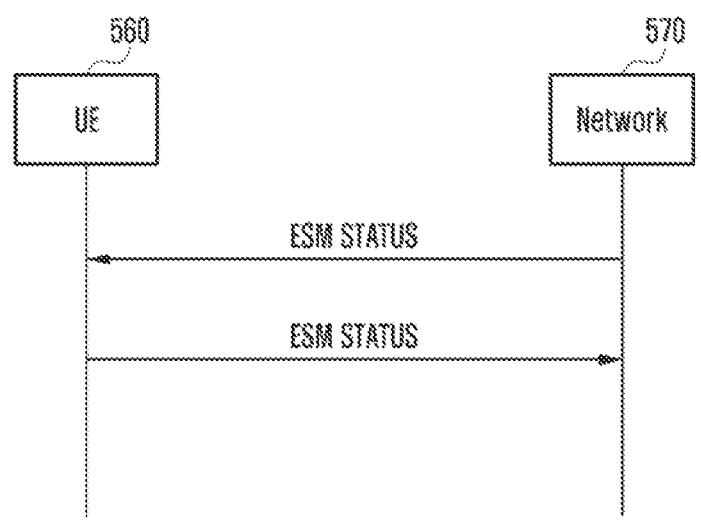
FIG. 5B is a signal flow diagram illustrating a procedure of communicating an ESM status message between a UE and a network according to embodiment 1 of the present invention.

FIG. 5B is a diagram illustrating a procedure of communicating an ESM status message between a UE and a network according to the first embodiment of the present invention.

The ESM status message is transmitted to report certain error conditions detected in receiving ESM protocol data at an arbitrary time, to perform ProSe UE-NW relay, or share IP connection information of the remote UE. The ESM status message may be transmitted by an MME or a UE.

If an ESM entity of the UE receives the ESM status message, the UE may take an action determined by an ESM cause value in the ESM status message.

43(Invalid EPS bearer identity);

The UE stops the ESM procedure associated with the received EPS bearer identifier, stops a related timer, and deactivates the corresponding EPS bearer context (without peer-to-peer signaling between UE and MME)

81(Invalid PTI value);

The UE stops the ESM procedure associated with the received PTI value and stops a related timer.

97(Message type non-existent or not implemented);

The UE stops the ESM procedure associated with the related PTI or EPS bearer identifier and stops a related timer.

On receipt of an ESM STATUS message with any other ESM cause value, no state transition and no specific action shall be taken as seen from the radio interface, i.e. local actions are possible.

If the ESM status message is received along with any other ESM cause value, no state transition and no specific action is taken as seen from the radio interface (local actions are possible).

If an ESM entity of the MME receives the ESM status message, the MME takes any other action according to the received ESM cause value.

43(Invalid EPS bearer identity);

The MME stops the ESM procedure associated with the received EPS bearer identifier, stops a related timer, and deactivates the corresponding EPS bearer context (without peer-to-peer signaling between MME and UE).

81(Invalid PTI value);

The MME stops the ESM procedure associated with the received PTI value and stops a related timer.

97(Message type non-existent or not implemented);

The MME stops the ESM procedure associated with the PTI or EPS bearer identifier and stops a related timer.

If the ESM status message is received along with any other ESM cause value, the local actions to be taken by the MME may be changed depending on implementation.

Hereinafter, a description is made of a timer related to the ESM status message for a remote UE report.

The ESM status message may be used by the relay UE (ProSe UE-NW relay UE) for transmitting IP connection information of the remote UE to the network.

The relay UE starts a timer Txxxx when establishing or releasing a PC5 direct link with the remote UE and transmits a remote UE report to the network using the ESM status message before expiry of the timer Txxxx.

In this case, the ESM cause is set to #128 (Remote UE report transaction). The relay UE may transmit the remote UE report of multiple UEs in the ESM status message.

If the relay UE fails in transmitting the remote UE report to the network using the ESM message before the expiry of the timer Txxxx, it may reset and restart the timer Txxxx and retransmit the EM status message. The retransmission may be repeated 4 times or more depending on UE implementation.

If the MME receives the ESM status message for a remote UE report, a remote UE information list associated with the relay UE is updated.

When the relay UE establishes or releases a PC5 direct link with a remote UE, it starts the timer Txxxx; transmits the remote UE report to the network using the ESM status message before expiry of the timer Txxxx; and, if a timer Tyyy is running, resets the timer Tyyy.

In this case, the ESM cause is set to #128(Remote UE report transaction). The relay UE may transmit the ESM status message including the remote UE reports of multiple UEs.

If the relay UE fails in transmitting the remote UE report to the network using the ESM message before the expiry of the timer Txxxx, it may reset and restart the timer Txxxx and retransmit the EM status message. The retransmission may be repeated 4 times or more depending on UE implementation.

If the MME receives the ESM status message for a remote UE report, a timer Tyyy is started, a remote UE information list associated with the relay UE is updated, and, in reply, the MME transmits an ESM status message without any remote UE report IE including the ESM cause set to 128 (Remote UE report transaction) as acknowledgement before the expiry of the time Tyyy.

If the relay UE receives the acknowledgement, it stops running of the timer Tyyy. However, if the relay UE fails in receiving the acknowledgement before the expiry of the timer Tyyy, it resets/restarts the timer Tyyy and retransmits the ESM status message. The retransmission may be repeated 4 times, the UE may stop the procedure upon the fifth expiry of the timer.

Embodiment 2

Figure 6:
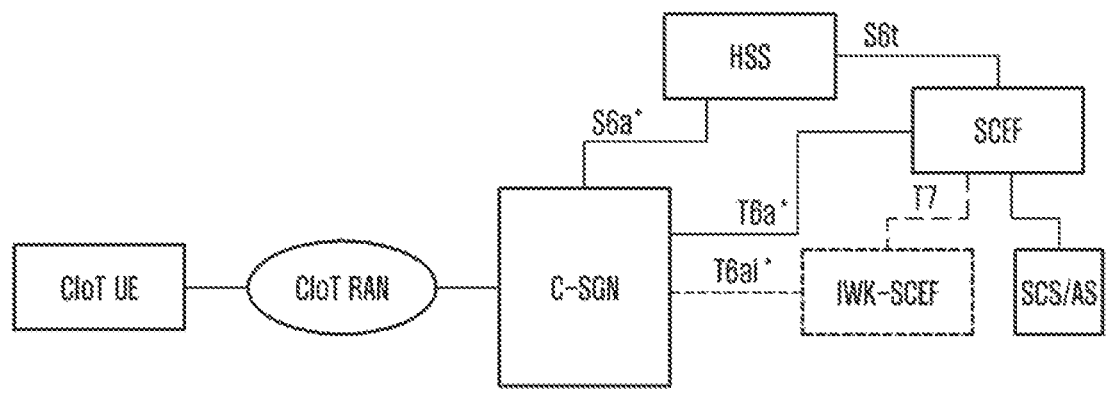
FIG. 6 is a diagram illustrating CIoT network architecture according to embodiment 2 of the present invention.

FIG. 6 is a diagram illustrating CIoT network architecture according to the second embodiment of the present invention.

In reference to FIG. 6, a CIoT serving gateway node (C-SGN) is a network entity, in particular a light-weighted core network entity for CIoT, including an MME, an S-GW, and a P-GW.

Figure 7:
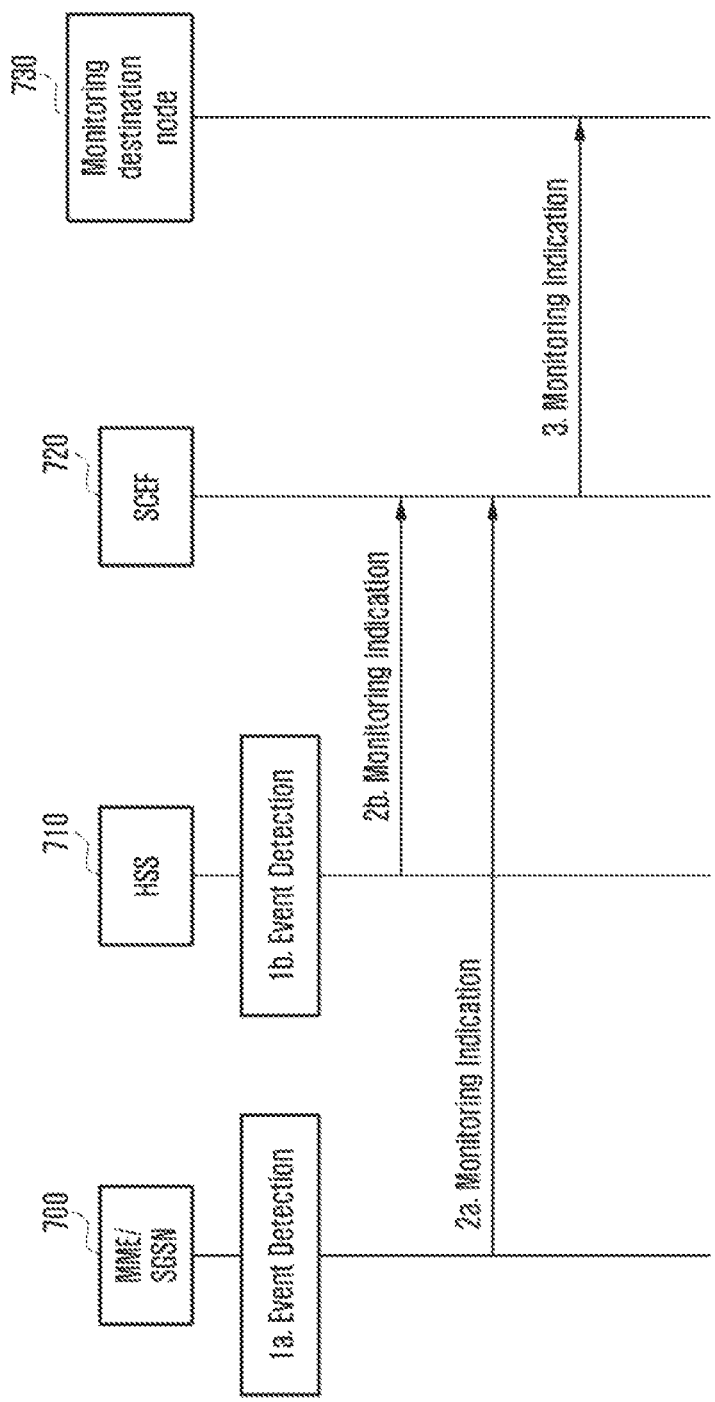
FIG. 7 is a diagram illustrating a procedure for transmitting uplink non-IP data generated by a UE via an MME and SCEF.

In the network architecture, the T6a interface is an interface for exchanging small size messages between an MME and an SCEF. FIG. 7 is a diagram illustrating a procedure for transmitting uplink non-IP data generated by the UE via the MME and SCEF. Here, the term "non-IP data" denotes the data in all data protocol formats with the exception of the IP format.

1. The MME/SGSN/C-SGN 700 receives data from the UE via the RAN. The data may be received along with an indicator indicating whether the data is conveyed within IP packets. The MME/SGSN/C-SGN 700 may check the data packet in order to transmit IP packets to the P-GW or the PDN directly and non-IP packets via the SCEF.

In roaming scenarios, the MME 700 transmits data to the SCEF 720 of the HPLMN via the IWK-SCEF. It may be possible to set Monitoring Event to small data transmission (SDT) to indicate the message for data transmission.

2a. The MME/SGSN 700 may transmit to the SCEF 720 a message including non-IP data. This message includes an SCEF reference ID for identifying the connection between the SCEF 720 and the MME.

3. The SCEF 720 checks the SCEF Reference ID of the received message to acquire related SCS/AS Reference ID. The SCS/AS Reference ID is an identifier for use between an application server (SCS/AS) and the SCEF, and the SCEF and the application server (SCS/AS) identify each other using this ID.

The message received by the SCEF 720 may include a Monitoring Destination Address, which is an address of the application server (SCS/AS). If the SCS/AS Reference ID is not included, it may be possible to determine the destination of the received message using the address of the SCS/AS. The SCEF transmits the non-IP data received at step 2 to the destination determined as above. Here, it may be possible to include the SCS/AS Reference ID or any other identifier (External ID or MSISDN) for the SCS/AS to identify the UE.

Figure 8:
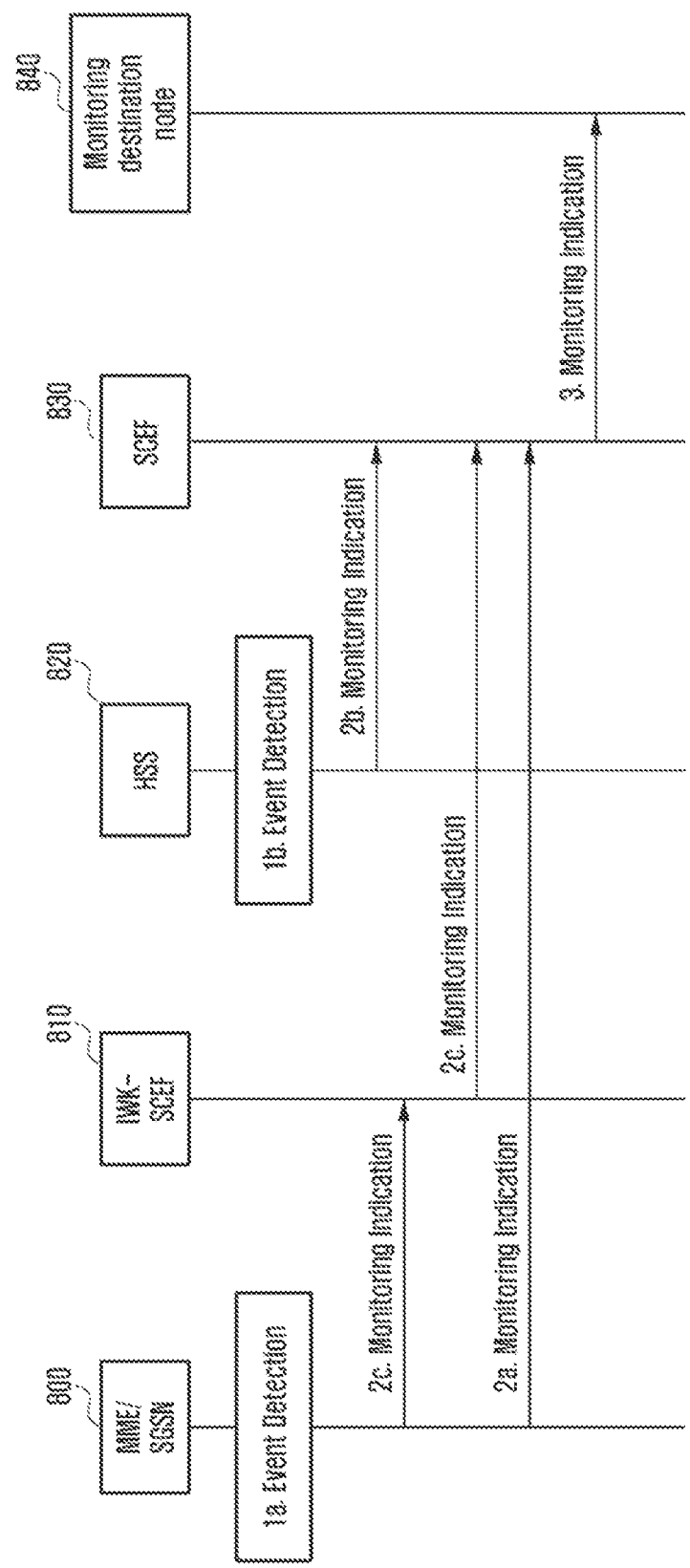
FIG. 8 is a diagram illustrating a procedure of transmitting non-IP data for a UE in roaming according to the second embodiment of the present invention.

FIG. 8 is a diagram illustrating a procedure of transmitting non-IP data for a UE in roaming according to the second embodiment of the present invention. The MME and IWK-SCEF are network entities located in the roaming network, and the SCEF is located in the home network.

1. The MME/SGSN/C-SGN 800 receives data from the UE via a RAN. The data may be received along with an indicator indicating whether the data is conveyed within IP packets. The MME/SGSN/C-SGN 800 may check the data packet in order to transmit IP packets to the P-GW or the PDN directly and non-IP packets via the IWK-SCEF 810. It may be possible to set Monitoring Event to small data transmission (SDT) to indicate the message for data transmission.

2a. If the MME/SGSN 800 is configured to not use the IWK-SCEF 810, it may transmit the message to the SCEF 830 of the home network directly. In this case, the MME/SGSN may generate billing information in addition.

2c. If the MME/SGSN is configured to transmit a message to the IWK-SCEF 810 for the UE in roaming, it may transmit the message conveying the non-IP data received from the UE to the IWK-SCEF. This message may include an SCEF Reference ID for use in identifying the connection between the MME/SGSN and IWK-SCEF and between the MME/SGSN and the SCEF of the home network for the UE.

The IWK-SCEF 810 transmits the received message to the SCEF 830. This message includes the non-IP data transmitted by the UE and the SCEF Reference ID for identifying the connection between the SCEF 830 and the UE.

3. The SCEF 830 may check the SCEF reference ID of the received message to acquire a related SCS/AS Reference ID. The SCS/AS Reference ID is an identifier for use between an application server (SCS/AS) and the SCEF, and the SCEF and the application server (SCS/AS) identify each other using this ID. The message received by the SCEF may include a Monitoring Destination Address, which is an address of the application server (SCS/AS). If the SCS/AS Reference ID is not included, it may be possible to determine the destination of the received message using the address of the SCS/AS. The SCEF transmits the non-IP data received at step 2 to the destination determined as above. Here, it may be possible to include the SCS/AS Reference ID or any other identifier (External ID or MSISDN) for the SCS/AS to identify the UE.

<MT Small Data Transmission>

1. The SCS/AS transmits MT small data to the SCEF. The small data may be transmitted along with the SCS/AS Reference ID and/or SCS/AS Identifier.

2. In the case of using the IWK-SCEF, the SCEF transmits the MT small data to the IWK-SCEF. The ID of the IWK-SCEF is obtained as follows: It is possible to obtain an SCEF Reference ID associated with the SCS/AS Reference ID received at step 1. Then, it is possible to obtain an IWK-SCEF ID associated with the SCEF Reference ID.

The MT small data may be transmitted along with the SCEF Reference ID and/or the SCEF ID. The IWK-SCEF transmits the MT small data to the MME/SGSN/C-SGN. Here, the routing information of the MME/SGSN/C-SGN is obtained as follows: It is possible to obtain the Routing Information associated with the SCEF Reference ID received at this step. The MT small data may be transmitted along with the IMSI, SCEF Reference ID, SCEF ID, and/or IWK-SCEF ID. The SCEF ID may be an address or name of the SCEF.

In the case of not using the IWK-SCEF, the SCEF transmits the MT small data to the MME/SGSN/C-SGN. Here, the Routing Information of the MME/SGSN/C-SGN is obtained as follows: It is possible to obtain the Routing Information associated with the SCEF Reference ID received at this step. The MT small data may be transmitted along with the IMSI for identifying the UE, the SCEF Reference ID for identifying the connection between the UE and the SCEF, and/or the SCEF ID.

3. The MME/SGSN/C-SGN that has received the MT small data may transmit the MT small data to the UE identified by the IMSI.

The MME/SGSN/C-SGN may not serve the corresponding UE. In this case, the MME/SGSN/C-SGN may notify the SCEF, directly or via the IWK-SCEF, that it cannot transmit the MT small data. At this time, the SCEF may inquire to the HSS about the MME/SGSN/C-SGN routing information for the corresponding UE. When making the inquiry, the SCEF may user an external ID or IMSI as the UE ID. The HSS transmits the Routing information to the SCEF. At this time, it is not mandatory to transmit the IMSI information. Afterward, step 2 is repeated. One thing different is that a newly received Routing Information is used and, in the case of using the IWK-SCEF, the SCEF transmits to the IWK-SCEF the Routing information along with the MT small data.

<Configuration and Deletion of Monitoring Event: SDT>

Although the description is directed to the case where there is an IWK-SCEF, it may be possible to cover the case where there is no IWK-SCEF by omitting steps 7, 8, and 9 and combining steps 6 and 10.

Figure 9:
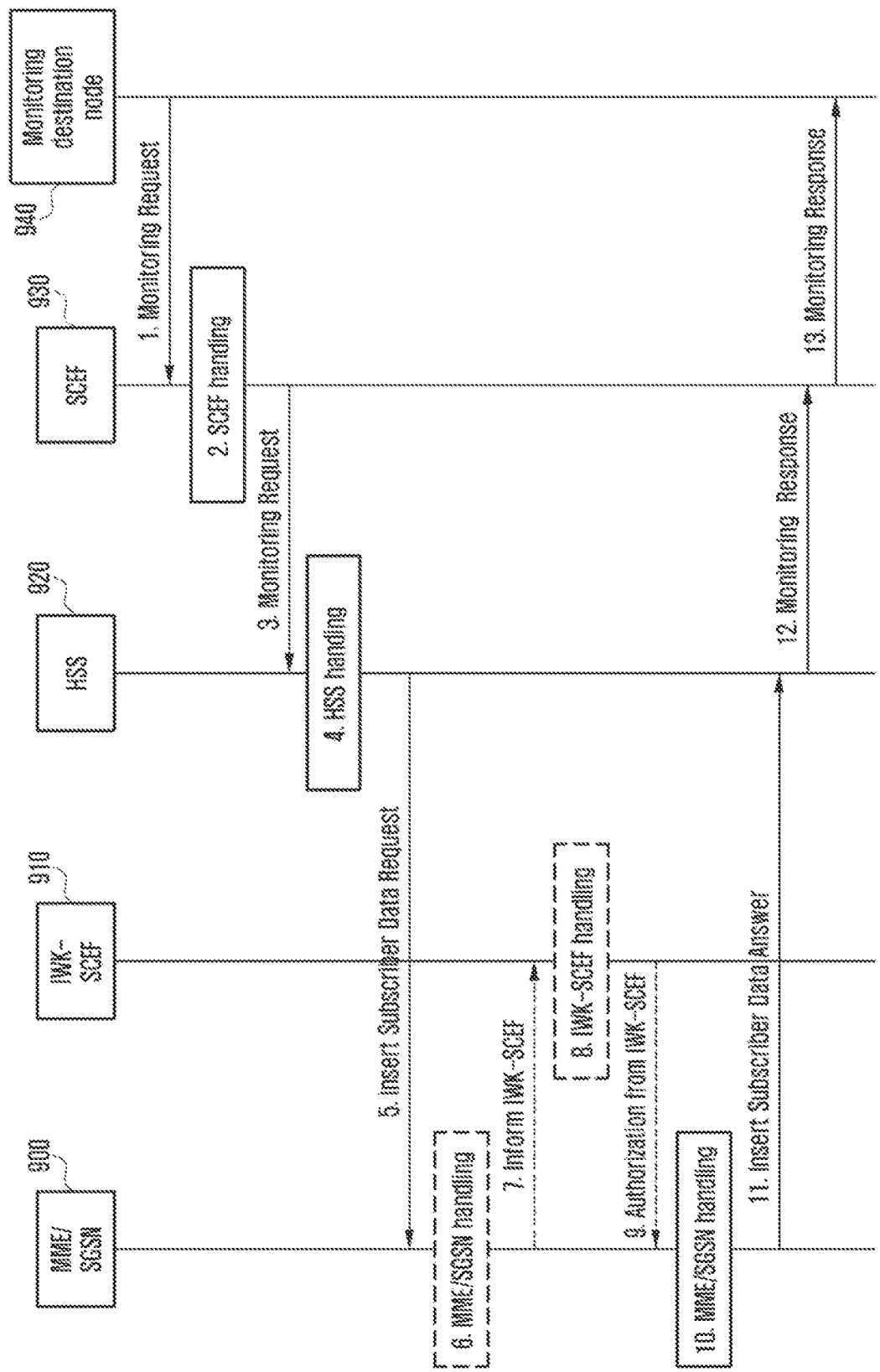
FIG. 9 is a diagram illustrating a method for configuring a small data transmission (SDT) or releasing the SDT configuration.

FIG. 9 is a diagram illustrating a method for configuring a small data transmission (SDT) or releasing the SDT configuration.

1. The SCS/AS 940 may transmits a request for SDT to the SCEF. The request message may include an external ID or MSISDN, an SCS/AS ID for identifying the SCS/AS, an SCS/AS Reference ID for identifying the connection between the SCS/AS 940 and the SCEF 930 for the UE, and a parameter indicative of the SDT configuration.

The External ID is an identifier mapped to the IMSI in the HSS, and the SCEF 930 may recognize which IMSI corresponds to the External ID through signaling with the HSS 920. The parameter indicative of the SDT may include Traffic Category (see the table below), uplink data size, downlink data size, maximum uplink data size transmittable at a time, maximum downlink data size transmittable at a time, and message exchange frequency.

The MME/SGSN 900, C-SGN, SCEF 930, or IWK-SCEF 910 may control uplink/downlink data transmission according to the Traffic Category. For example, if the Traffic Category is set to MAR periodic report, the uplink data cannot have a size equal to or greater than 200 bytes. Alternatively, if the Traffic Category is set to MAR periodic report, the uplink data arriving at an interval shorter than 30 minutes is not transmitted.

The uplink data transmission control may be performed by the MME/SGSN/C-SGN 900, and the downlink data transmission control may be performed by the SCEF 930 or the IWK-SCEF 910.

TABLE 4.3-1

| | Traffic Models for CIoT | | | |
|---|---|---|---|---|
| Category | Application example | UL Data Size | DL Data Size | Frequency |
| Mobile Autonomous Reporting [MAR] exception reports | smoke alarm detectors, power failure notifications from smart meters, tamper notifications etc. | 20 bytes | 0 ACK payload size is assumed to be 0 bytes | Every few months; Every year |
| Mobile Autonomous Reporting (MAR) periodic reports | smart utility [gas/water/electric] metering reports, smart agriculture, smart environment etc. | 20 bytes with a cut off of 200 bytes i.e. payloads higher than 200 bytes are assumed to be 200 bytes | 50% of UL data size ACK payload size is assumed to be 0 bytes | 1 day [40%], 2 hours [40%], 1 hour [15%], and 30 minutes [5%] |
| Network Command | Switch on/off, device Switch on/off, device report, request for meter reading | 0-20 bytes 50% of cases require UL response. | 20 bytes | 1 day [40%], 2 hours [40%], 1 hour [15%], and 30 minutes [5%] |
| Software update/reconfiguration model | Software patches/updates | 200 bytes with a cut off of 2000 bytes i.e. payload higher than 2000 bytes are assumed to be 2000 bytes. | 200 bytes with a cut off of 2000 bytes i.e. payload higher than 2000 bytes are assumed to be 2000 bytes. | 180 days |

2. The SCEF 930 may store the SCS/AS Reference ID, UE ID, and parameter for SDT that have been received at step 1. The SCEF 930 may assign the SCEF Reference ID in response to the request. According to the policy of the operator, if the SCS/AS 940 is not allowed to perform SDT, if the request message is in a wrong format, or if the transmission amount exceeds the amount allocated for SDT request of SCS/AS 940, the SCEF 930 transmits an error message to the SCS/AS 940 along with an appropriate cause value. The SCEF 930 may check the parameters for SDT. If at least one of the parameters is not compliant with the policy of the operator, the request is rejected.

3. The SCEF 930 may transmit a request for SDT to the HSS 920 based on the information received at the previous step. The HSS may configure the parameters for SDT to the MME/SGSN/C-SGN according to the parameters included in the request message.

4. The HSS 920 may inspect the request to determine whether the ID (External ID or MSISDN) of the corresponding UE is included and the included parameters are acceptable by the mobile communication operator. The HSS 920 may check an ID for billing to accept the request. If the request is rejected, a rejection message with a cause is transmitted to the SCEF 930.

5. The HSS 920 transmits a message for configuring SDT to the MME/SGSN/C-SGN 900. This message includes parameters for configuring SDT, SCEF ID, SCEF Reference ID, ID for billing, and UE ID.

6. The MME/SGSN/C-SGN 900 stores the parameters received at step 5. Afterward, it starts data transmission for the UE. If the SDT-related setting values for configuration that are received from the HSS 920 are not appropriate for the policy of the mobile communication operator, the MME/SGSN/C-SGN 900 may transmit a rejection message in response to the message received at step 5.

7. For the UE in roaming, the MME/SGSN/C-SGN 900 may transmit SDT-related configuration parameters to the IWK-SCEF 910. This message may include the SCEF ID, SCEF Reference ID, ID for billing, parameters for SDT, IMSI as a UE identifier, and Routing information for the MME/SGSN/C-SGN.

The IMSI and MME/SGSN/C-SGN Routing Information may be transmitted only in the case of using the IWK-SCEF 910 and/or of SDT (or there is any task for information transmission via any other SCS/AS and/or SCEF). The IWK-SCEF 910 may perform downlink data transmission using the IMSI and MME/SGSN/C-SGN Routing Information. The MME/SGSN/C-SGN may transmit the IMSI(s) received at step 5. The MME/SGSN/C-SGN Routing Information is the information on a core network entity serving the UE identified by each IMSI. The IWK-SCEF maps the IMSI, Routing Information, and SCEF Reference ID and stores the mapping.

8. The IWK-SCEF 910 may authorize the SDT request as the SCEF 930 does at step 6. If it fails to authorize the SDT request, the IWK-SCEF 910 transmits to the MME/SGSN/C-SGN 900 a rejection message with an appropriate cause value.

If it succeeds in authorizing the SDT request, the IWK-SCEF 910 stores the received parameters and transmits an ACK to the MME/SGSN/C-SGN 900 to notify that the SDT is configured.

9. If it succeeds in authorizing the SDT request, the IWK-SCEF 910 stores the received parameters and transmits an ACK to the MME/SGSN/C-SGN 900 to notify that the SDT is configured.

10. The MME/SGSN/C-SGN 900 may verify the request received form the IWK-SCEF 910. It checks whether the SDT has applied for roaming and whether the service is available in the Home PLMN of the UE. If not allowed, the MME/SGSN/C-SGN 900 transmits an error message to the IWK-SCEF 910. In the case that the UE is not in roaming, the MME/SGSN/C-SGN 900 may check whether the SDT is available via the SCEF 930 after steps 5 and 6. If the SDT is not allowed for the corresponding UE, the MME/SGSN/C-SGN 900 may transmit to the SCEF 930 a rejection message indicating that SDT is not allowed.

11. If the SDT configuration to the UE is successful, the MME/SGSN/C-SGN 900 may transmit to the HSS 920 an ACK to notify that the SDT configuration has been performed successfully. This message may be transmitted in response to the SDT request transmitted by the HSS 920 or the SCEF 930. This message is not limited to the name of SDT and means a request message for transmitting non-IP data.

12. If the HSS 920 receives the message notifying that the SDT configuration was performed successfully from the MME/SGSN/C-SGN 900, it notifies the SCEF 930 that the SDT configuration was performed successfully. This message may include the SCEF Reference ID for identifying the SCEF connection of the UE, IMSI of a UE identifier, routing information for transmitting the message to the MME/SGSN/C-SGN, and IWK-SCEF ID for the UE in roaming. The IMSI and MME/SGSN/C-SGN Routing Information may be transmitted only in the case of using the IWK-SCEF and/or of SDT (or there is any task for information transmission via any other SCS/AS and/or SCEF).

The IWK-SCEF 910 may perform downlink data transmission using the IMSI and MME/SGSN/C-SGN Routing Information. The MME/SGSN/C-SGN 900 may transmit the IMSI(s) received at step 5. The MME/SGSN/C-SGN Routing Information is the information on a core network entity serving the UE identified by each IMSI. The IWK-SCEF maps the IMSI, Routing Information, and SCEF Reference ID and stores the mapping.

13. After checking that the SDT configuration to the UE is successful, the SCEF 930 may notify the SCS/AS 940 of the completion of the SDT configuration. This message may include the SCS/AS Reference ID and a cause value indicating that the SDT was configured successfully.

<SDT: Small Data Transmission Procedures>

Figure 10:
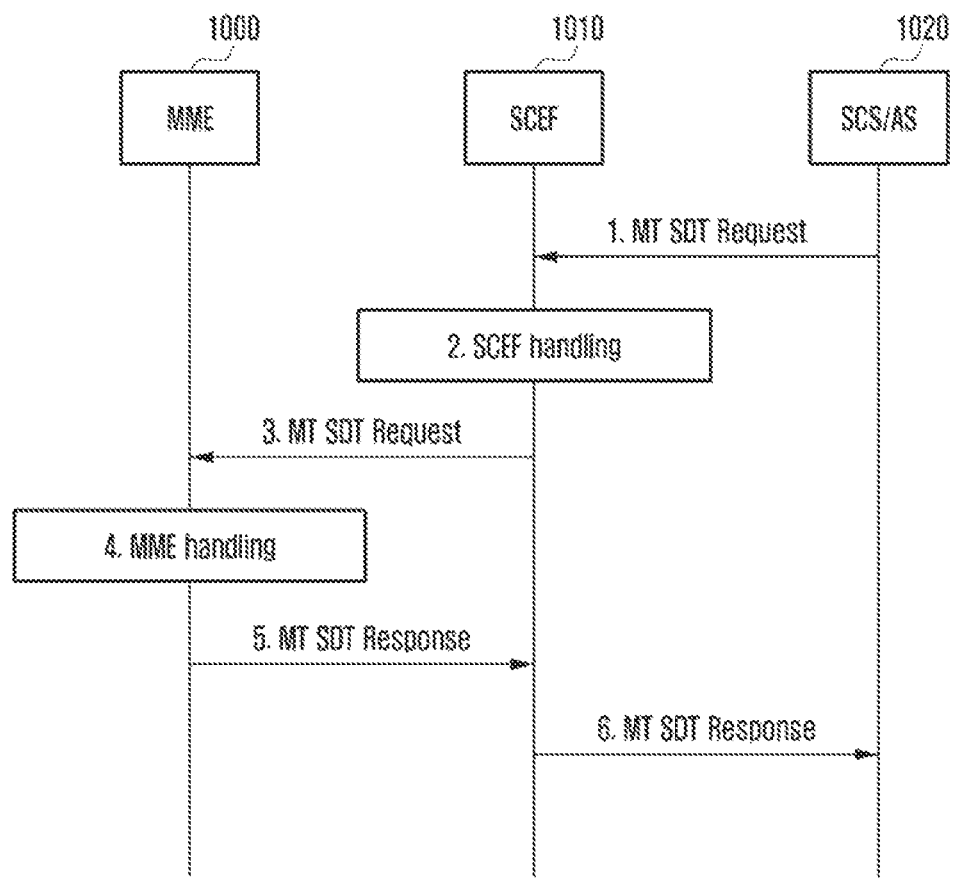
FIG. 10 is a diagram illustrating a procedure of transmitting non-IP data from a server to a UE (mobile terminated small data transmission procedure)

FIG. 10 is a diagram illustrating a procedure of transmitting non-IP data from a server to a UE (mobile terminated small data transmission procedure).

After completing SDT configuration to the UE, the SCS/AS 1020 may transmit non-IP data to the UE. The SCS/AS 1020 may determine an SCS/AS Reference ID to use and an SCEF 1010 for use in transmission according to an SDT configuration procedure. As a result of the SDT configuration procedure, the SCEF 1010 may determine the SCEF Reference ID for use in transmitting the received non-IP data received from the SCS/AS 1020 and the IMSI in use by the UE.

1. The SCS/AS 1020 transmits to the SCEF 1010 a message including the non-IP data addressed to the UE. This message includes the SCS/AS reference ID and non-IP type of small data addressed to the UE.

2. The SCEF 1010 checks the received SCS/AS reference ID to determine the target MME/SGSN/C-SGN 1000 and identify the UE to which the data is addressed to obtain the corresponding SCEF Reference ID or IMSI. According to the policy of the operator, if the SCS/AS 1020 is not allowed to perform SDT or if the SDT frequency exceeds the transmission frequency allowed for the SCS/AS 1020, the SCEF 1010 may perform step 6 immediately and reject the SDT request.

3. The SCEF 1010 transmits to the MME/SGSN/C-SGN 1000 the SDT request received at step 2. This message may include an SCEF Reference ID for identifying the connection to the SCEF for the UE. This message may include an IMSI for identifying the UE. This message also includes the non-IP data addressed to the UE.

4. After receiving the request, the MME/SGSN/C-SGN 1000 verifies the corresponding request. If the verification fails, the MME/SGSN/C-SGN 100 notifies the SCEF 1010 of the failure of SDT at step 5. The failure cause may be indicative of the case where the mobile communication operator does not provide the SDT service anymore, the SDT amount exceeds the amount allocated for SDT of the SCEF 1010, or SDT frequency exceeds the allowed transmission frequency.

As a result of checking the request received at step 3, if it is determined that the SDT service is available, the MME/SGSN/C-SGN 1000 transmits the non-IP data received at step 3 to the UE. The transmission may be performed through NAS signaling.

5. After transmitting the non-IP data to the UE, the MME/SGSN/C-SGN 1000 transmits a response to the SCEF 1010 to notify that the SDT request is processed. If the non-IP data transmission to the UE fails or is not allowed, the MME/SGSN/C-SGN 1000 may notify the SCEF 1010 of the failure of the SDT request.

6. The SCEF 1010 may notify the SCS/AS 1020 of the result of the SDT request.

Embodiment 3

Figure 11:
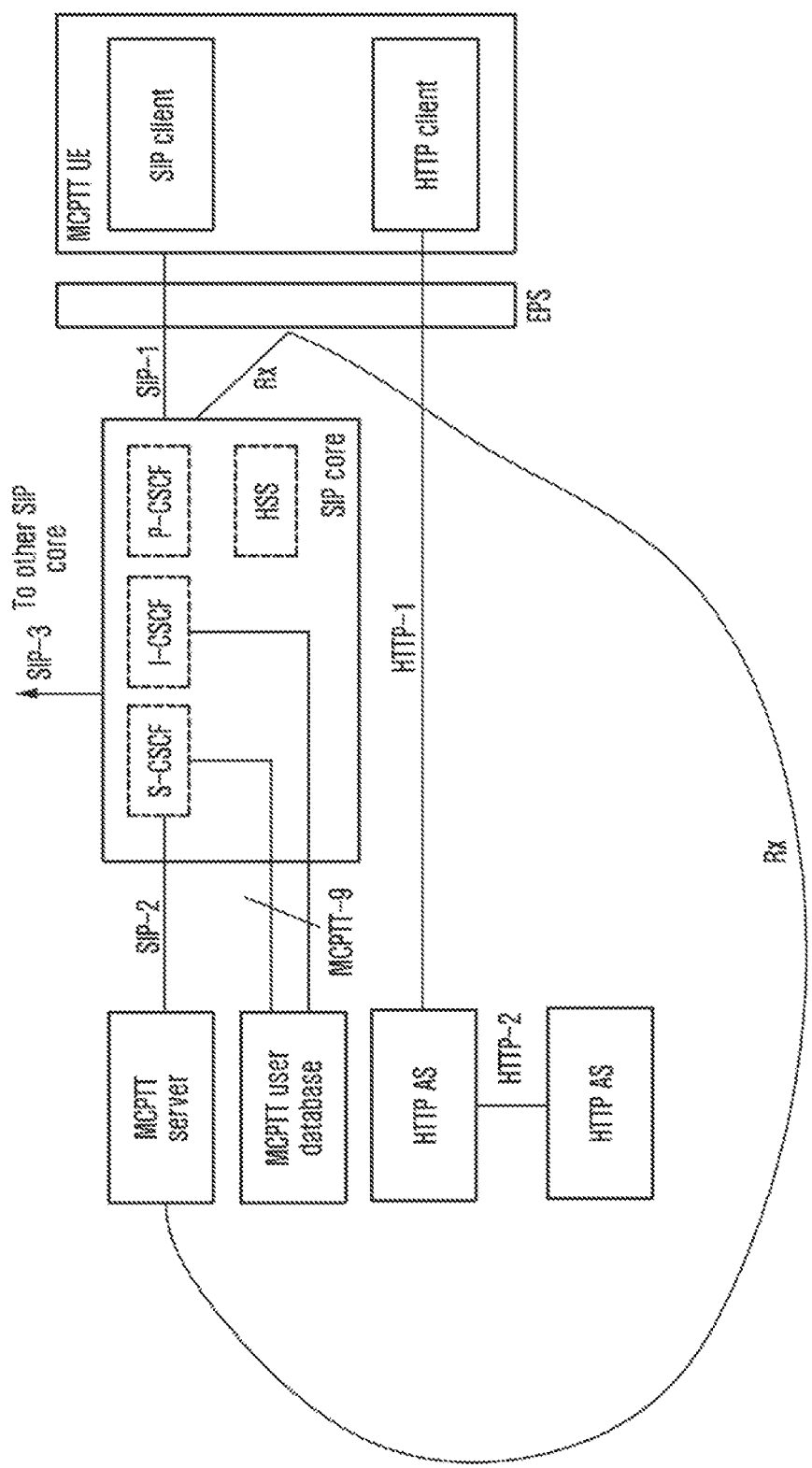
FIG. 11 is a diagram illustrating an MCPTT service called public safety network system and configurations of an SIP Core for interworking with an EPS, the EPS, and a UE.

FIG. 11 is a diagram illustrating an MCPTT service called public safety network system and configurations of an SIP Core for interworking with EPS, the EPS, and a UE. In FIG. 11, the SIP core is a system using a transmission protocol called SIP, and IMS is an example thereof. The P-CSCF (proxy-call session control function) of the SIP Core has an Rx interface for the PCRF (policy and charging rules function) of the EPS, the Rx interface being used to apply QoS and Policy for providing the UE with the MCPTT service.

In reference to FIG. 11, the Rx interface may be defined between the PCRF and the P-CSCF and/or between the PCRF and MCPTT server. If the PCRF exchanges information with two entities, it may occur that the MCPTT server and the P-CSCF may transmit mismatching information, resulting in difficulty of QoS control for the UE. Otherwise, if the two entities transmit the same information, this means that one entity is signaling meaninglessly and thus it may not be shown as preferable. Accordingly, it may be necessary to select one of two options according to an operator policy and/or any other pre-configuration.

Accordingly, it is necessary for the home and serving PLMNs to identify the connection of the Rx interface. The MCPTT application server (AS) for providing the MCPTT service finds an entry point to the Home PLMN using an HPLMN ID. It may also find the Entry point to the VPLMN using a Serving PLMN ID. The Entry point may be an S-CSCF of the SIP core or a P-GW of the EPS. The SIP Core or EPS has the information for use in finding the PCRF in the corresponding PLMN.

The MCPTT AS may have mapping information include a range of IP addresses for use by the UE. Using this mapping information, it may be possible to find a PLMN with the IP address in a predetermined range. For example, it may be possible to determine that IP addresses from IP x to IP y are mapped to PLMN 1.

In roaming scenarios, the MCPTT AS receives the IP address of the UE, an ID of the Home PLMN, and an ID of the Visited PLMN from the UE through signaling over the MCPTT-1 interface. If the entry point of the corresponding PLMN is configured and the related information matches the IP address of the UE and Home PLMN ID/Visited PLMN ID, the MCPTT AS may find the PCRF in the PLMN of the UE. The MCPTT AS perform the operation of finding the information on the entry point and PCRF based on the mutual service agreement with the Home PLMN or Visited PLMN mobile communication operator.

The information that should be transmitted through the Rx interface is as follows:
Media or flow description (e.g. SDP);
Priority;
MCPTT Group ID;
MCPTT User ID and/or IMPU; and/or
Call type.

All or part of the above information may be transmitted from the MCPTT AS to the PCRF directly through the Rx interface or transmitted from the MCPTT AS to the SIP core through the SIP-2 interface and then from the P-CSCF to the PCRF through the Rx interface. The PCRF may establish a new bearer or modify the bearer in use according to the collected information.

If the UE inserts a special tag into the INVITE header of the SIP message, the P-CSCF turns off the Rx control. In this case, the MCPTT server generates a PCC rule autonomously with the PCRF of the EPC through the Rx interface.

Alternatively, if the INVITE message as a SIP message transmitted by the UE includes special ICSI information, it may be possible to delete the Rx control information in the P-CSCF. That is, the P-CSCF does not communicate with the PCRF through the Rx interface. Instead, the MCPTT server generates the PCC rule with the PCRF through the Rx interface.

Embodiment 4

Figure 12:
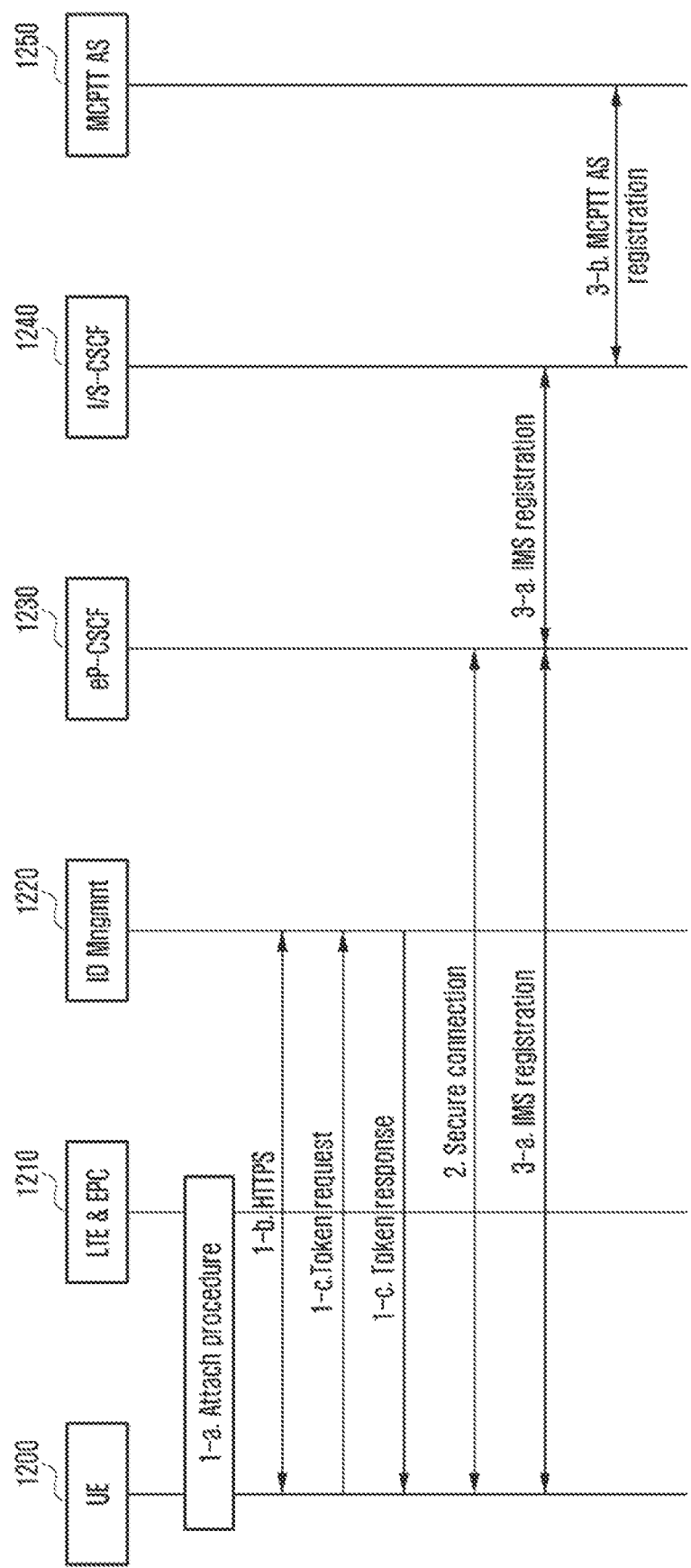
FIG. 12 is a diagram illustrating a method for registration with a mobile communication operator's network and an application server according to embodiment 4-1 of the present invention.

FIG. 12 is a diagram illustrating a method for registration with a mobile communication operator's network and an application server according to embodiment 4-1 of the present invention.

1-a. If the user powers on the MCPTT UE 1200, the UE 1200 performs an attach procedure to the LTE network 1210. During the attach procedure, the UE performs an LTE authentication procedure to obtain IP connectivity.

1-b. The user enables the MCPTT Client. The MCPTT client means an application for the MCPTT service. The MCPTT Client accesses the Identity Management Function 1220 with a URI. The MCPTT Client configures an HTTPS connection with the Identity Management Function 1220 and establishes a TLS connection to perform the authentication procedure. The MCPTT user may access the Identity Management function for user authentication using user credentials (e.g., biometrics such as fingerprint and iris, secured user ID, and ID/password).

The user credentials may include an MC User ID as a user ID for a Mission Critical service. The UE 1200 may transmit a service identifier. The service identifier may be used for identifying a specific service among the MC services.

1-c. The MCPTT Client may request to the Identity Management Function 1220 for a Token. This Token is used for authenticating the UE in registration with the MCPTT AS 1250 (In the present invention, this Token is referred to as Token A). If the UE cannot access the SIP core (or IMS), has no Credential, or is not allowed to perform the registration procedure with the SIP core (or IMS), the MCPTT Client may additionally request for a Token for use in IMS registration (in the present invention, this Token is referred to as Token B). The ID management server may transmit a user ID for one or more services. This user ID may be referred to as MCPTT user ID.

The MCPTT Client may acquire Tokens A and B from different Identity Management Functions 1220. One identity Management Function 1220 may manage the Identity of the MCPTT AS 1250 while the other Identity Management Function 1220 may manage the Identity of the SIP Core (or IMS).

2. The MCPTT UE 1200 establish a secure connection to the SIP Core (or IMS). Using this connection, the UE may perform a SIP-based authentication and registration procedure.

3-a. The MCPTT UE 1200 performs the registration procedure with the SIP core (or IMS). For this purpose, the UE transmits to the SIP Core (or IMS) a SIP Registration message including the IMS credential or Token B. In the case of using Token B, the eP-CSCF 1230 derives the IMS identity from the Token and transmits an OK response message in response to the SIP Registration message transmitted by the MCPTT UE 1200 including the IMS identity. The IMS Identity is used afterward when the UE transmits an SIP message. The MCPTT Client allows the SIP Registration message to include Token A, which is delivered to the S-CSCF.

3-b. The S-SCSF 1240 forwards Token A and IMS identity to the MCPTT AS 1250. The MCPTT AS 1250 verifies Token A and, if the user authentication is successful, transmits the MCPTT User ID to the UE. The MCPTT User ID and IMS Identity are linked for a UE in the MCPTT AS. The Registration procedure to the MCPTT AS 1250 may be performed along with the SIP Core (or ISM) registration procedure.

Figure 13:
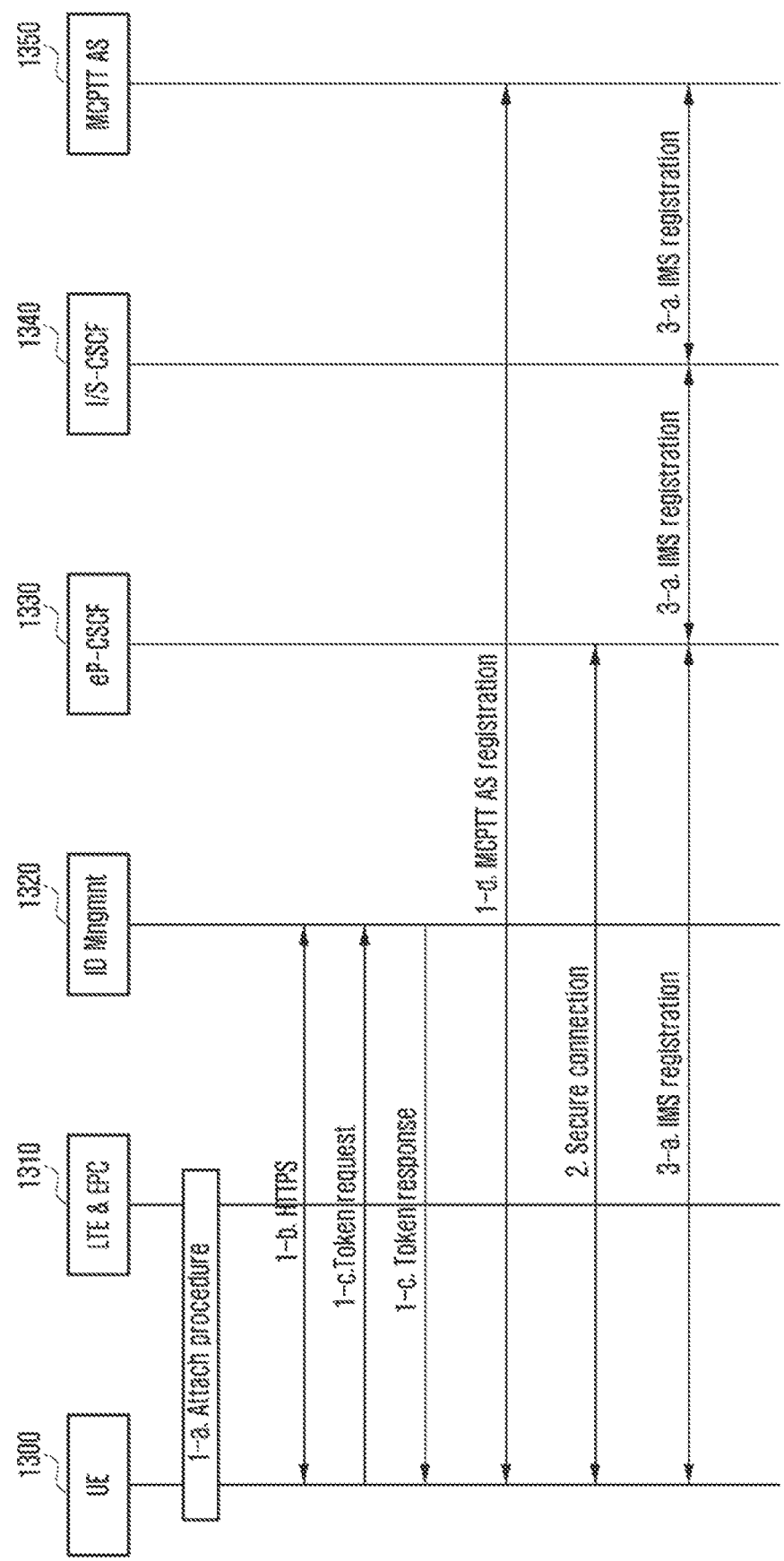
FIG. 13 is a diagram illustrating a method for registration with a mobile communication operator's network and an application server according to embodiment 4-2 of the present invention.

FIG. 13 is a diagram illustrating a method for registration with a mobile communication operator's network and an application server according to embodiment 4-2 of the present invention.

1-a. If the user powers on the MCPTT UE 1300, the UE performs an attach procedure to the LTE network 1310 and LTE authentication and obtains the IP connectivity.

1-b. The user enables the MCPTT Client. The MCPTT Client accesses the Identity Management Function 1320 with a URI. The MCPTT Client accesses the Identity Management Function 1320 with a UR and establishes an HTTPS connection thereto. The MCPTT Client establishes the TLS connection to authenticate the Identity Management Function. The MCPTT user may access the Identity Management function for user authentication using user credentials (e.g., biometrics such as fingerprint and iris, secured user ID, and ID/password).

1-c. The MCPTT Client may request to the Identity Management Function 1320 for a Token. This Token is used for authenticating the UE in registration with the MCPTT AS 1350 (In the present invention, this Token is referred to as Token A). If the UE cannot access the SIP core (or IMS), has no Credential, or is not allowed to perform the registration procedure with the SIP core (or IMS), the MCPTT Client may additionally request for a Token for use in IMS registration (in the present invention, this Token is referred to as Token B).

The MCPTT Client may acquire Tokens A and B from different Identity Management Functions 1320. One identity Management Function 1320 may manage the Identity of the MCPTT AS 1350 while the other Identity Management Function 1320 may manage the Identity of the SIP Core (or IMS).

1-d. The MCPTT Client perform a registration procedure with the MCPTT AS 1350. The MCPTT Client transmits Token A and IP multimedia public identity (IMPU: public ID of the UE) to the MCPTT AS 1350. The MCPTT AS 1350 verifies Token A to derive the MCPTT User ID. The UE 1300 may obtain the IMPU from the information set in the IP multimedia service identity (ISIM) or from Token B. The MCPTT AS 1350 relates and stores the derived MCPTT User ID and IMPU.

2. The MCPTT UE 1300 establish a secure connection to the SIP Core (or IMS). Using this connection, the UE may perform an SIP-based authentication and registration procedure.

3-a. The MCPTT UE 1300 performs a registration procedure with the SIP Core (or IMS). Here, it may be possible to perform the SIP registration using the ISIM or the IMS Credential (e.g., IMPU) obtained from Token B.

Figure 14:
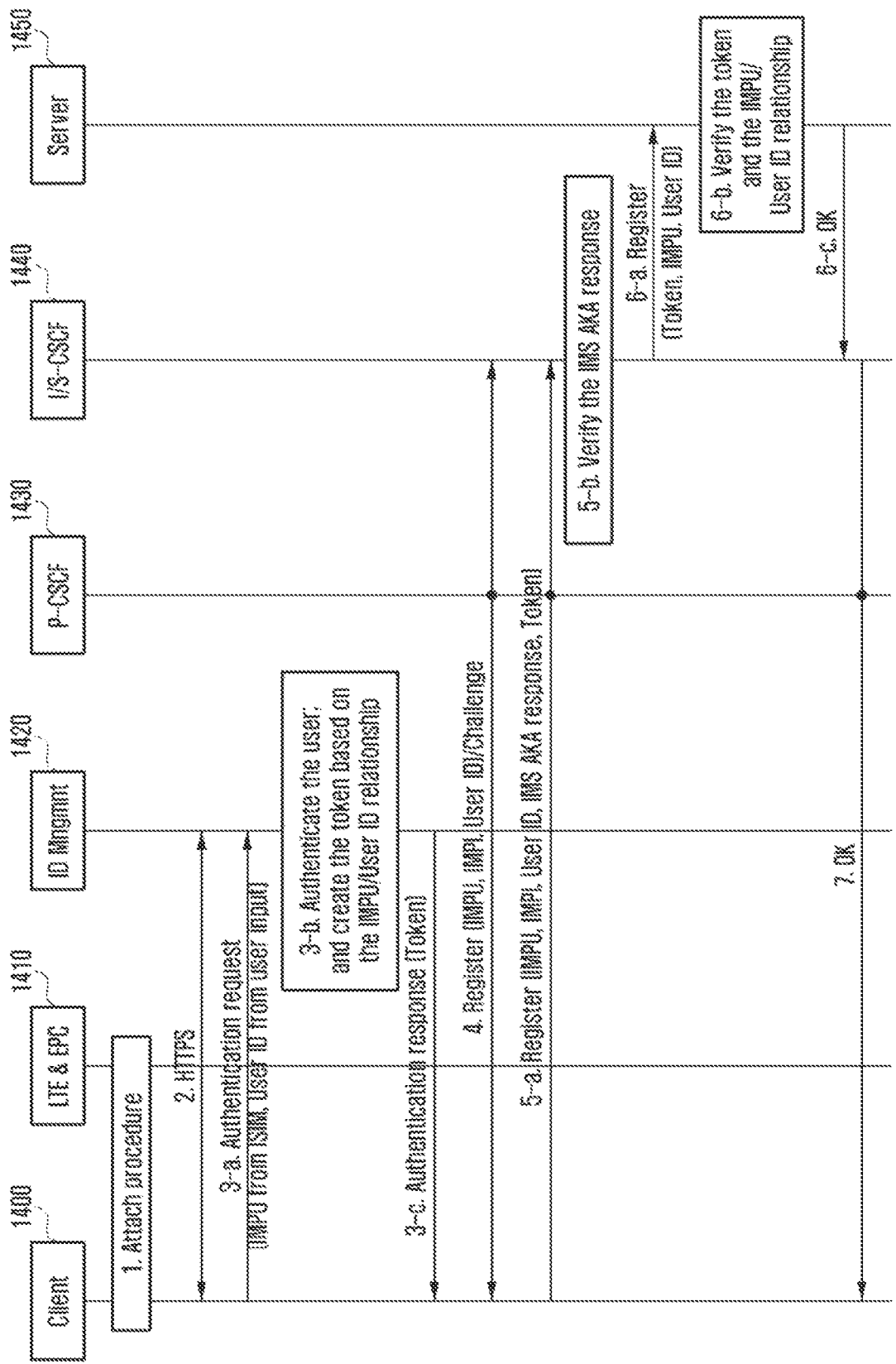
FIG. 14 is a diagram illustrating a method for registration with a mobile communication operation's network and an application server according to embodiment 4-3 of the present invention.

FIG. 14 is a diagram illustrating a method for registration with a mobile communication operation's network and an application server according to embodiment 4-3 of the present invention.

1. If the user powers on the MCPTT UE 1400, the UE performs an attach procedure to the LTE network 1410 and LTE authentication and obtains the IP connectivity.

2. The user enables the MCPTT Client 1400. The MCPTT Client 1400 accesses the Identity Management Function 1420 with a URI and establishes an HTTPS connection thereto. The MCPTT Client 1400 may establish a TLS connection to authenticate the Identity Management Function 1420.

3. The MCPTT client 1400 performs a user authentication procedure. For this purpose, the MCPTT Client 1400 transmits an Authentication request message to the Identity Management Function 1420. This message may include an IMPU, a user ID that can be identified by the Identity Management Function 1420, or User Credentials.

The user performs user authentication with biometrics such as fingerprint and iris or secure user ID or user ID/password. The user credential may include an MC user ID. The UE may transmit a service identifier. The service identifier may be used for identifying a specific service among the MC services. For example, the service identifier may be used to identify the MCPTT. In the following description, the user ID in use for the MCPTT service is referred to as MCPTT user ID.

The Identity Management Function 1420 authenticates the user using the User ID or User Credential. If the authentication is successful, the Identity Management Function 1420 generates a Token based on the IMPU and User ID. The IMPU and User ID may be derived from the Token generated as above. The Identity Management Function 1420 transmits an authentication response message including the Token to the UE.

4. The MCPTT Client 1400 transmits to the P-CSCF 1430 an SIP registration message, which is forwarded to the I-CSCF and S-CSCF 1440. The Registration message includes the IMPU/IMPI and User ID. Afterward, the MCPTT Client 1400 receives a request for IMS AKA authentication (Challenged).

5. The MCPTT Client 1400 that has received the authentication request transmits an IMS AKA response and a Registration message including the IMPU/IMPI or User ID to the I-CSCF and S-CSCF 1440. At this time, the MCPTT Client 1400 includes the Token received at the previous step in the message.

The IMS AKA response is verified by the S-CSCF 1440.

6. If the IMS AKA response is valid, the S-CSCF 1440 may perform a third party registration procedure with the MCPTT AS 1450. The S-CSCF 1440 transmits to the MCPTT AS 1450 a Register message including the IMPU, User ID, and Token.

The MCPTT AS 1450 verifies the Token. If it is determined that the Token is valid, the MCPTT AS 1450 determines that the received User ID is valid. The MCPTT AS 1450 derives the User ID and IMPU from the Token and checks whether the User ID and IMPU coincide with the User ID and IMPU received at the previous step from the S-CSCF. If the User IDs and IMPUs coincide with each other, the MCPTT AS 1450 relates and stores the IMPU and the User ID for use in identifying the message with the received IMPU or User ID afterward. The MCPTT AS 1450 transmits an OK message for ACK.

7. The S-CSCF 1440 transmits the OK message to the MCPTT Client 1450.

Figure 15:
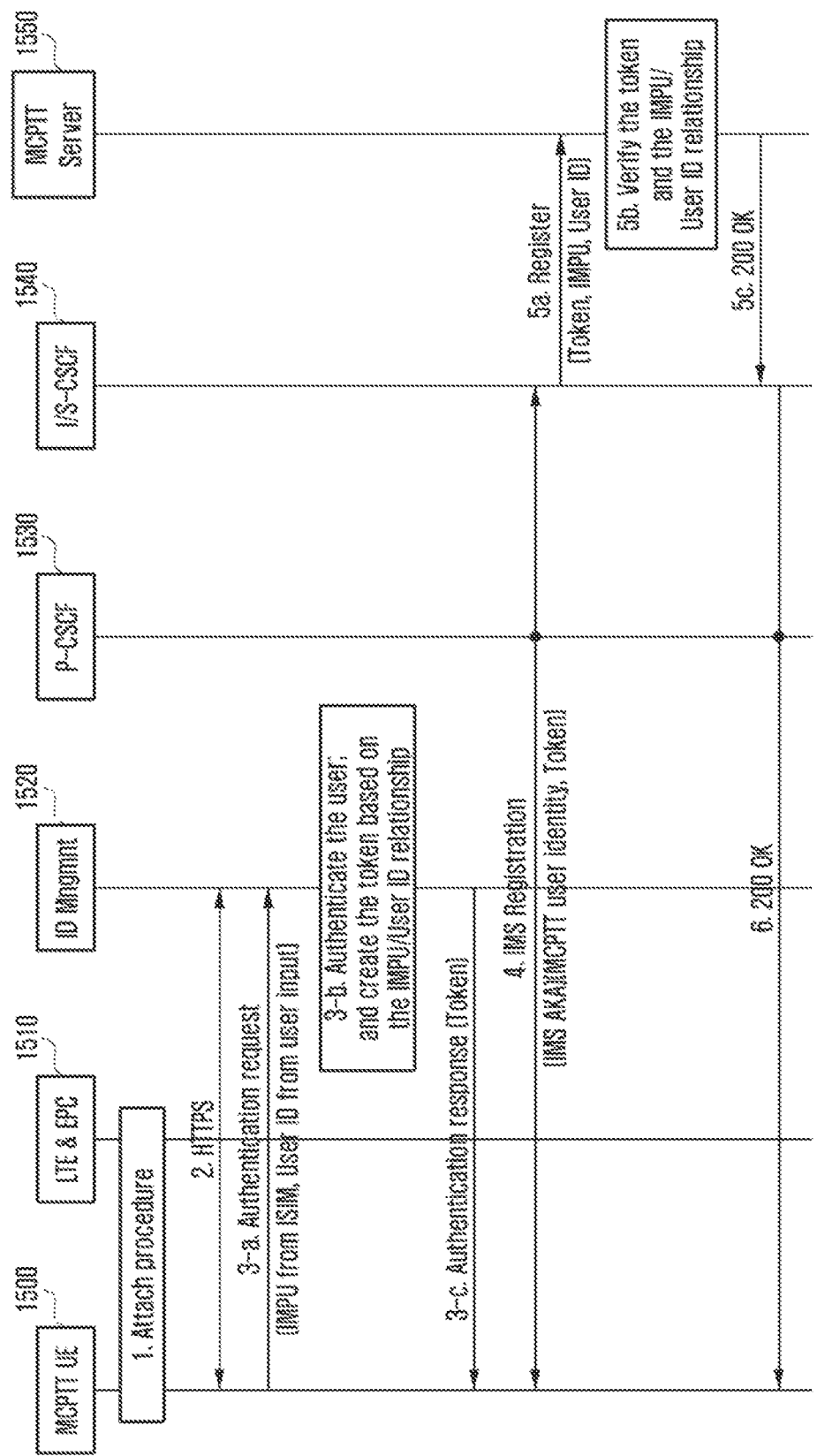
FIG. 15 is a diagram illustrating an AKA authentication procedure for MCPTT UE authentication between an MCPTT UE and an SIP Core (or IMS) according to embodiment 4-4 of the present invention.

FIG. 15 is a diagram illustrating an AKA authentication procedure for MCPTT UE authentication between an MCPTT UE and an SIP Core (or IMS) according to embodiment 4-4 of the present invention. It also shows a trusted node authentication procedure between the MCPTT UE and an MCPTT AS.

1. If the user powers on the MCPTT UE 1500, the UE 1500 performs an attach procedure to an LTE network 1510 and LTE authentication and obtains the IP connectivity.

2. The user enables the MCPTT Client. The MCPTT Client accesses the Identity Management Function 1520 with a URI and establishes an HTTPS connection thereto. The MCPTT Client establishes a TLS connection to authenticate the Identity Management Function 1520.

3. The MCPTT client performs a user authentication procedure. For this purpose, the MCPTT Client transmits an Authentication request message to the Identity Management Function 1520. This message may include an IMPU, a user ID that can be identified by the Identity Management Function 1520, or User Credentials. The user performs user authentication with biometrics such as fingerprint and iris or secure user ID or user ID/password. The Identity Management Function 1520 authenticates the user using the User ID or User Credential. If the authentication is successful, the Identity Management Function 1520 generates a Token based on the IMPU and User ID. The Token is configured in association with the IMPI and IMPU and authorized token scope.

The Identity Management Function 1520 transmits an authentication response message including the Token.

4. The UE 1500 performs an IMS registration procedure and IMS AKA for authenticating the signaling connection. The UE transmits to the S-CSCF 1540 an IMS Registration message including the MCPTT User ID and Token for use in MCPTT User authentication.

5. If the IMS AKA is successful, the S-CSCF 1540 performs a third party registration procedure with the MCPTT AS. Using the IMPU, MCPTT User ID, and Token received at step 4, the S-CSCF transmits a Registration message to the MCPTT AS. The MCPTT server 1500 verifies the Token and, if the Token is valid, determines that the received User ID is reliable.

Then the MCPTT server derives the IMPU and MCPTT User ID from the Token and checks whether the IMPU and MCPTT User ID coincide with the IMPU and MCPTT User ID included in the Registration message. If the check is successful, the MCPTT AS relates the IMPU and MCPTT User Identity and stores the relationship. The MCPTT AS 1550 transmits to the S-CSCF 1540 an OK message for acknowledgement.

6. The S-CSCF 1540 transmits to the MCPTT Client the OK message for acknowledgement.

Figure 16:
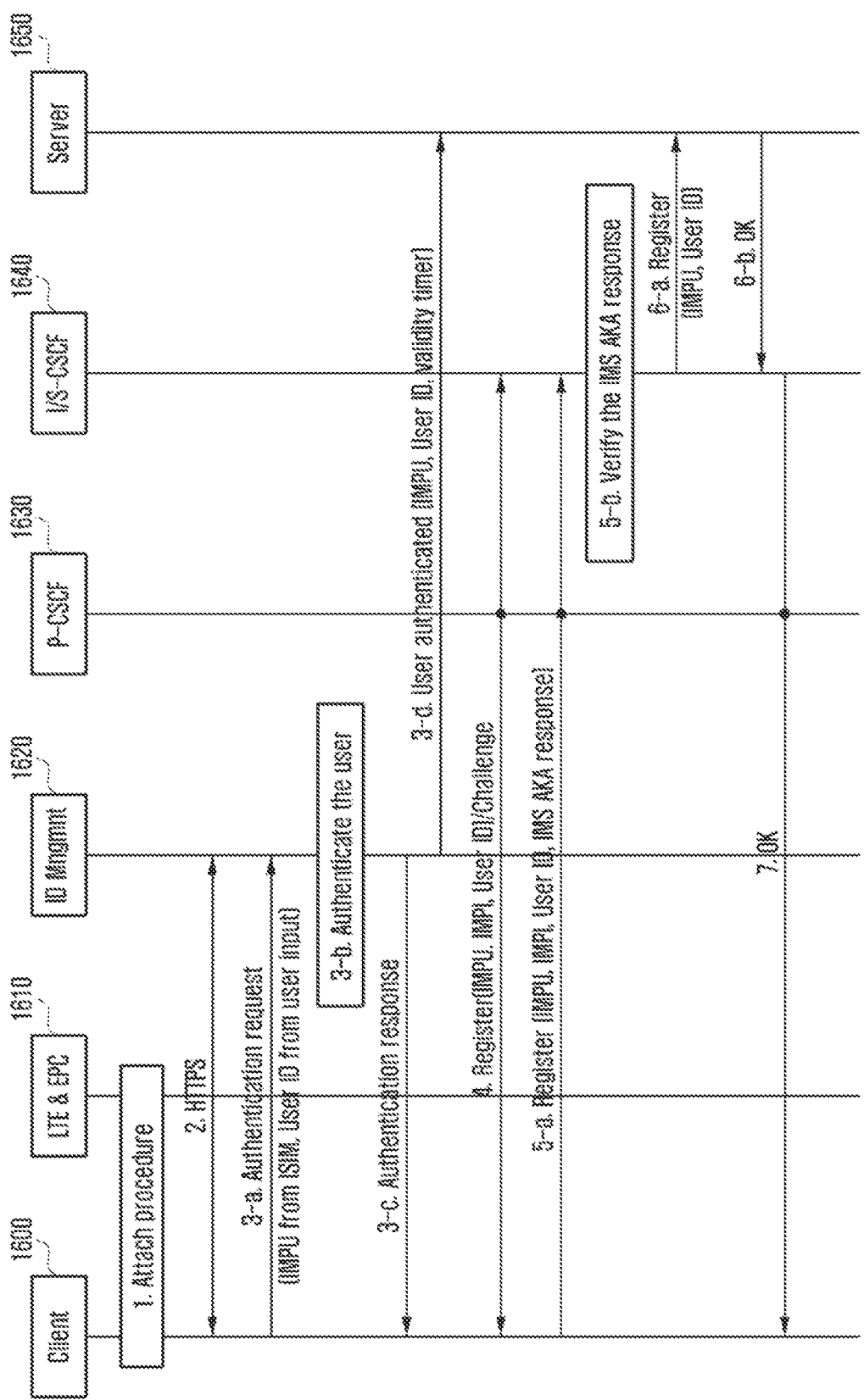
FIG. 16 is a diagram illustrating an AKA authentication procedure for MCPTTUE authentication between an MCPTT UE and an SIP Core (or IMS) according to embodiment 4-5 of the present invention.

FIG. 16 is a diagram illustrating an AKA authentication procedure for MCPTTUE authentication between an MCPTT UE and an SIP Core (or IMS) according to embodiment 4-5 of the present invention.

Although the encryption key can be transmitted directly, it may be possible to exchange the key setup information. The MCPTT AS may not perform decryption. In this case, the MCPTT AS, if necessary, may transmit to the ID management server and/or config. Management server an encrypted MCPTT group/user ID and receive the decrypted MCPTT group/user ID.

Steps 1 to 3 of FIG. 16 are substantially identical with steps 1 to 3 of FIG. 15 that have been described above; thus, detailed descriptions thereof are omitted herein.

The Identity Management Function 1620 authenticates the user using the User ID and User Credential. If the authentication is successful, the Identity Management Function 1620 transmits an authentication response message to the UE and notifies the MCPTT AS that the UE has been authenticated. This message includes the IMPU, User ID, and Valid time for the authentication validity. After receiving the above message, the MCPTT Server starts a Validity Timer.

4. The MCPTT Client 1600 transmits to the P-CSCF 1630 the Registration message, which is forwarded to the I-CSCF and S-CSCF 1640. The Registration message includes the IMPU/IMPI and encrypted User ID. In order to avoid exposure of the MCPTT User Identity to other entities except the MCPTT AS, the MCPTT Client 1600 may include the encrypted MCPTT User ID in the Registration message.

The encryption key may be provided by the Configuration management function instead of the Identity management function 1620.

Afterward, the MCPTT Client 1600 is required for IMS AKA.

5. After performing the IMS AKA, the MCPTT Client 1600 transmits to the S-CSCF the IMS AKA response along with the IMPU, IMPI, and encrypted User ID.

The S-CSCF 1640 verifies the IMS AKA response.

6. If the IMS AKA is successful, the S-CSCF 1640 performs a third party registration procedure with the MCPTT AS 1650. The S-CSCF 1640 transmits to the MCPTT AS 1650 the Registration message including the IMPU and User ID.

The MCPTT AS 1650 verifies the validity of the User ID and checks whether the User ID and IMPU are identical with those received at step 3-d and whether the Validity timer has not expired yet. After the above process is successful, the MCPTT AS 1650 relates the IMPU and User ID and stores the relationship. The related ID is used for mutual identification with the identifier that is used in the message afterward. The MCPTT AS 1650 decodes the encoded MCPTT User Identity.

The MCPTT Server 1650 transmits to the S-CSCF 1640 an OK message for acknowledgement.

7. The S-CSCF 1640 transmits the OK message to the MCPTT Client 1600.

Figure 17:
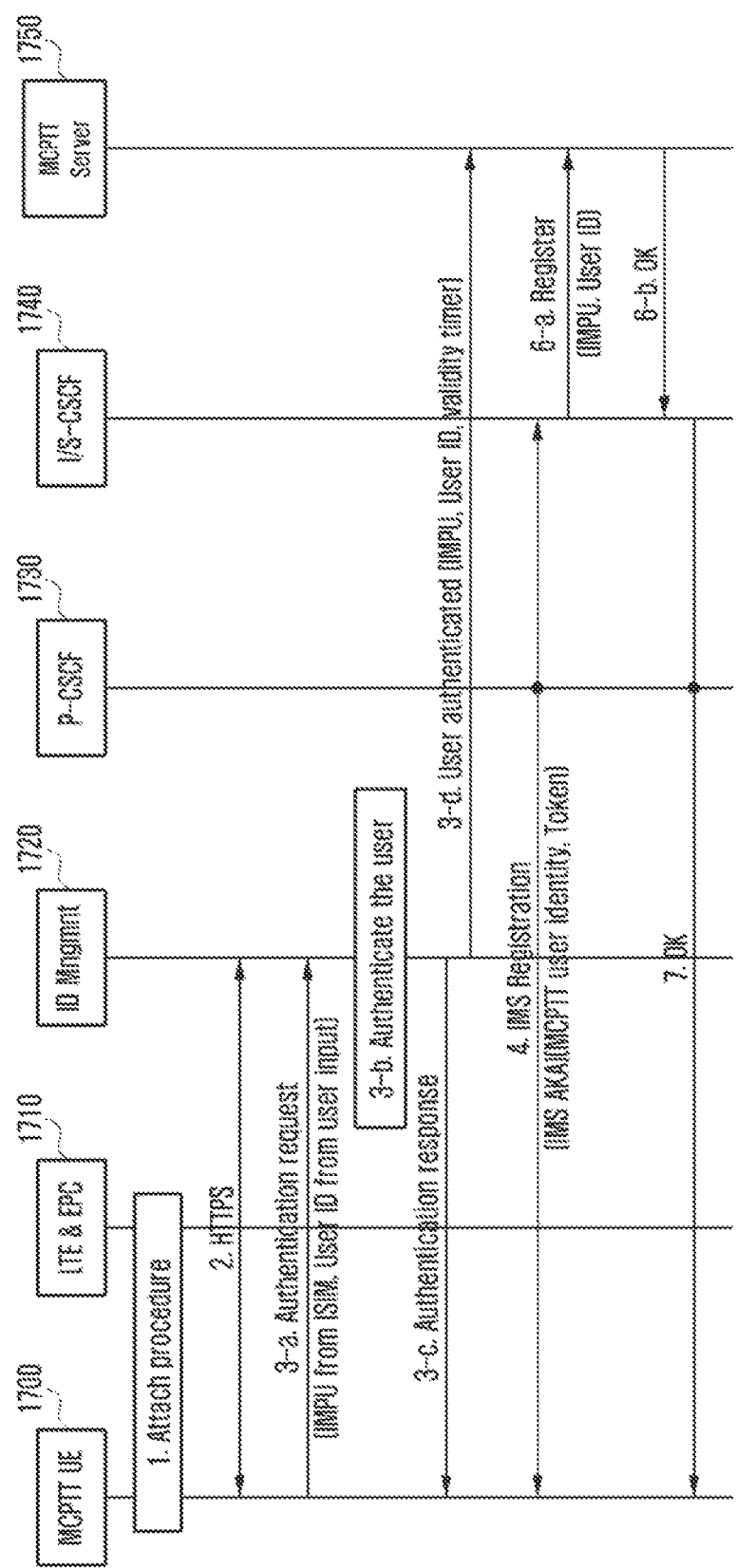
FIG. 17 is a diagram illustrating an AKA authentication procedure for MCPTTUE authentication between an MCPTT UE and an SIP Core (or IMS) according to embodiment 4-6 of the present invention.

FIG. 17 is a diagram illustrating an AKA authentication procedure for MCPTTUE authentication between an MCPTT UE and an SIP Core (or IMS) according to embodiment 4-6 of the present invention.

If the IMS registration is successful, the S-CSCF performs even the third party registration. In the previous description of the invention, the IMS AKA is challenged after the Registration and then the Registration is performed again. Although the encryption key can be transmitted directly, it may be possible to exchange the key setup information. The MCPTT AS may not perform decryption. In this case, the MCPTT AS, if necessary, may transmit to the ID management server and/or config. Management server an encrypted MCPTT group/user ID and receive the decrypted MCPTT group/user ID.

Figure 18:
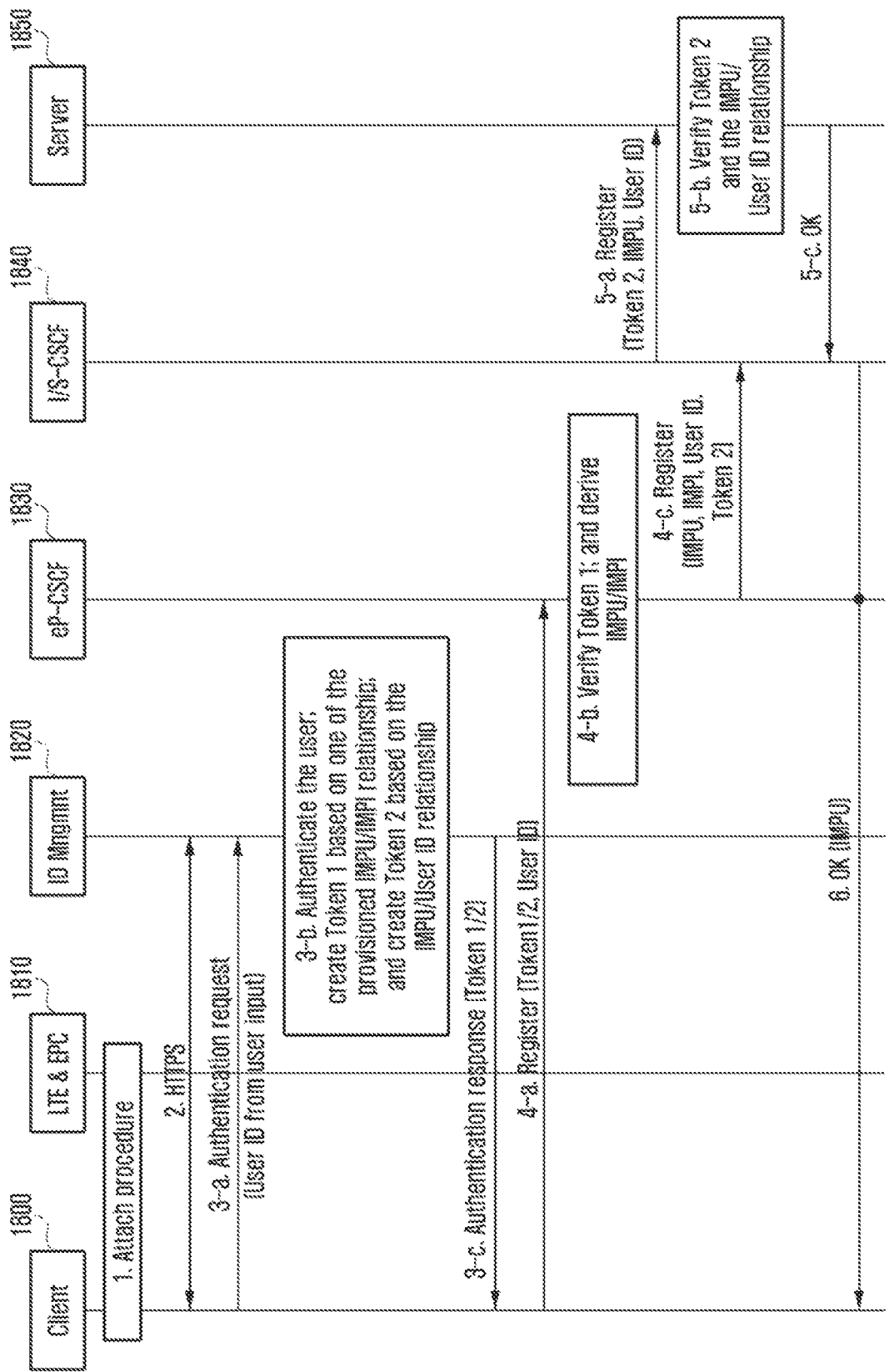
FIG. 18 is a diagram illustrating an AKA authentication procedure for MCPTTUE authentication between an MCPTT UE and an SIP Core (or IMS) according to embodiment 4-7 of the present invention.

FIG. 18 is a diagram illustrating an AKA authentication procedure for MCPTTUE authentication between an MCPTT UE and an SIP Core (or IMS) according to embodiment 4-7 of the present invention.

In FIG. 18, Token 1 is used for IMS authentication, Token 2 is used for MCPTT AS authentication, and encrypted information may be used.

Although the encryption key can be transmitted directly, it may be possible to exchange the key setup information. The MCPTT AS may not perform decryption. In this case, the MCPTT AS, if necessary, may transmit to the ID management server and/or config. Management server an encrypted MCPTT group/user ID and receive the decrypted MCPTT group/user ID.

Steps 1 to 3 of FIG. 18 are identical with the steps 1 to 3 of FIG. 15 that have been previously described; thus, detailed descriptions thereof are omitted herein.

The Identity Management Function 1820 may provide the MCPTT Client 1800 with an encryption key. The encryption key is used for encrypting the MCPTT User Credential, and the SIP Core (or ISM) cannot decrypt the encrypted MCPTT User Credential.

The Identity Management function 1820 authenticates the user using the user ID and user credentials. If the authentication is successful, the Identity Management function 1820 creates two Tokens. The two tokens are called Token 1 and Token 2. Token 1 is created based on a pair of IMPU and IMPI. The IMPU and IMPI may be derived from Token 1. Token 2 is created based on the IMPU and User ID. The IMPU and User ID may be derived from Token 2.

The Identity Management Function 1820 transmits to the MCPTT Client an authentication response message including Token 1 and Token 2.

4. The MCPTT Client 1800 transmits to the eP-CSCF 1830 a Registration message including the received Tokens and encrypted User ID. In order to prevent the MCPTT User ID from being exposed to other entities except the MCPTT AS, the MCPTT Client 1800 encrypts the User ID and includes the encrypted User ID in the message.

The eP-CSCF 1830 verifies Token 1 to obtain the IMPU and IMPI. If Token 1 is verified successfully, the eP-CSCF 1830 transmits to the S-CSCF a Registration message including the IMPU, IMPI, User ID, and Token 2. The S-CSCF 1840 performs a Trusted Node Authentication procedure as the Registration procedure without any extra authentication procedure. The message may include an indicator indicating that the authentication has already been carried out.

5. The S-CSCF 1840 performs a third party registration with the MCPTT AS 1850. The S-CSCF 1840 transmits to the MCPTT AS a Registration message including the IMPU, encrypted User ID, and Token 2.

The MCPTT AS 1850 verifies Token 2. If the Token is verified successfully, the MCPTT AS assumes that the User ID is valid and checks whether the User ID and IMPU derived from Token 2 coincide with the IMPU and User ID in the Registration message. If they match, the MCPTT AS 1850 relates the IMPU and MCPTT User ID and stores the relationship between the IMPU and MCPTT User ID. The MCPTT AS decrypts the encrypted User ID. The MCPTT AS 1850 may have an encryption key received from the Identity management function or preconfigured.

The MCPTT AS 1850 may transmit to the S-CSCF 1840 an OK message for acknowledgement.

7. The S-CSCF 1840 transmits to the MCPTT Client 1800 the OK message for acknowledgement.

Figure 19:
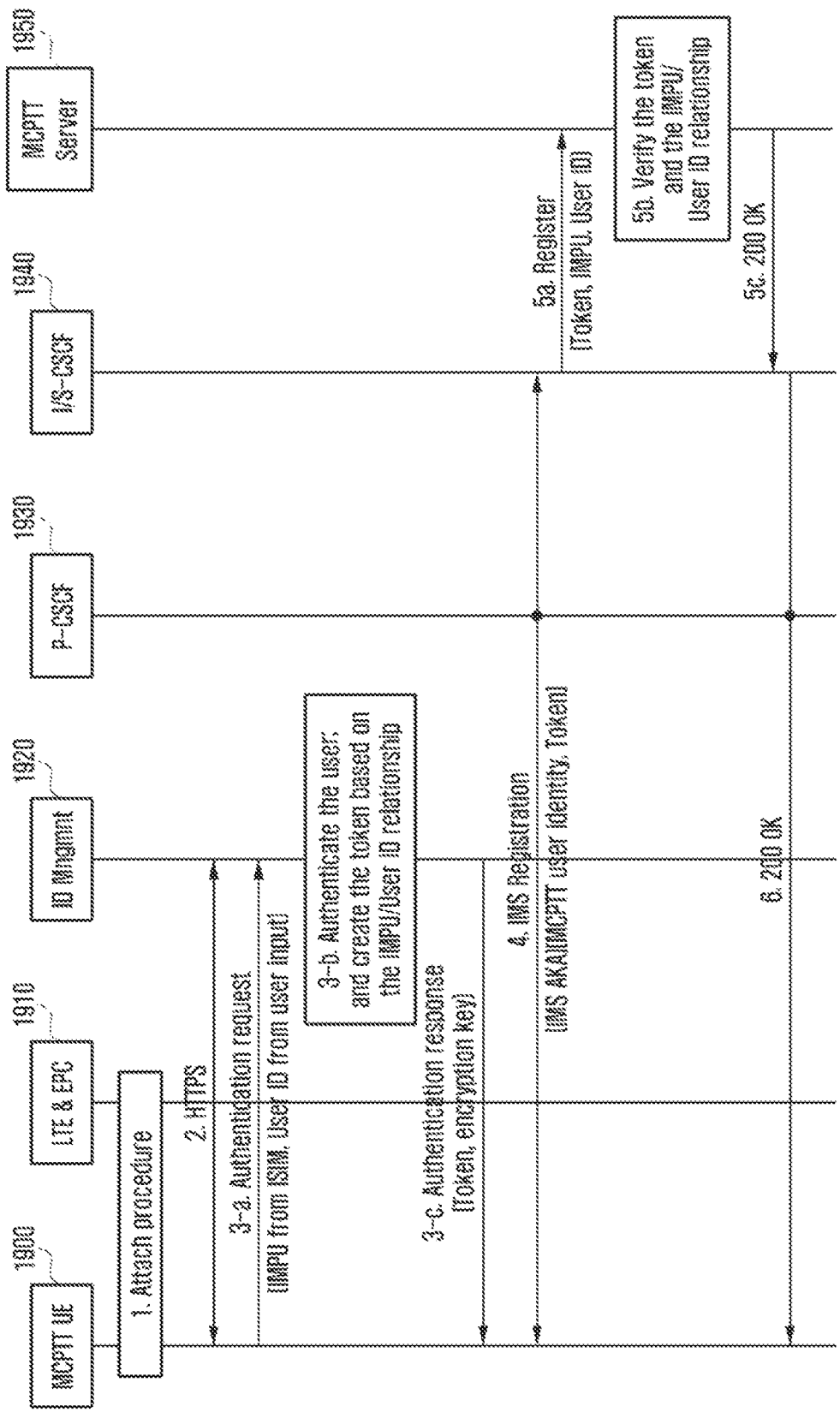
FIG. 19 is a diagram illustrating a procedure for an S-CSCF to attempt a third party registration upon detection of an IMS Registration attempt according to embodiment 4-8 of the present invention.

FIG. 19 is a diagram illustrating a procedure for an S-CSCF to attempt a third party registration upon detection of IMS Registration attempt according to embodiment 4-8 of the present invention.

The MCPTT UE 1900 and the SIP Core (or IMS) perform the IMS AKA authentication to authenticate the MCPTT UE 1900. The S-CSCF 1940 performs Trust Node Authentication for MCPTT User authentication between the MCPTT Client 1900 and the MCPTT Server 1950. Although the encryption key can be transmitted directly, it may be possible to exchange the key setup information. The MCPTT AS may not perform decryption. In this case, the MCPTT AS, if necessary, may transmit to the ID management server and/or config. Management server an encrypted MCPTT group/user ID and receive the decrypted MCPTT group/user ID.

Steps 1 to 3 of FIG. 19 are substantially identical with steps 1 to 3 of FIG. 15 that have been described above; thus, detailed descriptions thereof are omitted herein.

The Identity Management Function 1920 may provide the MCPTT Client 1900 with an encryption key. The encryption key is used for encrypting the MCPTT User Identity. The encrypted MCPTT User Identity is not decrypted by the SIP Core (or IMS).

The encryption key may be provided by the Configuration management function instead of the Identity Management Function 1920.

In the scenario of FIG. 17, the encryption key and/or key setup information may be explicitly transmitted to the MCPTT AS at step 3-d.

Even in the scenario of FIG. 18, the encryption key and/or key setup information is transmitted to the client at the similarly applicable step 3.

4. The UE 1900 performs the IMS Registration and IMS AKA authentication. The UE 1900 includes the MCPTT User identity and token in the Registration message for use in MCPTT User authentication. If the MCPTT User Identity is encrypted, the MCPTT Client includes the encrypted MCPTT User ID in the Registration message.

5. If the IMS AKA is successful, the S-CSCF 1940 performs a third party registration procedure with the MCPTT AS 1950. The S-CSCF 1940 transmits to the MCPTT AS 1950 a Registration message including the IMPU, MCPTT User ID, and Token. The MCPTT AS 1950 verifies the Token and, if the Token is valid, assumes that the User ID is valid. Then the MCPTT AS 1950 checks whether the IMPU and MCPTT User ID derived from the Token coincide with the IMPU and MCPTT User ID in the Registration message. If the check is successful, the MCPTT AS relates the IMPU and MCPTT User Identity and stores the relationship between the IMPU and MCPTT User Identity. Accordingly, it may be possible to identify the user related to the message received afterward with an IMPU or MCPTT User Identity based on the MCPTT User Identity or IMPU.

The MCPTT AS 1950 decrypts the MCPTT User identity. The MCPTT AS 1950 may have an encryption key received from the Identity management function or preconfigured. The MCPTT AS 1950 may transmit an OK message for acknowledgement.

Figure 20:
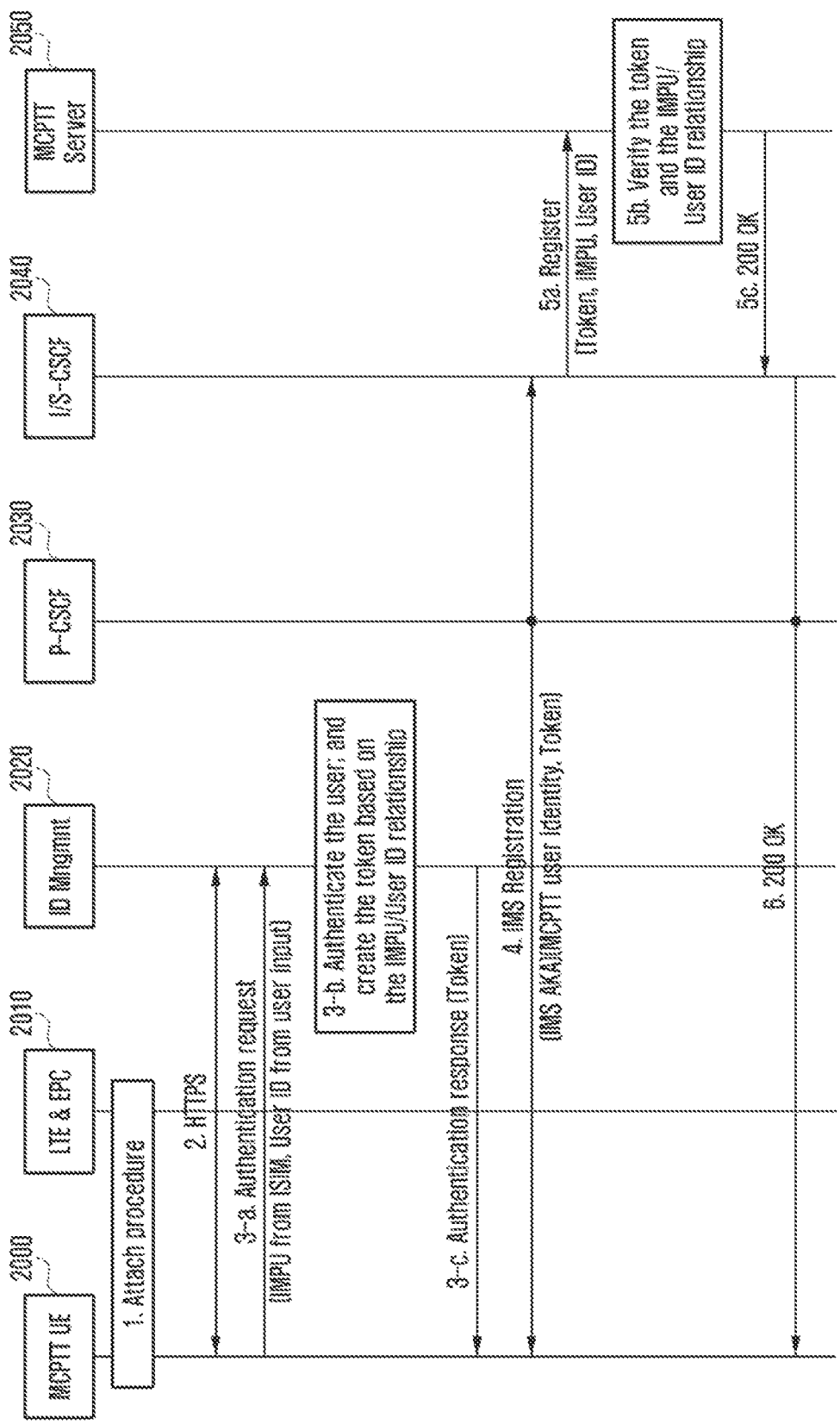
FIG. 20 is a diagram illustrating a procedure for the case where the Registration message includes no MCPTT User ID and there is encryption according to embodiment 4-9 of the present invention.

FIG. 20 is a diagram illustrating a procedure for the case where the Registration message includes no MCPTT User ID and there is encryption according to embodiment 4-9 of the present invention.

Steps 1 to 3 of FIG. 20 are identical with steps 1 to 3 of FIG. 15 that have been described above; thus, detailed descriptions thereof are omitted herein.

4. If it is necessary to prevent the MCPTT User Identity from being exposed to the SIP Core or IMS, the MCPTT Client includes no MCPTT user ID in the Registration message.

5. If the Registration message includes no MCPTT User Identity, the MCPTT AS does not verify the MCPTT User identity and IMPU derived from the Token. Instead, if the Token is valid, the MCPTT AS stores the MCPTT User Identity and IMPU derived from the Token and relates the MCPTT User Identity and IMPU for the MCPTT service.

The MCPTT AS transmits an OK message for acknowledgement.

Figure 21:
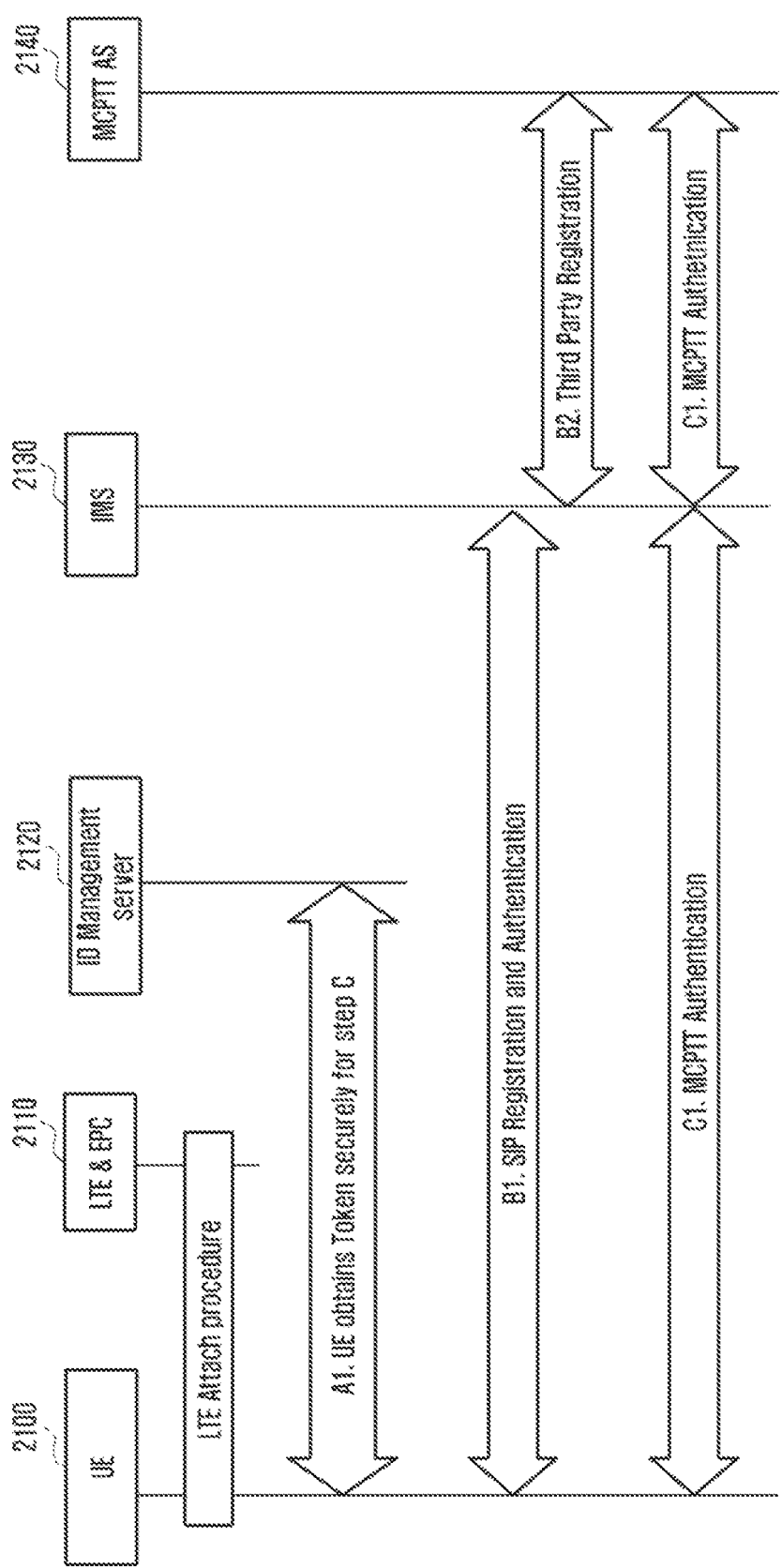
FIG. 21 is a diagram illustrating an MCPTT authentication procedure according to embodiment 4-10 of the present invention.

FIG. 21 is a diagram illustrating an MCPTT authentication procedure according to embodiment 4-10 of the present invention.

At power-on, the MCPTT UE 2100 performs LTE authentication.

Step A: The UE 2100 performs the MCPTT User authentication procedure based on a Token according to the information configured to the MCPTT Client. The UE 2100 obtains the Token from the Identity Management Server 2120. The Token is used for MCPTT authentication at step C.

The UE transmits to the Identity management server 2120 an MC User ID along with other User Credentials. A Service ID (e.g., NYPD_MCPTT) may be provided too. The Identity Management Server 2120 transmits a Service User ID, i.e., MCPTT User ID, to the UE in reply. It may be possible to derive the Service ID, i.e., MCPTT User ID, from the Token.

Step B: An IMS authentication procedure is performed between the MCPTT UE 2100 and the IMS 2130.

Step C: The MCPTT user authentication is performed after the IMS authentication.

If the MCPTT Server 2140 is administered by the mobile communication operator, the Public Safety User Data Function (PS-UDF) or HSS stores the MCPTT User credential for MCPTT user authentication. The Security information may be generated through a mutual authentication procedure. If the MCPTT server 2140 is administrated by a public security network agency, the PS-UDF stores the credential necessary for MCPTT user authentication, the security information being created through the mutual authentication procedure.

Figure 22:
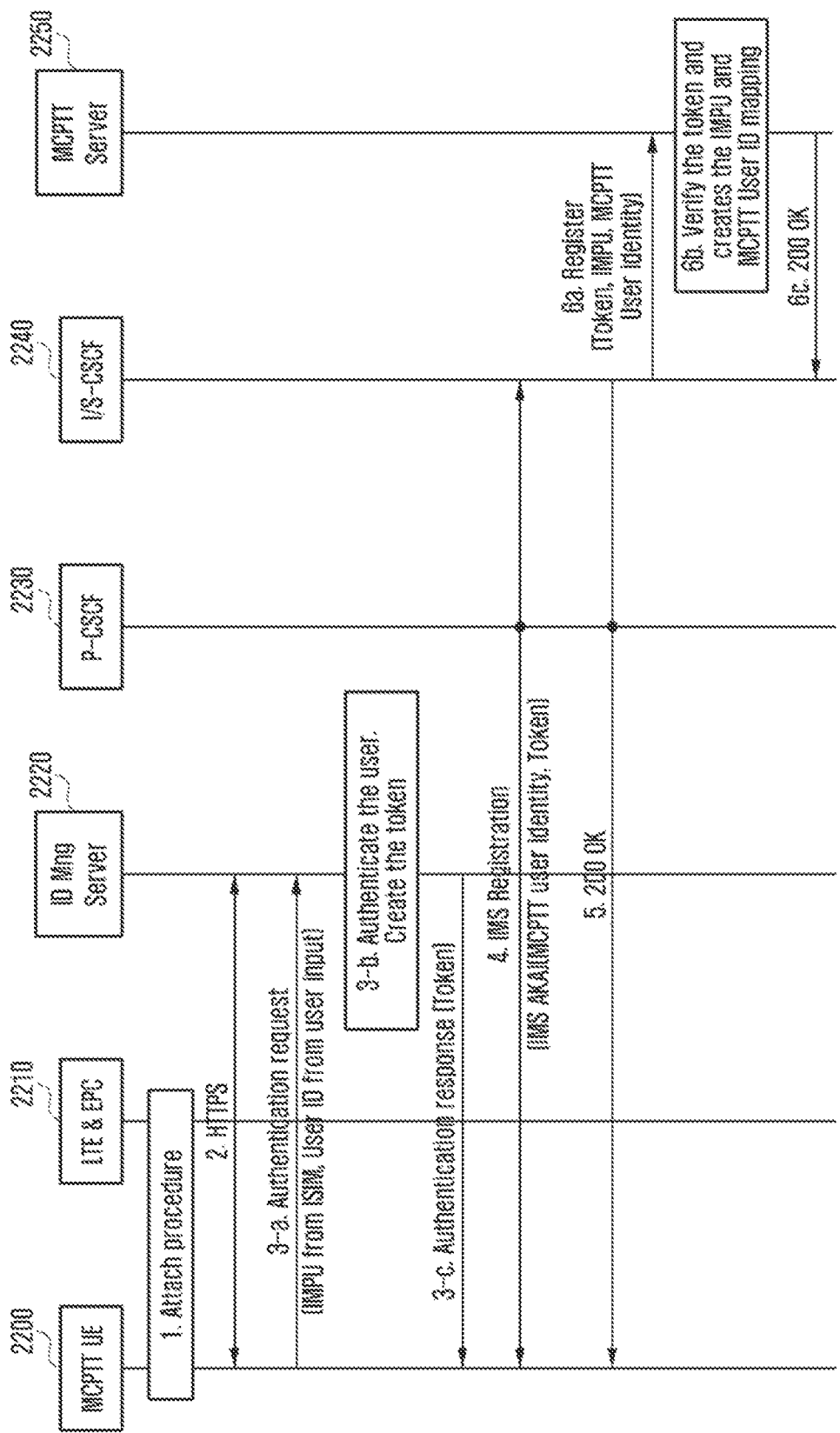
FIG. 22 is a diagram illustrating an MCPTT user authentication procedure according to embodiment 4-11 of the present invention.

FIG. 22 is a diagram illustrating an MCPTT user authentication procedure according to embodiment 4-11 of the present invention.

The MCPTT user authentication procedure through an MCPTT-1 interface includes the steps as follows.

SIP Digest authentication (it means IMS registration.)
Token based authentication.

3. The Identity Management Function 2220 authenticates the user using the MC User identity and MC User authentication credential. If the authentication is successful, the Identity Management Function 2220 may generate a Token based on the IMPU, MC User ID, and Service ID. The Token may be encrypted along with the authentication information related to the MCPTT User ID and IMPU. The MCPTT User ID may be explicitly transmitted to the UE or derived from the Token afterward.

The Identity Management Function 2220 may transmit to the UE an authentication response message including the Token.

4. The INVITE message may not include the MCPTT User ID because the MCPTT User ID may be derived from the Token.

5. The S-CSCF 2240 transmits to the MCPTT client 2200 an OK message for acknowledgement.

6. If the IMS AKA authentication is successful, the S-CSCF 2240 performs a third party registration with the MCPTT server 2250. The S-CSCF 2240 transmits a Register message including the IMPU, MCPTT User ID, and Token. The MCPTT User ID may not be included in the message and, in this case, the MCPTT User ID may be derived from the Token. If no MCPTT user ID is received, the MCPTT User ID derived from the Token is used as the MCPTT user ID of the UE. The MCPTT AS 2250 relates the IMPU and MCPTT User ID and stores the relationship between the IMPU and MCPTT User ID.

Embodiment 5

Embodiment 5 relates to an efficient broadcast-related signal transmission method and apparatus.

Figure 23:
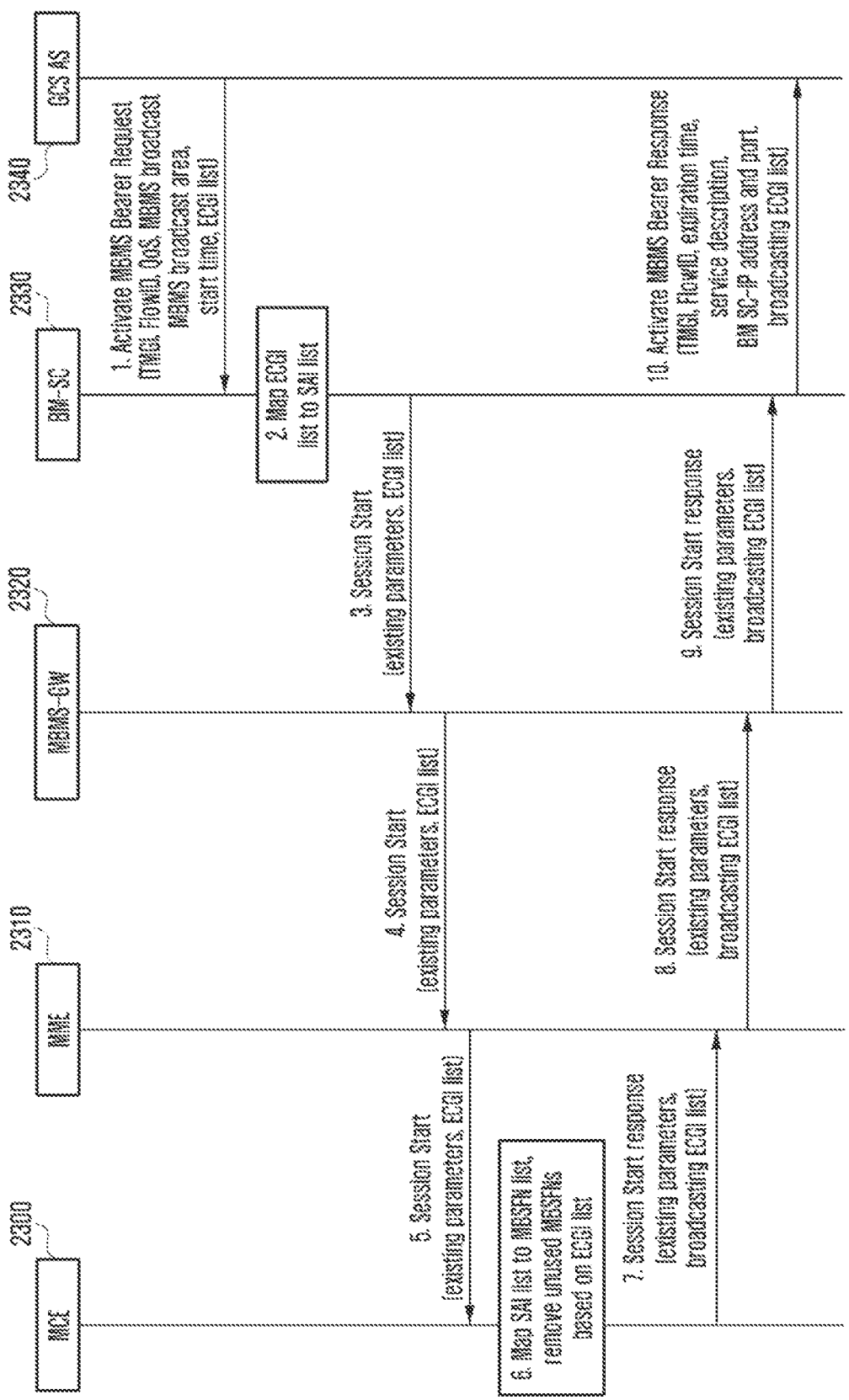
FIG. 23 is a diagram illustrating a broadcast-related signal transmission method according to embodiment 5 of the present invention.

FIG. 23 is a diagram illustrating a broadcast-related signal transmission method according to embodiment 5 of the present invention.

The UE may send an ECGI to the GCS AS. The GCS-AS 2340 may determine whether to transmit an ECGI list to the BM-SC 2330 depending on the configuration information. The configuration information may become available for the GCS-AS 2340 as an implementation according to the operator policy or through signaling between the BM-SC 2330 and GCS-AS 2340.

1. The GCS-AS 2340 sends the BM-SC 2330 an Activate MBMS Bearer Request message through the MB2 interface for activating the MBMS bearer. This message may include a TMGI for identifying the MBMS bearer. This message may also include Flow ID, QoS, MBMS Broadcast area, and MBMS start time.

The Flow ID is included only when the TMGI is included and used for identifying a specific Flow in the MBMS traffic identified by the TMGI. If the Flow ID is included in the message, the BM-SC associates the Flow ID with the TMSI or the MBMS Broadcast area included in the message (Association). The QoS value is mapped to a value indicative of a priority for the MBMS bearer. If the MBMS Broadcast Area includes a list of Cell IDs, the BM-SC 2330 maps the Cell IDs to a set of the MBMS service area (SA). The GCS AS 2340 may send the ECGI list along with the MBMS SA.

The BM-SC 2330 may ignore the MBMS SA and re-write with the MBMS SA obtained as described above. If the ECGI list is received, the BM-SC 2330 may include the MBMS SA in the Activate MBMS Bearer Response. The GCS-AS 2340 may configure the MBMS service data with the MBMS SA. If the ECGI list is not received, the BM-SC 2330 may not include the MBMS SA in the Activate MBMS Bearer Response.

In an alternative embodiment, at step 1, if the GCA AS 1240 wishes to activate the MBMS bearer over the MB2 interface, the GCA AS 234 sends an Activate MBMS Bearer Request message to the BM-SC 2330. This message may include TMGI, QoS, MBMS Broadcast Area, and Start time. The TMGI may be used to identify the MBMS bearer. The MBMS Broadcast Area may include the list of MBMS service area identities, the list of cell IDs, or both the two lists.

If the MBMS Broadcast area includes the MBMS Service Area Identity list, the MBMS Service Area Identity may be checked according to the Cell ID list or any other configuration information.

If the TMGI is included in the message, the BM-SC 2330 determines whether the GCS-AS 2340 is authorized to use the TMGI. If the GCS-AS 2340 is not authorized to use the TMGI, the BM-SC 2330 rejects the request. If the TMGI is not included in the message, the BM-SC 2330 assigns an unused value for the TMGI.

The BM-SC 2330 allocates a Flow ID corresponding to the TMGI and MBMS Broadcast area. If the MBMS Broadcast area parameter includes the list of Cell IDs, the BM-SC 2330 maps the Cell IDs to the MBMS Service Area Identities. The cell ID mapping is performed according to the mobile communication operator policy. The BM-SC 2330 includes the list of MBMS service identities in the MBMS Session Start message. The Cell ID list may also be included in the MBMS Session Start message. If another MBMS bearer with the same TMGI is already activated, the BM-SC 2330 controls such that the MBMS broadcast area is not overlapping with that of the existing MBMS bearer. The BM-SC 2330 allocates a unique Flow ID to the new MBMS bearer.

Afterward, the BM-SC 2330 allocates MBMS resources to the corresponding MBMS broadcast area for contents delivery over the MBMS Bearer and performs a Session Start procedure. The MBMS SAI(s) included in the MBMS Session Start Request message may be the information obtained from the cell identifier(s) received from the GCS-AS 2340. In general, the MBMS SAI(s) may be different from the MBMS SAI(s) sent by the GCS-AS 2340. In this case (including the case where the MBMS SAI(s) is included in the Activate MBMS Bearer Request message sent by the GCS-AS and MBMS sent by the BM-SC; GCS-AS has not sent MBMS SAI(s)), the BM-SC 2330 may include the MBMS SAI(s) included in the MBMS Session Start Request message in the Activate MBMS Bearer Response message.

2. The BM-SC 2330 maps the Cell ID list (ECGIs) to the Service area list (SAIs) and determines MBMS-GW(s) for the related areas.

3. The BM-SC 2330 sends a Session Start message to the MBMS-GW(s) determined as above. This message may include 3GPP Release-12 MBMS-related parameters and Cell ID list (List of ECGIs).

4. The MBMS-GW 2320 sends the Session Start message to the involved MME(s). This message may include 3GPP Release-12 MBMS-related parameters and Cell ID list (List of ECGIs).

5. The MME 2310 sends the Session Start message to the involved MCE(s). This message may include 3GPP Release-12 MBMS-related parameters and Cell ID list (List of ECGIs). The MME 2310 may select the destination of the Session Start message using the existing parameters include the received ECGI list and MBMS SA.

The MME 2310 may have received the MCE identifier to which an eNB or a cell of the eNB is linked in the S1 Setup or eNB Configuration Update procedure. Alternatively, the MME 2310 may have received a list of cells or eNB linked to the MCE in the M3 Setup or MCE Configuration Update procedure. The Session Start message may be sent to only an eNB corresponding to the ECGI list received using this information. Accordingly, it may be possible to select a suitable MCE using the eNB-specific service MCE information and ECGI information in the S1 Setup or eNB Configuration Update procedure.

It may be necessary for multiple MCEs to make consistent decisions on the areas for MBMS transmission (e.g., in the distributed MCE architecture). This may be achieved as follows.

<MBMS Session Start Procedure in Case an MBSFN Area is Managed by Multiple MCEs>

During the MBMS Session Start procedure, the MCE receives an MBMS Session Start request message from the MME through the M3 interface. This message is transmitted for providing the eNB with the MCCH-related information (radio information for MBMS transmission) and requesting to the eNB to establish a Bearer for MBMS to the UE and notify the UE of the MBMS session.

In order to achieve the MBSFN transmission, the cells in a signal MBSFN area must be configured with the same MCCH-related information. If an MBSFN area is controlled by a single MCE, it is obvious to use synchronized MCCH information. If multiple MBSFN areas are controlled by a signal MCE, e.g., due to distributed MCE architecture, there is a need of coordination of the MCCH-related information among the MCEs. In the distributed MCE architecture, all the distributed MCEs responsible for an MBSFN area must produce the same admission control result.

Figure 24:
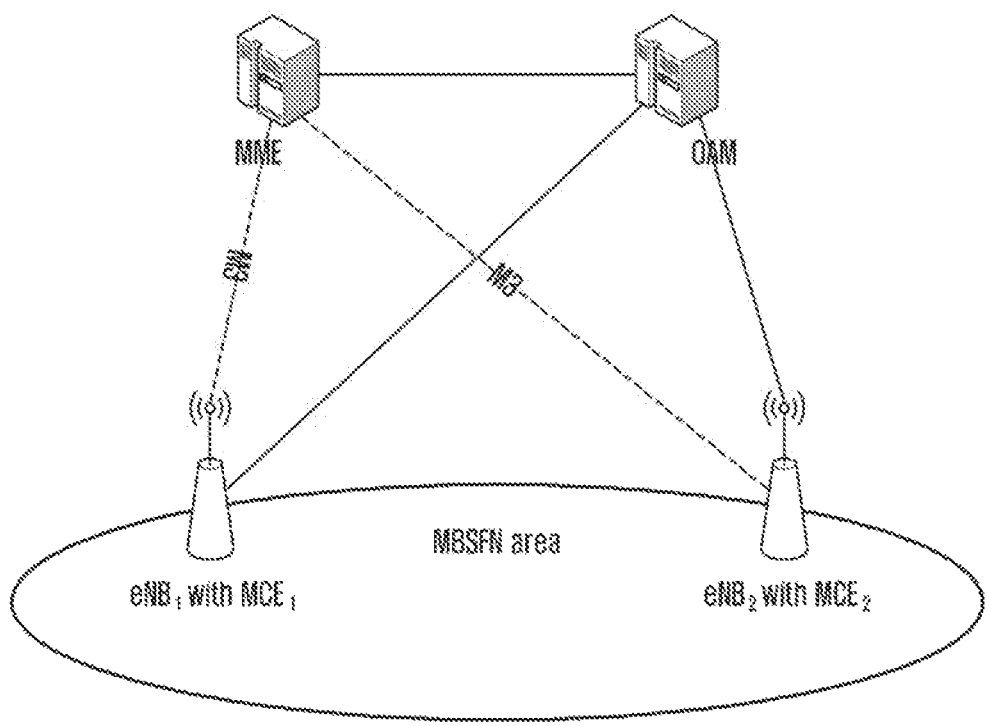
FIG. 24 is a diagram illustrating an MBSFN area administrated by multiple MCEs according to embodiment 5 of the present invention.

FIG. 24 is a diagram illustrating an MBSFN area administrated by multiple MCEs according to embodiment 5 of the present invention.

FIG. 24 shows how multiple cells in an MBSFN are provided with the same MCCH-related information in the distributed MCE architecture.

Figure 25:
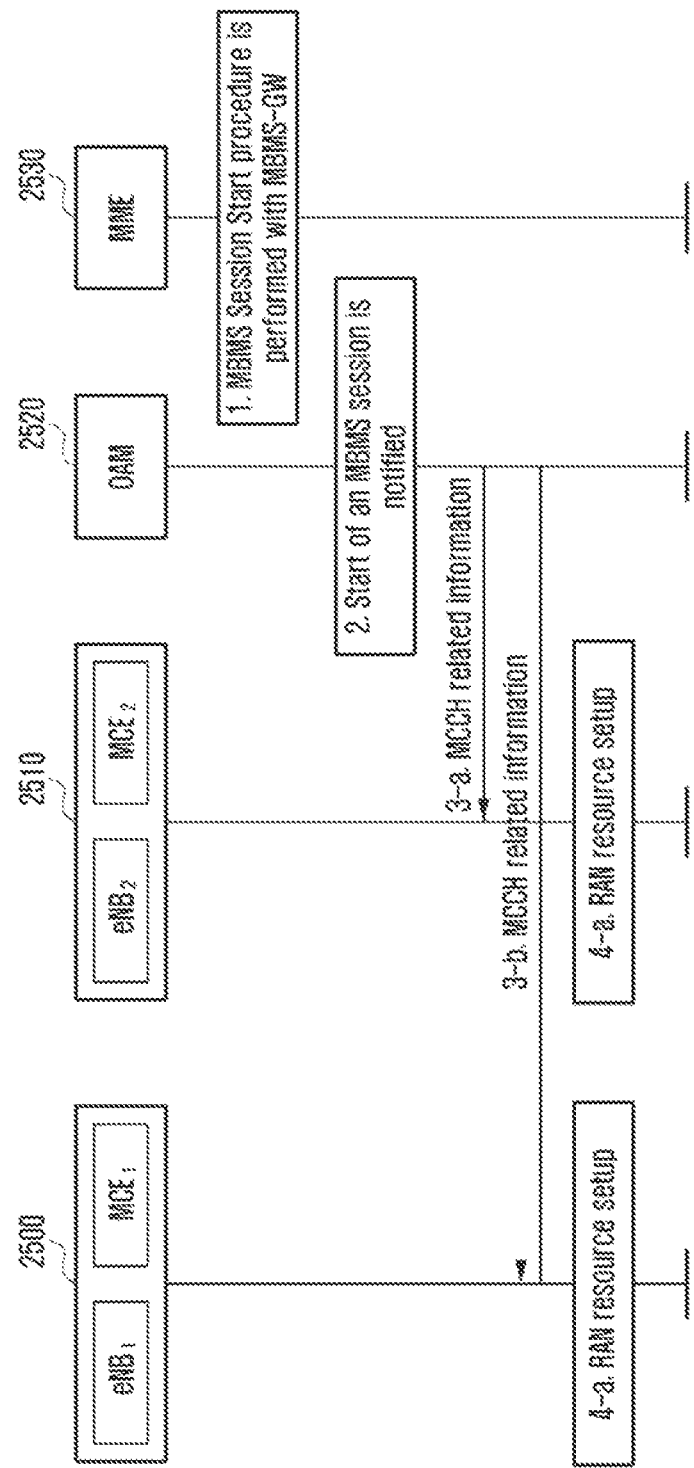
FIG. 25 is a diagram for explaining a dynamic coordination-based MBMS session start procedure according to embodiment 5 of the present invention.

FIG. 25 is a diagram for explaining a dynamic coordination-based MBMS session start procedure according to embodiment 5 of the present invention. In particular, FIG. 25 relates to an MBMS session start procedure in a case where multiple MCEs are managing an MBSFN area and the OAM dynamically provides MCCH-related information.

1. The MME 2530 and MBMS GW perform the MBMS session Start procedure.

2. The network management (OAM) 2520 is notified of the session start by the MME or the MCE from the MME or the MCE. The MBMS session attributes are provided to the OAM 2520, which generates the MCCH-related information based on the MBMS session attributes.

3. The OAM 2520 provides the E-UTRAN 2500 and 2510 with the MCCH-related information.

The OAM 2520 may send the MBMS session attributes received from the MME 2530 to the E-UTRAN. In this case, the MME 2530 may not send the MBMS Session Start request to the MCE through the M3 interface.

4. The E-UTRAN may set up RAN resources according to the information received from the OAM 2520.

Figure 26:
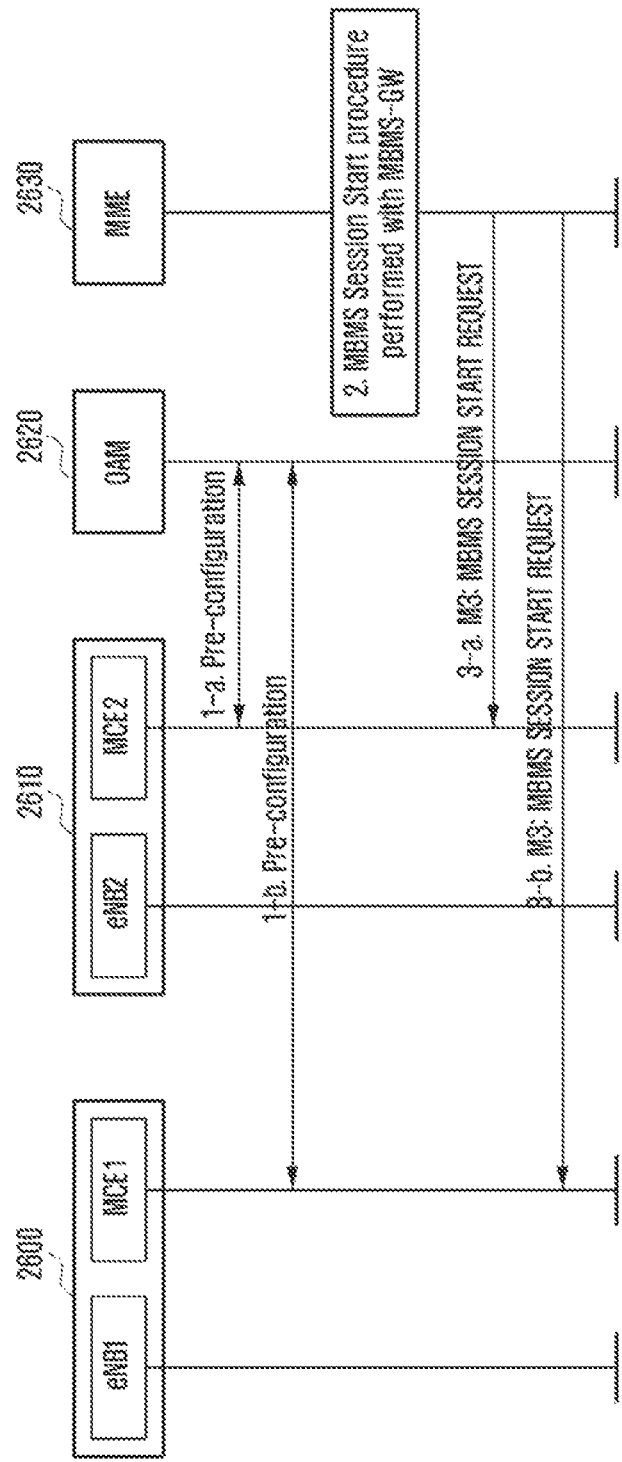
FIG. 26 is a diagram illustrating a static coordination-based MBMS session start procedure according to embodiment 5 of the present invention.

FIG. 26 is a diagram illustrating a static coordination-based MBMS session start procedure according to embodiment 5 of the present invention. In particular, FIG. 26 relates to an MBMS session start procedure in a case where multiple MCEs are managing an MBSFN area and the MCCH-related information is generated based on preconfigured static information.

1. Multiple MCEs are configured to manage one MBSFN area and, if receiving the same session attributes, generate the same MCCH-related information.

2. The MME 2630 and MBMS GW perform an MBMS Session Start procedure.

3. The MME 2630 sends an MBMS Session Start Request message to the MCEs. The MCEs generate the same MCCH-related information based on a value preconfigured at step 1.

MBMS Session Start procedure in case an MBSFN area is managed by multiple MCEs. Step 5 is followed by subsequent steps as follows (after MBMS Session Start procedure)

6. The MCE maps the SAI list included in the received message to a list of MBSFNs and removes unused MBSFNs from the corresponding ECGI list. The MCE allocates resources to the assigned or selected MBSFNs for the MBMS bearer. The MCE stores the Cell ID list (list of ECGIs) of the MBSFNs for which the MBMS bearer has been activated.

7. The MCE sends a Session Start Response message to the MME. This message may include 3GPP Release-12 MBMS-related parameters and the Cell ID list (List of ECGIs) of the cells for which the MBMS bearer has been activated by the Session start request.

8. The MME sends the Session Start response message to the MBMS-GW. This message may include 3GPP Release-12 MBMS-related parameters and the Cell ID list (List of ECGIs) of the cells for which the MBMS bearer has been activated by the Session start request.

9. The MBMS-GW sends the Session Start Response message to the BM-SC. This message may include 3GPP Release-12 MBMS-related parameters and the Cell ID list (List of ECGIs) of the cells for which the MBMS bearer has been activated by the Session start request.

10. The BM-SC sends an Activate MBMS Bearer Response message to the GCS-AS. This message includes TMGI, Flow ID (if included in the Activate MBMS Bearer Request message, the same value is included; or it is the Flow ID allocated by the BM-SC), MBMS service description, IP address and port number of the BM-SC for user data transmission plane, and expiration time. The MBMS service description includes MBMS bearer-related configuration information including at least of information as follows that is specified in TS26.346: MBMS service Area, radiofrequency, IP multicast address, APN, etc. If the BM-SC has allocated a TMGI, the expiration time indicates the expiration time of the corresponding TMGI. The BM-SC may include the service Area in the service description only in a predetermined case.

Up to Rel-12, it is not necessary to include the service area. This is because the BM-SC uses the MBMS ASI(s) provided by the GCS AS (as it is). The GCS-AS may include the MBMS ASI(s) included in the message transmitted at step 1 in the service description to be transmitted to the UE.

In Rel-13, it becomes necessary to include the service Area. This is because the BM-SC may derive new MBMS SAI(s) from the cell ID(s) received from the GCS AS (using the information configured to the BM-SC together). This MBMS SAI(s) may differ from the MBMS SAI(s) received from the GCS AS (furthermore, the GCS AS may transmit no MBMS SAI(s)). The GCS AS needs to know about the MBMS SAI(s) transmitted from the BM-SC to an MBMS downstream node. Thus, the BM-SC may send the MBMS SAI(s) delivered to the MBMS downstream node to the GCS AS, and the GCS SA sends the MBMS SAI(s) received from the BM-SC as part of the MBMS SAI(s) of the service description destined for the UE.

If the BM-SC has mapped the Cell ID list to the MBMS Service Area identity at step 2, the service description must include the list of the MBMS Service Area identity list that has been included in the MBMS Session Start message by the BM-SC. Alternatively, if the BM-SC has mapped the Cell ID list to the MBMS Service Area identity at step 2, the Service description must include the list of the MBMS Service Area Identity list mapped to the Cell ID list. Alternatively, if the BM-SC has received (but not mapped) the cell ID list at step 2, the service description must include the MBMS Service Area Identity list that has been included in the MBMS Session Start message by the BM-SC. Alternatively, if the BM-SC has received (but not mapped) the cell ID list at step 2, the Service description must include the MBMS Service Area Identity list mapped to the Cell ID list.

If the BM-SC sends the Activate MBMS Bearer Response message before the message of step 9 and if the list of ECGIs included in the message of step 9 differs from the list of ECGSs included in the message of step 1, the BM-SC may update the list of the ECGIs by sending a message including the list of ECGIs received at step 9 to the GCS-AS in order to notify the list of the ECGIs for which the MBMS bearer has been activated.

The eNB and the MME may exchange the information on the MCE served by the eNB using the following procedure and messages.

Figure 27:
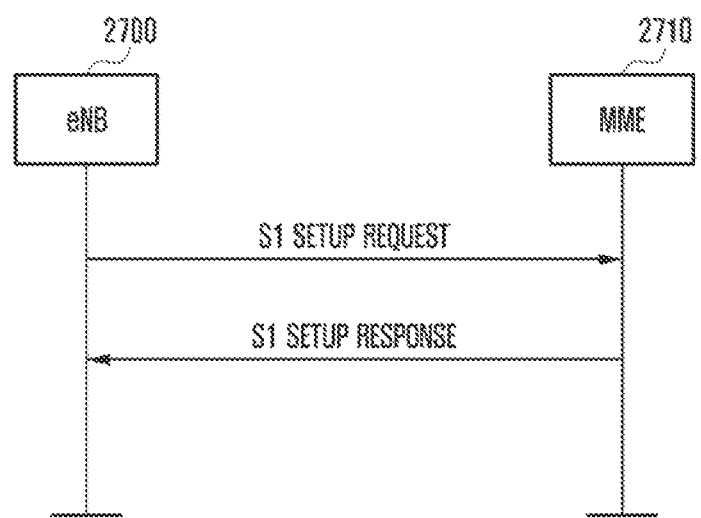
FIG. 27 is a diagram illustrating an S1 setup request procedure between an eNB and an MME according to embodiment 5 of the present invention.
Figure 28:
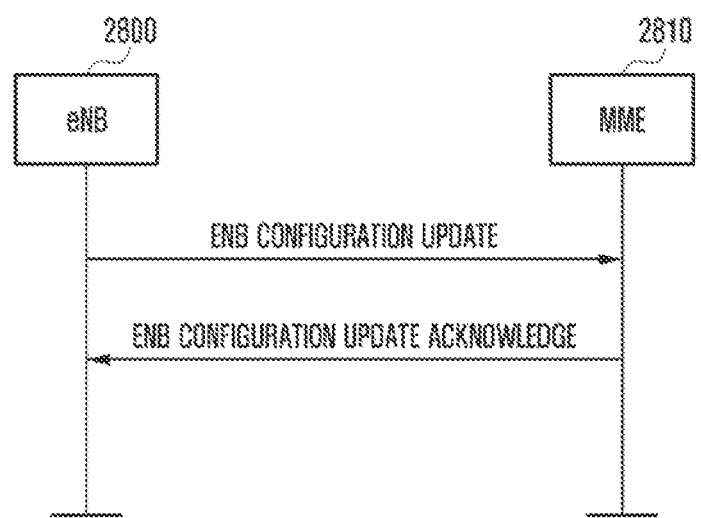
FIG. 28 is a diagram illustrating an eNB configuration update procedure between an eNB and an MME according to embodiment 5 of the present invention.

In embodiment 5, the S1 Setup and eNB Configuration Update procedures are performed as shown in FIGS. 27 and 28.

FIG. 27 is a diagram illustrating an S1 setup request procedure between an eNB and an MME according to embodiment 5 of the present invention.

In reference to FIG. 27, the eNB 2700 may send an S1 SETUP REQUEST to the MME 2710 and receive an SI SETUP RESPONSE from the MME 2710 in response to the SI SETUP REQUEST.

FIG. 28 is a diagram illustrating an eNB configuration update procedure between an eNB and an MME according to embodiment 5 of the present invention.

In reference to FIG. 28, the eNB 2800 may send an ENB CONFIGURATION UPDATE to the MME 2810 and receive an ENB CONFIGURATION UPDATE ACKNOWLEDGEMENT from the MME 2810 in response to the ENB CONFIGURATION UPDATE.

The S1 SETUP REQUEST message may be defined as follows.

| IE/Group Name | Presence | Range | IE type and reference | Semantics description | Critically | Assigned Critically |
|---|---|---|---|---|---|---|
| Message Type | M | | 9.2.11 | | YES | reject |
| Global eNB ID | M | | 9.2.1.37 | | YES | reject |
| eNB Name | O | | PrintableString (SIZE(1 . . . 150, . . . )) | | YES | ignore |
| Supported TAs | | 1. (maxnoofTACs( | | Supported TAs in the eNB. | GLOBAL | reject |
| >TAC | M | | 9.2.3.7 | Broadcasted TAC. | | |
| >Broadcast PLMNs | | 1. (maxnoofBPLMNs) | | Broadcasted PLMNs. | | |
| >>PLMN Identity | M | | 9.2.3.8 | | | |
| Default Paging DRX | M | | 9.2.1.16 | | YES | ignore |
| CSG Id List | | 0.1 | | | GLOBAL | reject |

| IE/Group Name | Presence | Range | IE type and reference | Semantics description | Critically | Assigned Critically |
|---|---|---|---|---|---|---|
| >CSG Id | M | 1 . <maxnoofCSGIds> | 9.2.1.62 | | | |
| Serving MCE | O | | 9.2.1.xx | | YES | ignore |

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |
| maxnoofMCEs | Maximum no. of MCEs. Value is 256. |

| IE/Group Name | Presence | Range | IE type and reference | Semantics description | Critically | Assigned Critically |
|---|---|---|---|---|---|---|
| Message Type | M | | 9.2.11 | | YES | reject |
| eNB Name | O | | PrintableString (SIZE(1 . . . 150, . . . )) | | YES | ignore |
| Supported TAs | | 0 . <maxnoofTACs> | | Supported TAs in the eNB. | GLOBAL | reject |
| >TAC | M | | 9.2.3.7 | Broadcasted TAC | | |
| >Broadcast PLMNs | | 1 . <maxnoofBPLMNs> | | Broadcasted PLMNs. | | |
| >>PLMN Identity | M | | 9.2.3.8 | | | |
| CSG Id List | | 0.1 | | | GLOBAL | reject |
| >CSG Id | | 1 . <maxnoofCSGIds> | 9.2.1.62 | | | |
| Default Paging DRX | M | | 9.2.1.16 | | YES | ignore |
| Serving MCE | O | | 9.2.1.xx | | YES | ignore |

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |

Meanwhile, the Global MCE ID may be defined as follows. This ID is used for M3 Setup between the MCE and MME or MCE Configuration update.

| IE/Group Name | Presence | Range | IE type and reference | Semantics description |
|---|---|---|---|---|
| PLMN Identity | M | | | |
| MCE ID | M | | OCTET STRING [SIZE[2]] | |
| MCE ID Extension | O | | OCTET STRING [SIZE[1]] | Extension of the Global MCE ID. |

Figure 29:
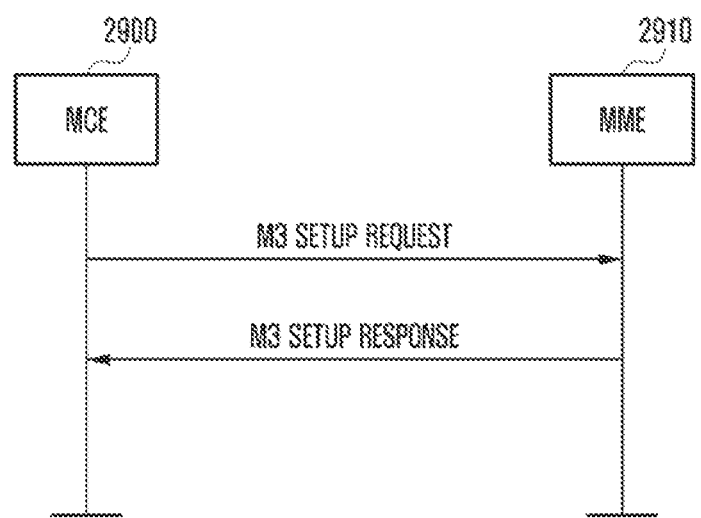
FIG. 29 is a diagram illustrating an S3 setup request procedure between an MCE and an MME according to embodiment 5 of the present invention.
Figure 30:
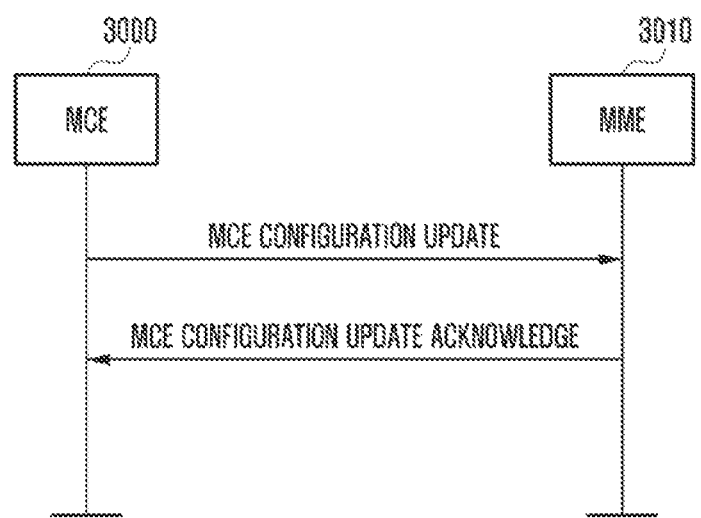
FIG. 30 is a diagram illustrating an MCE configuration update procedure between an MCE and an MME according to embodiment 5 of the present invention.

According to embodiment 5 of the present invention, the information on the eNB connected to the MCE may be exchanged between the MCE and MME using the procedures and messages as shown in FIGS. 29 and 30.

FIG. 29 is a diagram illustrating an S3 setup request procedure between an MCE and an MME according to embodiment 5 of the present invention.

In reference to FIG. 29, the MCE 2900 may send an S3 SETUP REQUEST to the MME 2910 and receive an S3 SETUP RESPONSE from the MME 2910 in response to the S3 SETUP REQUEST.

FIG. 30 is a diagram illustrating an MCE configuration update procedure between an MCE and an MME according to embodiment 5 of the present invention.

In reference to FIG. 30, the MCE 300 may transmit an MCE CONFIGURATION UPDATE to the MME 3010 and receive an MCE CONFIGURATION UPDATE ACKNOWLEDGEMENT from the MME 3010 in response to the MCE CONFIGURATION UPDATE.

The M3 Setup and MCE Configuration Update procedure are performed as follows.

| IE/Group Name | Presence | Range | IE type and reference | Semantics description | Critically | Assigned Critically |
|---|---|---|---|---|---|---|
| Message Type | M | | 9.2.11 | | YES | reject |
| Global eNB ID | M | | 9.2.1.37 | | YES | reject |
| eNB Name | O | | PrintableString (SIZE(1 . . . 150, . . . )) | | YES | ignore |
| MBMS Service Area List | | 1 | | | YES | reject |
| >MBMS Service Area List Item | | 1 to >maxnoofMBMS ServiceAreaIdentities PerMCE> | | Supported MBMS Service Area Identities in the MCE | GLOBAL | reject |
| >>MBMS Service Area 1 | M | | OCTET STRING(2) | MBMS Service Area Identities as defined in TS 23.003 [13]. | | |
| eNB list 혹은 cell list | | 1 to n | | | | |
| > Global eNB ID 혹은 ECGI | | | | | | |

| Range bound | Explanation |
|---|---|
| maxnoofMBMSService AreaIdentitiesPerMCE | Maximum no. of Service Area Identities per MCE. The value for maxnoofMBMSServiceAreaIdentities is 65536. |

Embodiment 6

Embodiment 6 proposes a method for allocating a high priority to the UE using a public safety (Public-Safety LTE) service such that an MCPTT UE is allocated resources preferentially in the EPS and establishes a connection preferentially for data transmission.

The public safety (Public Safety LTE: PS-LTE) provides a user with a public safety communication service using a mission critical push to talk over LTE (MCPTT) technology. The MCPTT is one of the technologies developed by 3GPP and provides functions of D2D group communication, person-to-person communication, emergency call, disaster alert, and ambient listening. In the present invention, the MCPTT is an example of public safety services and may mean all public safety-related services.

The MCPTT system includes a UE, an evolved packet system (EPS), a session initiation protocol (SIP) Core, and an MCPTT Application Server. The EPS may mean an LTE network, the SIP Core may mean a network composed of core network entities using the SIP such as Internet multimedia subsystem (IMS). The MCPTT system may be deployed in various topologies. The MCPTT operator may manage the SIP Core and MCPTT Application Server and interwork with another operator's EPS to provide the service. It may also be possible for the MCPTT operator to manage only the MCPTT Application Server and interwork with another operator's EPS and SIP Core to provide the service.

The MCPTT service may include a group call, a person-to-person call, and an emergency alert. The group call supports a normal call for public security, an emergency call with the highest priority for the case of an urgent/emergency situation, and an imminent peril call for the urgent/emergency situation with the priority lower than that of the emergency call. The person-to-person call supports the normal call, Emergency Call, and the ambient listening function for listening to the ambient sound around the counterpart. The emergency alert is a function capable of alerting the urgent/emergency situation to the MCPTT system or other MCPTT users.

The emergency call provided by the MCPTT supports the group call unlike the legacy emergency call; thus, the UE has to have the capability of receiving as well as transmitting an emergency call. The emergency call, imminent peril call, and emergency alert may be handled with priorities higher than that of the normal call in the EPS, SIP Core, and MCPTT Application Server. Thus, there are requirements of faster connection establishment and data exchange for such high priority calls in comparison with the other calls.

The present invention proposes a method for assigning a high priority to the UE using the public-safety network (MCPTT) in order for the MCPTT UE to be allocated resources and establish a connection preferentially for data transmission in the EPS. The current EPS-based emergency call service is designed in consideration of only the mobile originated situation without control over the emergency MCPTT service. However, the MCPTT service may have a high priority for dedicated-MCPTT UE network service in comparison with the normal service, and this requirement should be applied to the EPS. Also, since the MCPTT supports transmitting/receiving a group call or person-to-person call, the service can be supported in a mobile terminated situation where the MCPTT UE has to reply to an MCPTT call as well as in the mobile originated situation. The present invention proposes a method for allocating a high priority to an MCPTT UE connected to the MCPTT system and, as a consequence, radio resources and notifying the MCPTT system that the UE attempting to access the system is an MCPTT UE.

Throughout the specification, the term MCPTT denotes one of the PS-LTE services including the services called by different names but supporting the D2D group call, person-to-person call, and urgency/emergency call. In the present invention, the MCPTT may be called Public Safety service. The embodiments of the present invention may be applied to various radio communication systems such as WLAN and Bluetooth, as well as the communication system described herein, in a similar manner. In the present invention, the priority of the MCPTT service may be the priority allocated to one of the MCPTT services, e.g. emergency call service having the highest priority and imminent peril call service having the next highest priority. The present invention is directed to a method for allocating a priority to an MCPTT UE and notifying the EPS network that the UE is an MCPTT UE in a mobile originated scenario in which the MCPTT UE preferentially initiates a connection to the EPS network and a mobile terminated scenario in which the MCPTT UE receives a paging from the EPS network for preferentially triggering a connection. In the present invention, the MCPTT service is categorized into an MCPTT Normal Call as a basic MCPTT call, an Emergency Call with the highest priority, an Imminent Peril Call with the next highest priority, and an Ambient Listening for allowing listening to ambient sounds and an Emergency Alert with respective priorities.

Throughout the specification, the term EPS is the acronym of Evolved Packet System and interchangeably referred to as LTE network. The EPS is composed of an E-UTRAN including UEs and eNB and Evolved Packet Core (EPC) as a core network of the LTE system. The EPC is composed of MME, S-GW, P-GW, and PCRF. Throughout the specification, the EPS connects to the SIP Core for access to the MCPTT service, and the SIP Core may denote a network of the core network entities using the SIP or an IMS. Accordingly, an IMS entity such as P-CSCF specified in the specification denotes an SIP Core entity for MCPTT. Throughout the specification, the MCPTT Application Server denotes a network entity for exchanging application layer information and may be any of various logical/physical entities required for implementing the MCPTT service without being limited to the term "Application Server".

Figure 31:
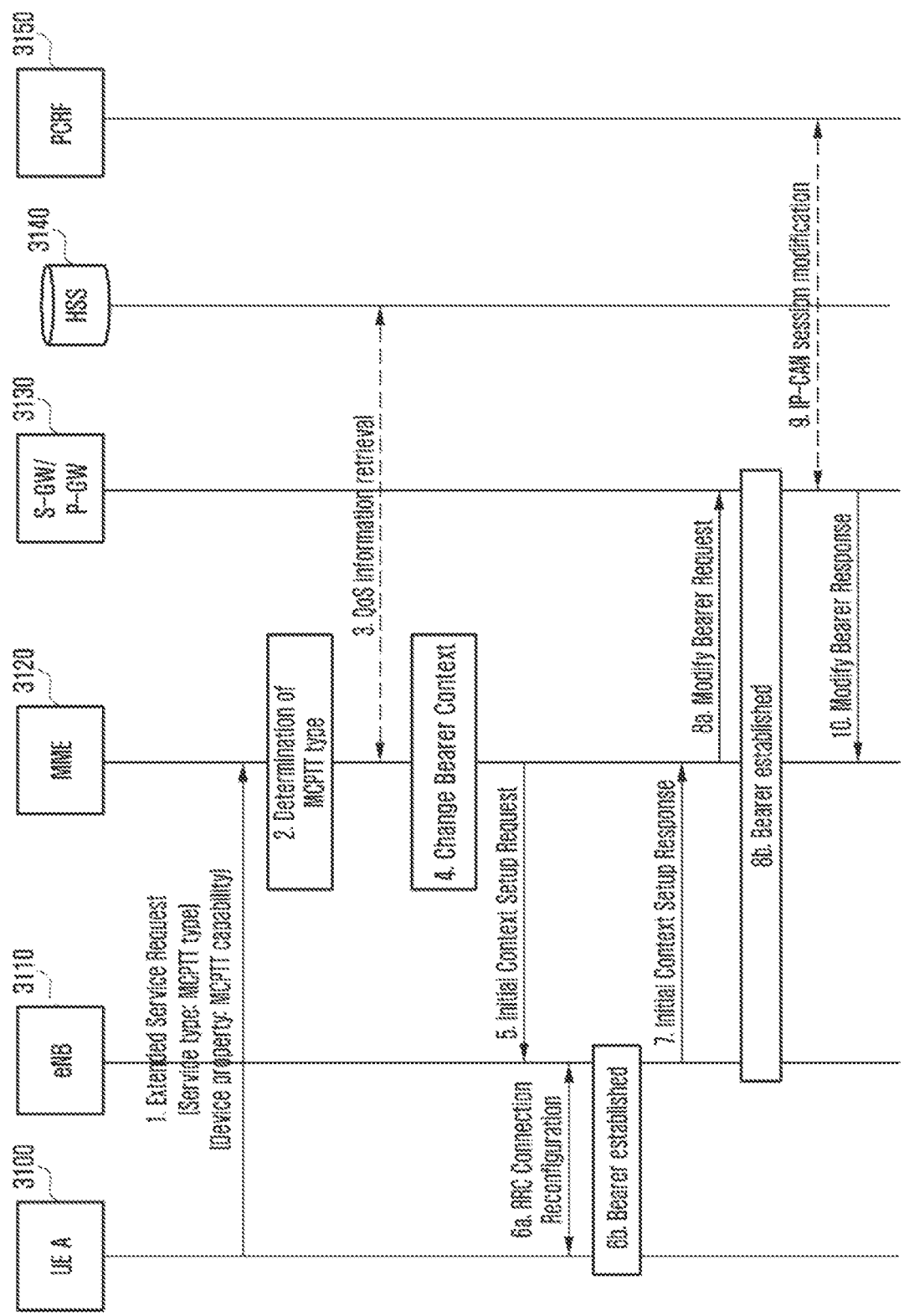
FIG. 31 is a diagram illustrating a method and procedure for an MCPTT UE to transmit an MCPTT Service Request to an MME and for the MME to update and configure a Bearer Context according to embodiment 6 of the present invention.

FIG. 31 is a diagram illustrating a method and procedure for an MCPTT UE to transmit an MCPTT Service Request to an MME and for the MME to update and configure a Bearer Context according to embodiment 6 of the present invention.

FIG. 31 shows an embodiment of the present invention in which the MCPTT UE 3100 sends the MME 3120 an Extended Service Request for establishing an MCPTT connection to the EPS network such that a bearer with the priority for the MCPTT is established to use radio resources.

FIG. 31 is a diagram illustrating a method and procedure for an MCPTT UE 3100 to transmit an MCPTT Service Request to the MME 3120 to configure a bearer with a QoS suitable for MCPTT. The MCPTT UE 3100 may be categorized into one of a UE using the MCPTT service, if necessary, while using the normal LTE service and an MCPTT service-dedicated UE.

In the present invention, the UE that is capable of using the normal service and MCPTT service is referred to as MCPTT-enabled UE, the UE that is capable of receiving only the MCPTT service as a dedicated MCPTT UE, and both the types of UEs are referred to as an MCPTT UE in a collective meaning, for convenience of purpose.

1. The MCPTT UE 3100 has to activate a bearer of the EPS network for use of the MCPTT service and thus sends the MME 3120 an Extended Service Request message for triggering the EPS bearer establishment. The Extended Service Request message includes a Service Type Field that the MCPTT UE may set to a value indicating the MCPTT service type. The MCPTT-enabled UE that is receiving the normal service may make an MCPTT service request upon detection of a public safety situation or request for public safety communication. At this time, the Service Type Field is set to a value indicating MCPTT service. The dedicated-MCPTT UE may also set the Service Type Field to a value indicating MCPTT service.

The Service Type Field may be set to a value indicating MCPTT service collectively or one of MCPTT services categorized according to the MCPTT emergency situation. The field may also be set to a value indicating a detailed MCPTT service such as MCPTT Group Call, MCPTT Emergency Call, MCPTT Imminent Peril Call, MCPTT Emergency Alert, Ambient Listening, and Private Call.

The MCPTT Emergency Call may be subcategorized into MCPTT Emergency Group Call for group communication and MCPTT Emergency Private Call for peer-to-peer communication. The MCPTT UE may set the Device Property field of the Extended Service Request to a value for explicitly indicating that the UE is an MCPTT UE.

The dedicated-MCPTT UE may set the Device Property field of the Extended Service Request to a value for explicitly indicating that the UE is a dedicated MCPTT UE. In this case, the MME may assume that the corresponding UE has the MCPTT service capability based on only the Device Property field without the Service Type field.

The Device Property field may indicate the MCPTT service capability and may be set to a value indicative of the MCPTT UE collectively or a UE using one of subcategorized MCPTT Emergency call services. In more detail, the Device Property field may be set to a value indicative of one of the MCPTT services such as MCPTT Emergency Call, MCPTT Imminent Peril Call, MCPTT Ambient Listening, and MCPTT Private call. In the case that the Service Type or Device Property field is set to a value indicative of an MCPTT Emergency service, the detailed MCPTT Emergency service may vary depending on the EPS network operator or MCPTT service provider.

In order to make a resource request to the EPS network, the MCPTT UE 3100 may use the Extended Service Request message for the MCPTT Emergency service or a Service Request message for normal MCPTT service. If the Extended Service Request message is received, the MME checks at least one of the Service Type and Device Property fields of the Extended Service Request message to determine the MCPTT service to provide. The MME may check whether the UE that wants to receive the MCPTT service is an MCPTT-enabled UE that is receiving the normal service or a dedicated-MCPTT UE, and the MME may accept the request from the UE based on the UE context stored in its storage.

2. The MME 3120 may also check whether the service requested by the UE is the general MCPTT service or one of the MCPTT services, i.e. Emergency Call, Imminent Peril Call, Ambient Listening, Private Call, and Emergency Alert. The MME may also determine that the MCPTT Emergency service is requested and apply specific QoS corresponding to the MCPTT Emergency service.

3. After checking the MCPTT service that the MCPTT UE 3100 wants to use or can use, the MME may inquire to the HSS 3140 about QoS information to be provided to the UE for use of a specific MCPTT service. The QoS information may include a QCI value for QoS priority identification and an ARP value indicative of the priority for preoccupying resources. The MME 3120 stores the acquired information as an internal configuration value or MME Emergency Configuration Data for use in the subsequent part of the procedure.

The procedure between the MME 3120 and HSS 3140 may be omitted and, in this case, the QoS value is determined according to the internal configuration value stored in the MME 3120. The internal configuration value stored in the MME 3120 may be the value stored as a part of the MME Emergency Configuration Data.

4. The MME 3120 determines the QoS upon receipt of the Extended Service Request message transmitted by the MCPTT UE 3100 and updates the default bearer context of the UE to obtain the QoS value suitable for the MCPTT.

For example, if it is determined to provide the MCPTT Emergency service to the MCPTT UE that has transmitted the Extended Service Request, the MME 3120 updates the Default Bearer Context with the corresponding QCI or ARP value. The MME 3120 stores the information indicating internally that the bearer configured in the above procedure is the bearer for public safety.

5. The MME 3120 updates the default bearer context of the MCPTT UE 3100 to match the MCPTT service, emergency service, or detailed MCPTT service and then sends an Initial Context Setup Request message to the eNB 3110 to request to establish a bearer with the UE according to the updated bearer context.

6. Upon receipt of the Initial Context Setup Request message from the MME 3120, the eNB 2110 prepares for establishing a bearer according to the bearer context, i.e. QoS information, contained in the Initial Context Setup Request message and sends the UE 3100 an RRC Connection Reconfiguration message to establish a bearer between the UE 3100 and eNB 3110.

7. After the bearer is established with the UE 3100, the eNB 3110 sends the MME 3120 an Initial Context Setup Response message to notify that the bearer ID of the bearer has been established based on the QoS configured by the MME 3120 in response to the Initial Context Setup Request message. In the above procedure, the eNB 3110 may store the information indicating that the bearer for public safety is allocated to the UE 3100 and perform radio resource allocation and data transfer by allocating a high priority to the bearer for the public safety in comparison with the priority allocated to other normal services based on the stored information.

8. After receiving the Initial Context Setup Response message, the MME 3120 sends the S-GW/P-GW 3130 a Modify Bearer Request message for connection between the eNB 3110 and the S-GW/P-GW 3130 and, as a consequence, establishes a bearer connection between the eNB 3110 and S-GW/P-GW 3130. The bearer connection established between the UE 3100 and S-GW/P-GW 3130 via the eNB 3110 is the connection having the QoS value configured by the MME 3120 to match with the MCPTT Type during the above procedure. The eNB 3110, MME 3120, or S-GW/P-GW 3130 may internally bind that the corresponding bearer is the bearer for public safety.

Since it may be known that the bearer has QCI and APR values of QoS higher than that of the default bearer in use or the corresponding bearer is the bearer for public safety based on the internal binding, the eNB 3110 or S-GW/P-GW 3130 may transfer data with a priority higher than that of other bearers. After the bearer connection has been established, the P-GW 3030 sends the PCRF the newly established bearer and UE information to update a PCC rule for use in charging and providing services.

In order to transmit the Extended Service Request message, the UE 3100 establishes an RRC connection with the eNB 3110. The NAS layer of the UE 3100 configures a value of RRC Establishment Cause and sends the value to the RRC layer of the UE 3100 during the RRC connection establishment between the UE 3100 and the eNB 3110. The RRC Establishment Cause indicates one of Mobile Originated Signaling, Mobile Originated Data, Mobile Terminated Signaling, and Mobile Terminated Data.

Afterward, the RRC layer of the UE 3100 generates an RRC message and sends the eNB 3110 a connection request.

The present invention proposes an identifier indicating Public Safety in the RRC Establishment Cause. This may indicate one of Mobile Originated Public Safety Signaling, Mobile Originated Public Safety Data, Mobile Terminated Public Safety Signaling, and Mobile Terminated Dedicated-MCPTT UE data, or indicate Public Safety collectively. Regardless of the name of the identifier, it includes an RRC connection request cause value indicating a public safety service (including MCPTT).

In the case that the RRC establishment cause is configured as above, the UE 3100 may avoid congestion control between the UE 3100 and eNB 3110 (overriding congestion control) or Access Class barring between the UE and eNB (Application level congestion control for data communication (ACDC)).

The eNB 3110 stores the information indicating that the UE 3100 transmitting the request with a cause value as public safety UE so as to handle the UE preferentially, when handover is required, in comparison with other UEs.

Figure 32:
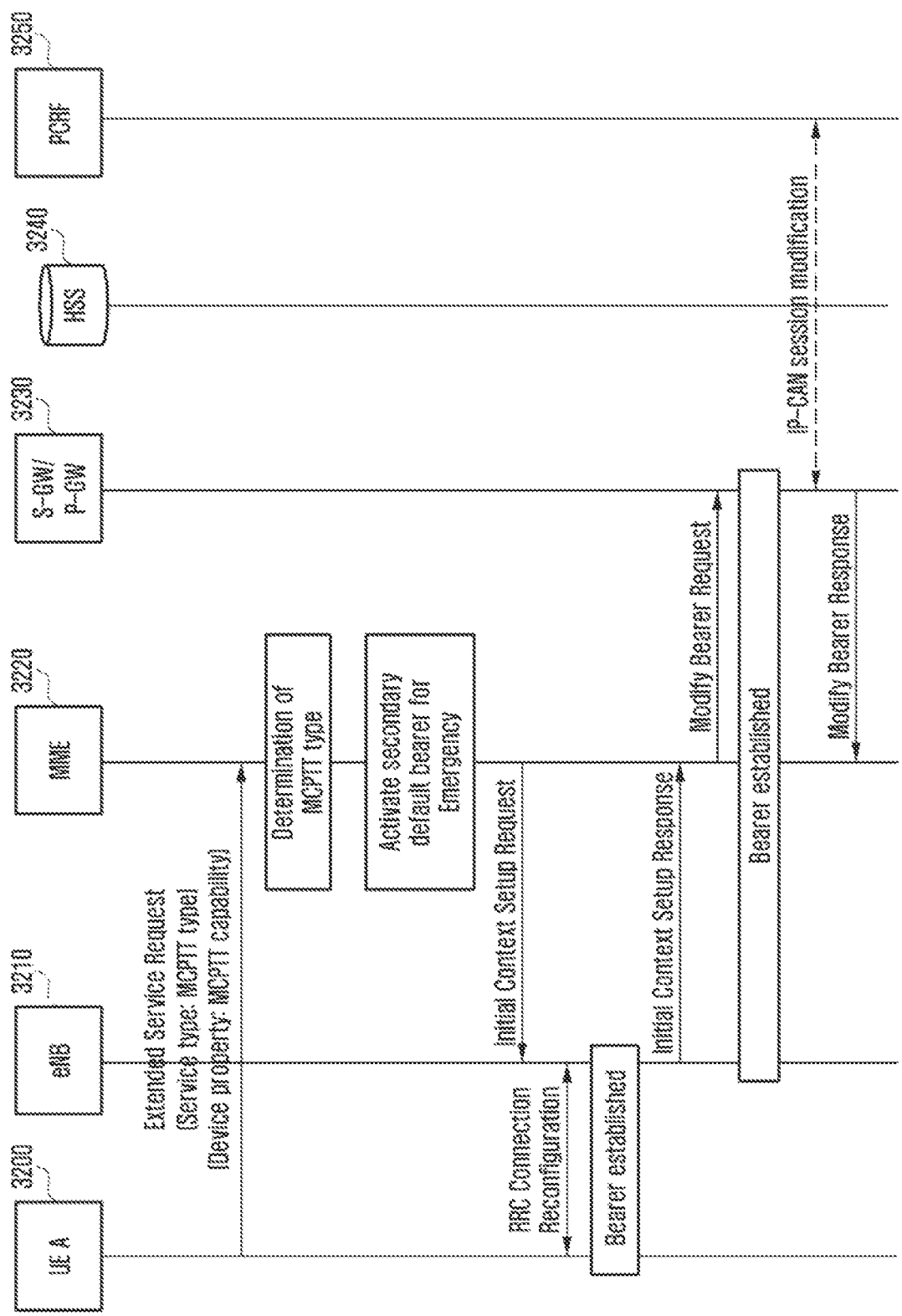
FIG. 32 is a diagram illustrating a method and procedure for an MCPTT UE to transmit an MCPTT service Request to an MME and for the MME to update and configure a Second bearer context according to embodiment 6 of the present invention.

FIG. 32 is a diagram illustrating a method and procedure for an MCPTT UE to transmit an MCPTT service Request to an MME and for the MME to update and configure a Second bearer context according to embodiment 6 of the present invention.

FIG. 32 shows an embodiment of the present invention in which the MCPTT UE 3200 sends the MME 3220 an Extended Service Request for establishing an MCPTT connection to the EPS network such that a bearer with the priority for the MCPTT is established to use radio resources.

Although the term Emergency is used to mean MCPTT services collectively in FIG. 32, it is obvious that the term Emergency may indicate the MCPTT Emergency or a detailed MCPTT service. Also, it is obvious that the term Emergency may indicate the Public Safety service.

The MCPTT UE 3200 has to establish an EPS bearer for use of the MCPTT service and thus send the MME 3220 an Extended Service Request message for triggering the EPS bearer establishment. The Extended Service Request message may include a Service Type Field that the MCPTT UE may set to a value indicating the MCPTT service type. The MCPTT UE that is receiving the normal service may make an MCPTT service request upon detection of a public safety situation or when a public safety call is required.

At this time, the Service Type Field is set to a value indicating MCPTT service type. A dedicated-MCPTT UE may also set the Service Type Field to indicate the MCPTT service. The Service Type Field may be set to a value indicating MCPTT service collectively or one of MCPTT services categorized according to the MCPTT emergency situation. The sub-MCPTT services may include MCPTT Group Call, MCPTT Emergency Call, MCPTT Imminent Peril Call, MCPTT Emergency Alert, Ambient Listening, and Private Call. The MCPTT Emergency Call may be subcategorized into MCPTT Emergency Group Call for group communication and MCPTT Emergency Private Call for peer-to-peer communication. The MCPTT UE may notify that it is an MCPTT-enabled UE explicitly by setting a Device Property field of the Extended Service Request message to a value indicative of the MCPTT-enabled UE. The dedicated-MCPTT UE may notify that it is a dedicated-MCPTT UE explicitly by setting the Device Property field of the Extended Service Request message to a value indicative of the dedicated-MCPTT UE. In this case, the MME may recognize that the corresponding UE has the MCPTT service capability based on only the Device Property field without the Service Type field.

The Device Property field indicates the MCPTT service capability and may be set to a value indicative of the MCPTT-enabled UE collectively or one of categorized MCPTT Emergency call service-enabled UEs.

In more detail, the Device Property field may be set to a value indicative of one of the MCPTT services such as MCPTT Emergency Call, MCPTT Imminent Peril Call, MCPTT Ambient Listening, and MCPTT Private call. In the case that the Service Type or Device Property field is set to a value indicative of an MCPTT Emergency service, the detailed MCPTT Emergency service may vary depending on the EPS network operator or MCPTT service provider.

In order to make a resource request to the EPS network, the MCPTT UE 3200 may use the Extended Service Request message for the MCPTT Emergency service or a Service Request message for the normal MCPTT service. Upon receipt of the Extended Service Request message, the MME 3220 checks at least one of the Service Type and Device Property fields of the Extended Service Request message to determine the MCPTT service to provide. The MME may also check whether the UE that wants to receive the MCPTT service is an MCPTT-enabled UE that is receiving the normal service or a dedicated-MCPTT UE and accept the request from the UE based on the UE context stored in its storage.

The MME 3220 may also check whether the service requested by the UE is the general MCPTT service or one of the MCPTT services, i.e. Emergency Call, Imminent Peril Call, Ambient Listening, Private Call, and Emergency Alert. The MME may also determine the request for use of the MCPTT Emergency service and apply a specific QoS corresponding to the Emergency service.

This embodiment is different from the embodiment of FIG. 31 in that the MME 3320 has the Secondary Default Bearer Context for MCPTT to allocate a bearer matching the QoS for MCPTT when requesting for the MCPTT service under the assumption that the UE 3220 has the MCPTT capability.

Whether the UE 3200 supports the MCPTT service is handled in an alternative embodiment of the present invention. If the UE 3200 having the MCPTT capability attaches to the network, the MME 3220 may determine whether the UE is an MCPTT-enabled UE supporting both the MCPTT service and normal service or a dedicated-MCPTT UE capable of supporting only the MCPTT service based on the value of the MCPTT capability.

After performing the attach procedure of the MCPTT-enabled UE or dedicated-MCPTT UE, the MME 3220 configures a secondary default bearer context with the QoS value for MCPTT in preparation for MCPTT service request.

The secondary default bearer context may be the context for general MCPTT, the context for MCPTT Emergency, or the context for one of the subcategorized Emergency Call, Imminent Peril Call, Ambient Listening, Private Call, and Emergency Alert.

Although there may be multiple candidates of the secondary default context, a default bearer context is configured for the MCPTT service request that differs from the legacy default bearer context; thus, the context is referred to as secondary default bearer context, and it is obvious that the term "secondary" does not mean any specific order of a context stored in the MME. The secondary default bearer context includes a corresponding QCI or ARP value.

If the Extended Service Request message is received from the MCPTT UE 3200, the MME 3220 checks the MCPTT Type to determine whether the UE 3200 has the capability for the service. Afterward, the MME 3220 selects the bearer context matching the MCPTT type requested by the UE 3200 among the bearer contexts as the Secondary bearer context and initiates bearer connection establishment that matches with the QoS included in the context.

The MME 3220 sends the Initial Context Setup Request message to the eNB based on the secondary default bearer context. If the Initial Context Setup Request message is received from the MME 3220, the eNB 3210 prepares for establishing a bearer based on the bearer context, i.e. QoS information, contained in the Initial Context Setup Request message and sends an RRC Connection Reconfiguration message to the MCPTT UE 3200 to establish the bearer between the UE and eNB.

After the bearer connection is established with the UE 3200, the eNB 3210 sends the MME 3220 an Initial Context Setup Response message to notify the bearer ID of the bearer established based on the QoS configured by the MME 3220 in response to the Initial Context Setup Request message.

If the Initial Context Setup Response message is received, the MME 3220 sends the S-GW/P-GW 3230 a Modify Bearer Request message for connection between the eNB 3210 and S-GW/P-GW 3230 and, as a consequence, a bearer connection is established between the eNB 3210 and S-GW/P-GW 3230.

The bearer connection established between the UE 3200 and S-GW/P-GW 3230 via the eNB 3210 is a connection having the QoS value configured by the MME in match with the MCPTT Type during the above procedure for transmitting data preferentially in comparison with data on other bearers.

The eNB 3210, MME 3220, or S-GW/P-GW 3230 may internally bind that the corresponding bearer is the bearer for public safety. Since it may be known that the bearer has QCI and APR values of QoS higher than that of the default bearer in use or the corresponding bearer is the bearer for public safety based on the internal binding, the eNB 3210 or S-GW/P-GW 3230 may transfer data with a priority higher than that on other bearers. After the bearer connection establishment has been completed, the P-GW 3230 sends the PCRF the newly established bearer and UE information to update a PCC rule for use in charging and service provision.

Figure 33:
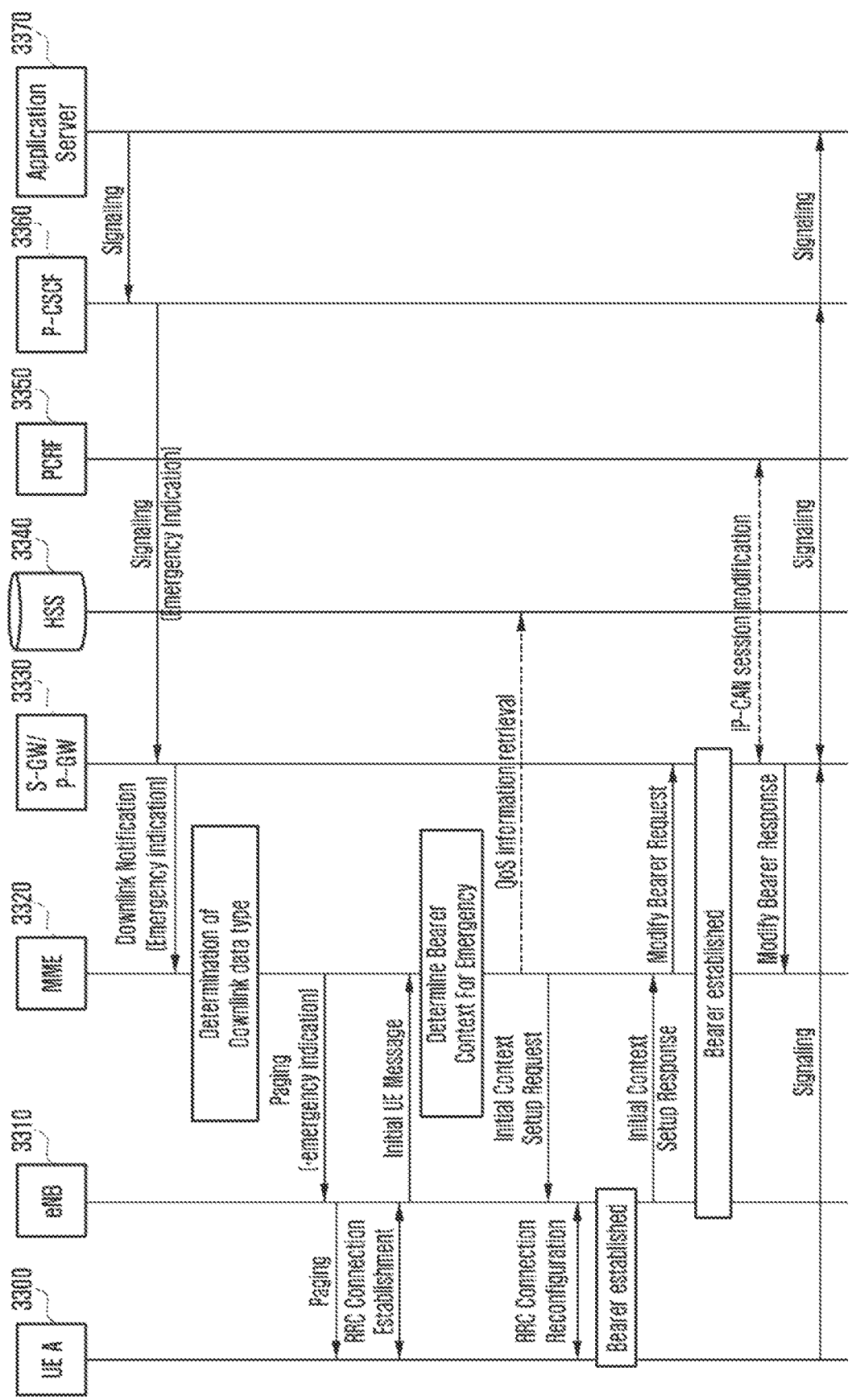
FIG. 33 is a diagram illustrating a procedure for an MCPTT UE 3330 to receive a paging for an MCPTT service preferentially for receiving data arriving with a high priority and establish a bearer preferentially as the result of the paging according to an embodiment of the present invention.

FIG. 33 is a diagram illustrating a procedure for EPS entities to handle a paging for an MCPTT UE preferentially and establish a bearer connection for providing the UE with an MCPTT service according to embodiment 6 of the present invention.

FIG. 33 is a diagram illustrating a procedure for an MCPTT UE 3330 to receive a paging for an MCPTT service preferentially to receive data arriving with a high priority and establish a bearer preferentially as the result of the paging according to an embodiment of the present invention.

Although the term Emergency is used in FIG. 33, it is obvious that the term may be intended to denote the MCPTT service in general or MCPTT Emergency or a subcategorized MCPTT service. The UE may receive the MCPTT service in the IDLE Mode. At this time, the MCPTT service data is transmitted from the MCPTT Application Server to the P-CSCF. The P-CSCF may determine whether to preferentially process the signal that arrived from the MCPTT Application Server. It may be possible to allocate a high priority to the MCPTT services collectively or the MCPTT Emergency service or service-specific priorities to the detailed MCPTT services such as Emergency Call, Imminent Peril Call, Ambient Listening, Private Call, and Emergency Alert.

The P-CSCF 3360 sends the P-GW 3330 the signal that arrived from the MCPTT Application Server, the signal including the information indicating that the signal has a priority.

Alternatively, the P-CSCF 3360 may request to the PCRF 3350 for allocating a high priority to the data that arrived from the IP address of the MCPTT Application Server 3370, and the PCRF 3350 may request to the P-GW 3330 for reflecting the high priority to the data that arrived from the IP address of the MCPTT Application Server 3370 using the PCC Rule with or without updating the policy.

The P-GW 3330 may detect the arrival of a signal with a high priority through the above procedure. In the case of not following the above procedure, when the MCPTT UE 3300 attaches, the P-GW 3330 may have stored information indicating that the UE 3300 is a dedicated-MCPTT UE and, if there is downlink data to transmit to the corresponding UE, performs paging with a high priority.

The P-GW 3330 sends the MME 3320 a Downlink Notification message for paging the UE. The P-GW 3330 may add an identifier to the downlink notification message for identifying the MCPTT, MCPTT Emergency, or detailed MCPTT service.

In order to send the identifier using the downlink notification message, it may be possible to set an Indication flag of the Downlink Notification message to a value indicating the MCPTT service, MCPTT Emergency, or detailed MCPTT service, or set the ARP of the Downlink Notification message to a value indicating the MCPTT service, MCPTT Emergency, or detailed MCPTT service, or set the Paging and Service Information of the Downlink Notification message to a value indicating MCPTT, MCPTT Emergency, or detailed MCPTT service.

On the basis of the received Downlink Notification message, the MME 3320 may determine that the data type of the downlink data is MCPTT, MCPTT Emergency, or detailed MCPTT service.

In the case of not following the above procedure, when the MCPTT UE 3300 attaches, the MME 3320 may have information indicating that the UE 3300 is a dedicated-MCPTT UE and page the corresponding UE 3300 with a high priority.

Afterward, the MME 3320 sends the eNB 3310 a paging message having the information indicating that the paging message is transmitted for MCPTT, MCPTT Emergency, or detailed MCPTT service so as to be processed preferentially.

For this purpose, the MME 3320 may set the Paging Priority of the paging message to a value matching the MCPTT service, MCPTT Emergency, or detailed MCPTT service. On the basis of the paging message, the eNB 3310 may determine that the paging message should be processed with a priority higher than that of other paging messages.

The MCPTT UE 3300 receives the paging and responds to the eNB 3310, and the eNB 3310 sends the MME 3320 an Initial UE message upon receipt of the response from the MCPTT UE 3300 to request for bearer connection establishment with the MCPTT UE 3300.

On the basis of the received Initial UE message, the MME 3320 may determine that the UE that has received the paging message with the priority is requesting for bearer connection. The MME 3320 determines the context of the bearer allocated to the MCPTT UE and sets the QoS to a value matching the MCPTT service, MCPTT Emergency, or detailed MCPTT service.

After determining and authenticating the MCPTT service in which the MCPTT UE 3300 is interested, the MME 3320 inquires to the HSS about QoS information to be provided to the UE for use of a specific MCPTT service.

The QoS information may include a QCI value for identifying the QoS priority and an ARP value indicating whether it is possible to preoccupy the resources. The MME 3320 may store the obtained information as an internal configuration value or part of the MME Emergency Configuration Data for use in the subsequent part of the procedure. The procedure between the MME 3320 and HSS 3340 may be omitted and, in this case, the QoS value is determined according to the internal configuration value stored in the MME 3320.

The internal configuration value stored in the MME 3320 may be the value stored as a part of the MME Emergency Configuration Data. The MME 3320 determines the QoS for the bearer to be allocated to the MCPTT UE 3300 and updates the default data context of the UE 3300 with the QoS value matching the MCPTT service.

For example, if it is determined to provide the MCPTT Emergency service to the MCPTT UE 3300 that has transmitted the Extended Service Request, the MME 3320 updates the Default Bearer Context with the corresponding QCI or ARP value.

In an alternative embodiment of the present invention, the MME 3320 activates the Secondary Default Bearer Context stored for MCPTT. Afterward, the MME 3320 sends the eNB 3310 an Initial Context Setup Request message to request for bearer connection establishment with the UE 3300 according to the configured bearer Context.

Upon receipt of the Initial Context Setup Request message from the MME 3320, the eNB 3310 prepares for establishing a bearer according to the bearer context, i.e., QoS information, contained in the Initial Context Setup Request message and sends the UE 3300 an RRC Connection Reconfiguration message to establish a bearer between the UE 3300 and eNB 3310.

After the bearer is established with the UE, the eNB 3310 sends the MME 3320 an Initial Context Setup Response message to notify the MME 3320 of the bearer ID of the bearer established based on the QoS configured by the MME 3320 in response to the Initial Context Setup Request message. If the Initial Context Setup Response message is received, the MME 3320 sends the S-GW/P-GW 3330 a Modify Bearer Request message for connection between the eNB 3310 and the S-GW/P-GW 3330 and, as a consequence, establishes a bearer connection between the eNB 3310 and S-GW/P-GW 3330.

The bearer connection established between the UE 3300 and S-GW/P-GW 3330 via the eNB 3320 is the connection having the QoS value configured by the MME 3320 to match with the MCPTT Type so as to have a priority higher than that of other bearers. After the bearer connection is established, the P-GW 3330 sends the PCRF 3350 the newly established bearer and UE information to update a PCC rule for use in charging and serving provision. Once the bearer connection is established, the MCPTT UE 3300 can receive the MCPTT service with the high priority in response to the request for the MCPTT service.

Figure 34:
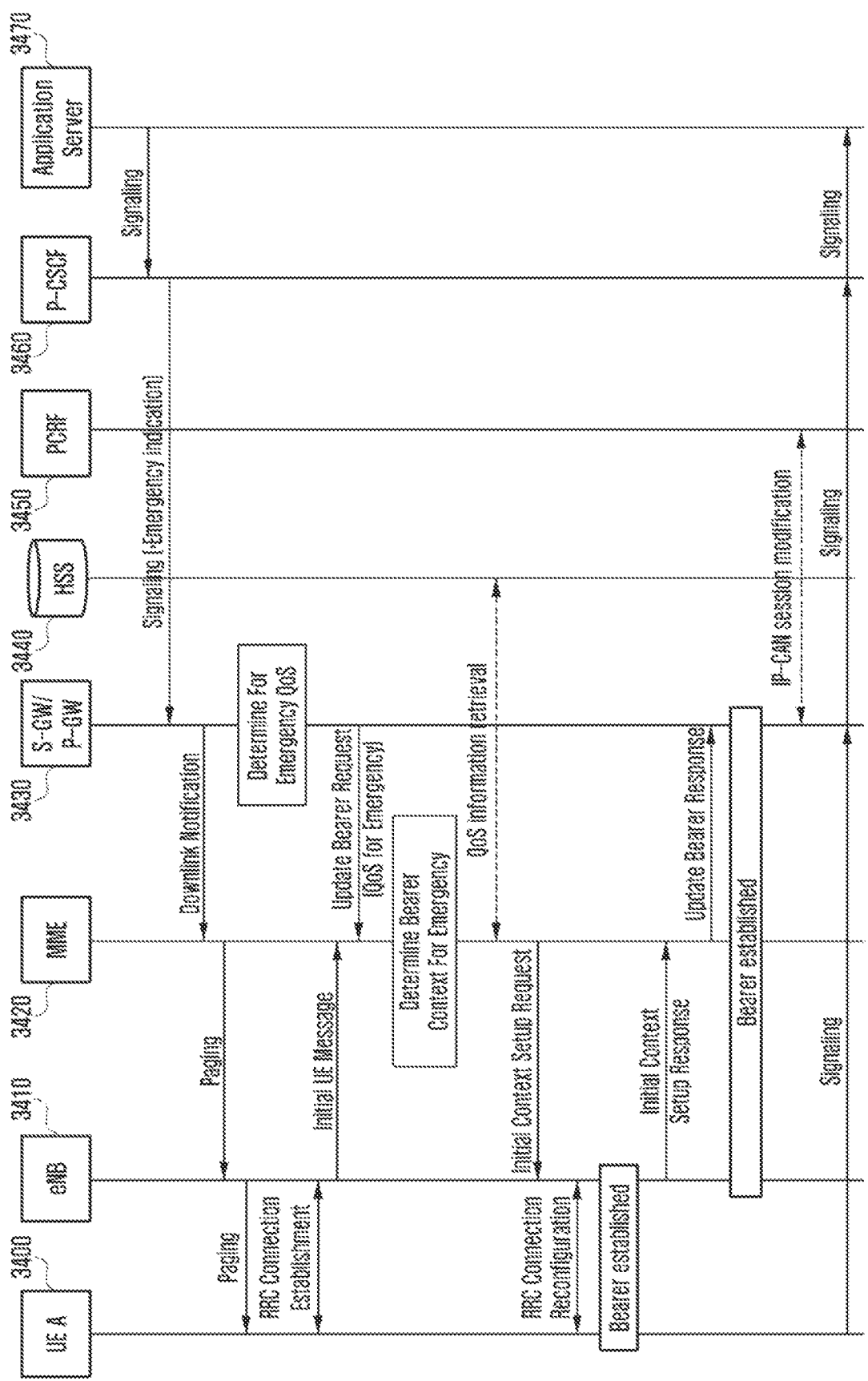
FIG. 34 is a diagram illustrating a procedure for EPS entities to handle a paging for an MCPTT UE preferentially and establish a bearer connection for providing the UE with an MCPTT service preferentially according to embodiment 6 of the present invention.

FIG. 34 is a diagram illustrating a procedure for EPS entities to handle a paging for an MCPTT UE preferentially and establish a bearer connection for providing the UE with an MCPTT service preferentially according to embodiment 6 of the present invention.

The embodiment of FIG. 34 is identical with the embodiment of FIG. 33 in that the P-GW 3430 receives MCPTT signaling from the P-CSCF 3460. Although the term Emergency is used in FIG. 34, it is obvious that the term may denote MCPTT services collectively, MCPTT Emergency, or a subcategorized MCPTT service.

This embodiment proposes a procedure in which the P-GW 3430 receives a signal with a priority and requests for establishment of a bearer connection with the priority. The bearer connection with the priority may denote a bearer connection with a high QoS for MCPTT service, MCPTT Emergency service, or detailed MCPTT service.

If a signal with the high priority is received from the P-CSCF 3460, the P-GW 3430 sends the MME 3420 a paging message and determines the QoS of the new bearer with the priority matching the high priority.

In the case of not following the above procedure, the P-GW 3430 may have stored information indicating that the UE 3440 is a dedicated-MCPTT UE and, if there is downlink data to transmit to the corresponding UE 3400, determines to apply a QoS value of the high priority to the new bearer.

After determining the QoS, the P-GW 3430 sends the MME 3420 an Update Bearer Request message including the QoS value having the high priority determined in the above procedure via the S-GW 3430. Upon receipt of the message, the MME 3420 determines the bearer context to be allocated to the MCPTT UE 3400 based on the information included in the message.

In the case of not following the above procedure, the MME 3420 may store the information indicating that the UE 3400 is a dedicated-MCPTT UE, when the UE 3400 attaches, pages the corresponding UE 3400 with the high priority. The MME 3420 may update the default bearer context to establish a bearer connection having the high priority and, in this case, the procedure may follow embodiment 1 of the present invention.

Alternatively, it may be possible to activate the stored secondary default bearer context to establish a bearer connection and, in this case, the procedure follows embodiment 2.

Alternatively, the MME 3420 may establish a dedicated bearer connection matching the high priority. In this case, both the default bearer connection and dedicated bearer connection are established, and the MCPTT UE 3400 may receive the MCPTT service over the dedicated bearer.

Alternatively, the MME 3420 may establish a bearer connection and, in this case, all of the bearer contexts are deactivated, and a new bearer is established according to the bearer context determined newly by the MME 3420. The procedure for the MME 3420 to negotiate with the MCPTT UE 3400 for bearer establishment follows an alternative embodiment of the present invention.

Figure 35:
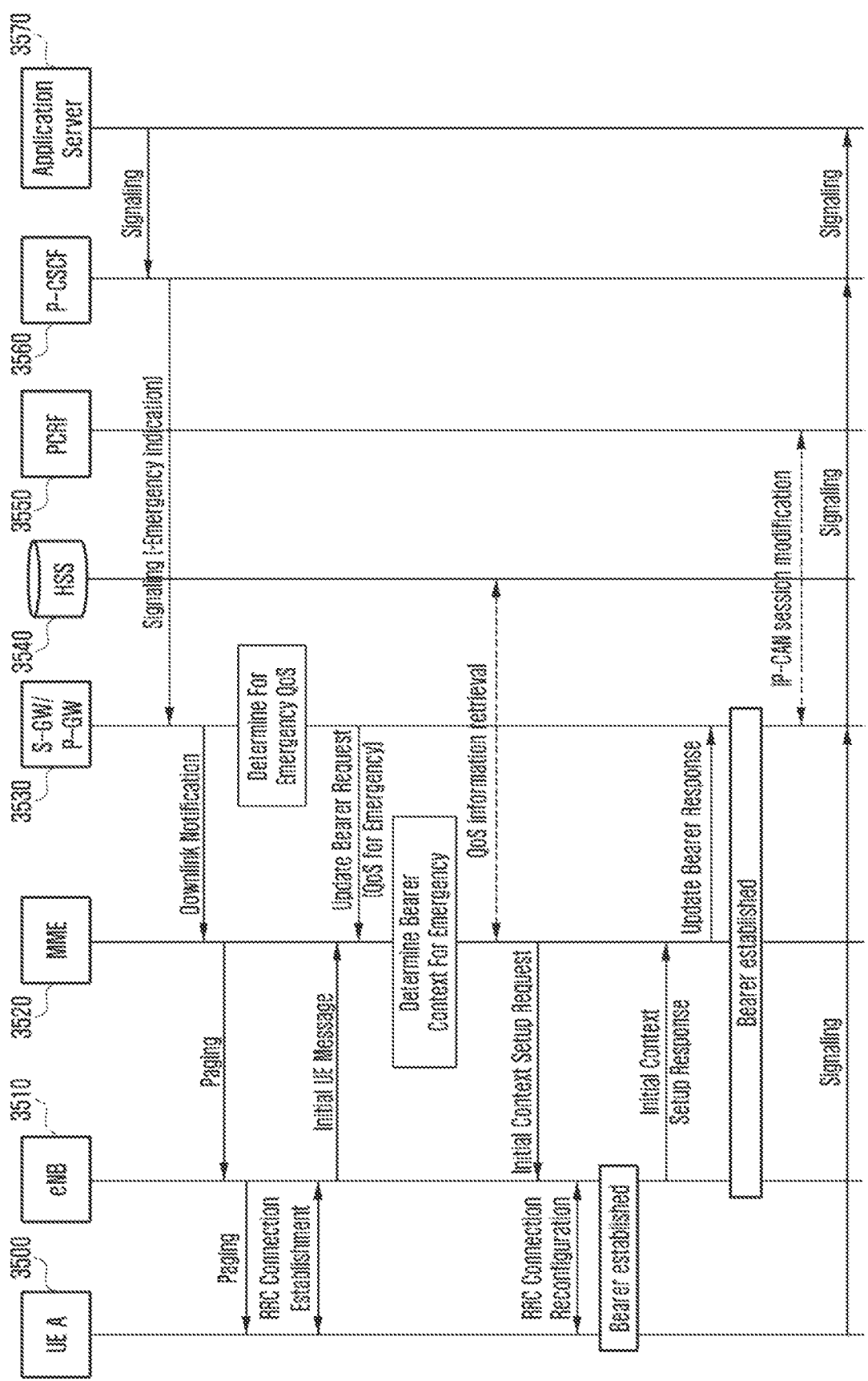
FIG. 35 is a diagram illustrating a method for an MCPTT UE to notify an EPS network of its MCPTT capability in attaching to the EPS network and a method and procedure for establishing a bearer connection by notifying the EPS network of the cause of attaching for use of the MCPTT service according to embodiment 6 of the present invention.

FIG. 35 is a diagram illustrating a method for an MCPTT UE to notify an EPS network of its MCPTT capability in attaching to the EPS network and a method and procedure for establishing a bearer connection by notifying the EPS network of the cause of attaching for use of the MCPTT service according to embodiment 6 of the present invention.

FIG. 35 is a diagram illustrating a method for an MCPTT UE 3500 to notify the EPS network of its MCPTT capability in attaching to the EPS network, a method for notifying the MME 3520 of the cause of attaching for use of the MCPTT service, and a method and procedure for establishing a bearer for the MCPTT service according to an embodiment of the present invention.

Although the term Emergency is used in FIG. 35, it is obvious that the term may be intended to denote public safety services, MCPTT service in a collective meaning, MCPTT Emergency, or a subcategorized MCPTT service. The MCPTT UE 3500 performs the Attach Procedure to connect to the EPS network. The MCPTT UE 3500 may notify the MME 3520 of its MCPTT capability using an Attach Request message as follows.

The MCPTT UE 3500 may use the Type field of the Attach Request message to indicate MCPTT or MCPTT Emergency. The MCPTT UE 3500 may also set an APN field of the Attach Request message to a value indicating MCPTT APN to notify that it wants to access the MCPTT service.

The MCPTT UE 3500 may also set a UE network capability field or a Device Property field of the Attach Request message to a value indicating MCPTT Capability.

The MCPTT UE 3500 may notify the network that it is an MCPTT UE using at least one of the above methods and notify the network that the MCPTT bearer connection should be established according to the result of the Attach procedure using the Type and APN fields of the Attach Request message. The UE supporting both the MCPTT service and normal service may set the UE network capability field to a value indicating Public Safety Capability in order to notify the core network that it is a UE capable of using the MCPTT service (identical with the MCPTT-enabled UE in FIG. 31). If the UE network capability or device property field is set, this may indicate that the corresponding UE supports the MCPTT service. The dedicated-MCPTT UE that supports only the MCPTT service may set the device property field to a value indicating dedicated-MCPTT UE.

If the Attach request message configured as above is received, the MME configures the Secondary Bearer Context to provide the UE with the MCPTT service as described with reference to FIG. 32. The MCPTT UE 3500 sends the eNB 3510 an RRC Connection Setup Complete message including the Attach Request message configured as above during the RRC Connection procedure along with an indicator (RRC Establishment Cause) indicating that the Attach request should be processed with the priority for the MCPTT service. If the RRC Connection Setup Complete message including the indication and Attach Request message is received from the MCPTT UE, the eNB 3510 may process the Attach request from the corresponding UE with a priority in comparison with that from other UEs according to the indication and send the MME 3520 an Initial UE message including the Attach Request message and the indicator indicating that the Attach request should be processed preferentially.

Upon receipt of the Initial UE message, the MME 3520 may process the request with a priority higher than that from other eNBs according to the indicator indicating that the Attach request should be processed with a priority. If the Attach Request message carried in the Initial UE message is received, the MME 3520 may determine the bearer context necessary for the UE 3500 according to the value that the MCPTT UE has set in the Attach Request message.

For example, if the type field of the Attach Request is set to Emergency and the APN field is set to MCPTT APN, the MME 3520 may determine that the UE that has sent the Attach Request message needs an emergency bearer for MCPTT. Likewise, if the type field of the Attach Request message is set to MCPTT Emergency, the MME 3520 may determine that the UE needs a bearer context for MCPTT Emergency. Although the Type field of the Attach Request message is not set, if the UE network capability field or the Device Property field is set to a value indicating the MCPTT capability of the UE, the MME may determine and store the bearer context matching the MCPTT service priority for the situation where the UE uses the MCPTT service.

After determining the bearer context through the above procedure, the MME 3520 may inquire to the HSS 3540 about QoS information and perform an authentication procedure to determine whether the UE 3500 supports the high QoS. The above procedure may be omitted and, in this case, the MME 3520 may use internally stored MME Emergency Configuration data or a value stored in an alternative way.

The MME 3520 sends the S-GW/P-GW 3530 a Create Session Request message for providing the UE 3500 with a bearer connection and, in this case, the Indication Flag, Signaling Priority Indication, or QoS of the Bearer Context of the Create Session Request message is set to a value indicating a high priority in order for the S-GW/P-GW 3530 to process the corresponding request with a priority.

If the message is received, the S-GW/P-GW 3530 may check the Indication flag or Signaling Priority Indication so as to process the request with a priority in comparison with the requests from any other UE or MME 3520 or may check the QoS value contained in the Bearer Context and determine, if the QoS value corresponds to a QCI or ARP with the high priority of Emergency, to process the request preferentially.

The P-GW 3530 may accept the Create Session Request and negotiate with the PCRF 3550 to update the PCC rule. Afterward, the P-GW 3530 sends the MME a Create Session Response message in response to the Create Session Request message, the Create Session Response message including the Secondary Default Bearer information for use by the MCPTT UE 3500 in receiving the MCPTT service or the Default Bearer information for the MCPTT UE 3500 to activate the default bearer.

Upon receipt of the Create Session Response message, the MME 3520 sends the eNB 3510 an Initial Context Setup Request message including Attach Accept message and Bearer Context information, and the eNB 3510 sends the UE an RRC Connection Reconfiguration message including the Attach Accept message and establishes a bearer connection with the UE according to the Bearer context contained in the Initial Context Setup Request message.

If a bearer is established between the UE 3500 and the eNB 3510, the eNB 3510 sends the MME 3520 an Initial Context Setup Response message to notify the MME of the Bearer establishment, and the MME 3520 sends the S-GW/

P-GW 3530 a Modify Bearer Request message to establish a bearer connection between the eNB 3510 and the S-GW/P-GW 3530. The UE 3500 sends the MME 3520 an Attach Accept message to end the Attach procedure.

(Although the public safety service priority notification is made in the order of P-GW 3530→S-GW 3530→MME 3520→eNB 3510 in the above description, it may not be mandatory to start from the P-GW. For example, the MME 3520 may have the information on the public safety capability of the UE and send the relevant information to the eNB 3510 without any dedicated-MCPTT UE identifier transmitted from the P-GW 3530 to the MME 3520 via the S-GW 3530.)

In an embodiment of the present invention, an eNB 3510, MME 3520, S-GW 3530, or P-GW 3530 may internally bind that the bearer is not for public safety According to the result of the procedure of FIG. 35, the eNB 3510, MME 3520, or S-GW/P-GW 3530 may internally bind that the corresponding UE needs a public safety connection or that the bearer of the corresponding UE has the QCI and ARP values for a QoS higher than that of the default bearer or the corresponding bearer is the bearer for the public safety UE.

Accordingly, it is possible to know that the bearer requested by the UE is the public safety bearer based on the bound value. Thus, the eNB 3510 and S-GW/P-GW 3530 my process the data with a priority higher than that of other bearers.

In order to deliver the Extended Service Request message, the UE 3500 establishes an RRC connection with the eNB 3510. The NAS layer of the UE 3500 configures a value of RRC Establishment Cause and sends the value to the RRC layer of the UE 3500 during the RRC connection establishment between the UE 3500 and the eNB 3510.

The RRC Establishment Cause indicates one of Mobile Originated Signaling, Mobile Originated Data, Mobile Terminated Signaling, and Mobile Terminated Data. Afterward, the RRC layer of the UE 3500 generates an RRC message and sends the eNB 3510 the RRC message for a connection request.

The present invention proposes an identifier indicating Public Safety in the RRC Establishment Cause. This may indicate one of Mobile Originated Public Safety Signaling, Mobile Originated Public Safety Data, Mobile Terminated Public Safety Signaling, and Mobile Terminated Dedicated-MCPTT UE data, or indicate Public Safety collectively. Regardless of the name of the identifier, it includes an RRC connection request cause value indicating a public safety service (including MCPTT).

In the case that the RRC establishment cause is configured as above, the UE 3500 may avoid congestion between the UE 3500 and eNB 3510 (overriding congestion control) or Access Class barring between the UE 3500 and eNB 3510 (Application level congestion control for data communication (ACDC)).

The eNB 3510 stores the information indicating that the UE 3500 transmitting the request with a cause value is a public safety UE so as to handle the UE preferentially, when handover is required, in comparison with other UEs. Also, the eNB 3510 may determine the UE 3500 as the UE requesting for the Public Safety (or MCPTT) service based on the received cause so as to allocate it to the Core Network dedicated to public safety (or MCPTT). In the case of following the above function, if the public safety-related identifier is received as the RRC Establishment Cause, the eNB 3510 may request for connection to a public safety-dedicated MME or public safety-preferred MME during the MME selection procedure.

In an alternative embodiment, when the network is congested, the MME 3520 may not apply any back-off timer for the UE 3500 connected to the network for the public safety service, but it may treat the UE specially so as to allow for connection to the network to be maintained always. In the congested network situation, the UE 3500 that requests for normal service may wait for a predetermined time period for connection to the network because of the backoff timer. The UE 3500 that requests for the public safety service may be identified by the MME according to the method proposed by the present invention and, in this case, no backoff timer is applied to the UE even in the congested network situation.

Embodiment 7

The Internet is evolving from the human-centric communication network in which information is generated and consumed by humans to the Internet of things (IoT) in which distributed things or components exchange and process information. The combination of the cloud server-based Big data processing technology and the IoT begets Internet of Everything technology. In order to secure the sensing technology, wired/wireless communication and network infrastructure, service interface technology, and security technology required for implementing the IoT, recent research has focused on sensor network, Machine to Machine (M2M), and Machine Type Communication technologies.

In the IoT environment, it is possible to provide an intelligent Internet Technology (IT) that is capable of collecting and analyzing data generated from the connected things to create new values for human life. The IoT can be applied to various fields such as smart home, smart building, smart city, smart car or connected car, smart grid, health care, smart appliance, and smart medical service, through convergence and integration of Information Technology (IT) technology with various industries.

The IoT technology is spotlighted in various fields, and communication operators and vendors are developing various IoT-based applications and systems. Among the various IoT solutions, the cellular IoT (hereinafter, referred to as CIoT), which operates in a licensed frequency band allocated to a cellular system, is receiving attention. This is because the cellular system is capable of providing more reliable communication service than non-cellular systems. The CIoT is being standardized under various names such as evolved Machine Type Communication (eMTC) and Global System for Mobile Communications Enhanced Data rates for GSM Evolution Radio Access network (GERAN CIoT) and, by nature of the standardization activities, the needs of the communication operator influence the standardization decision making.

The advanced communication technology that makes it possible for all things as well as users to communicate among each other is referred to as Internet of things (IoT). For example, a user may own various types of electronic devices that are connected by means of mobile communication or short range communication technologies and sensors to provide the user with convenient functions with the advantage of efficient control of the devices. Such electronic devices are referred to collectively as IoT devices. Another exemplary IoT service may be implemented in the meter reading service with measurement devices that read for electricity and water and deliver the read values through a network. Other exemplary IoT services may be implemented in such a way of installing IoT devices to monitor public places or remote areas for public safety such that the devices detect occurrence of a specific event and report the progress of the event through a network. Other exemplary IoT services may be implemented in such a way that home electric appliances equipped with a communication function are deployed to report their operation status and thereby the user makes a device trigger to command the electric appliance to perform a specific operation.

An IoT device includes a mobile communication module for supporting cellular communication or a short range communication module for supporting a short range communication technology such as Bluetooth, WLAN (Wi-Fi), ZigBee, and Near Field Communication (NFC).

An LTE UE may operate in an LTE frequency band or an ISM band.

Throughout the specification of the present invention, CIoT denotes an IoT service using a cellular network. The cellular network means a mobile communication network such as 2G network represented by GERAN, 3G network represented by GPRS, and 4G network represented by LTE. The CIoT service means a cellular service for supporting the IoT UEs and may denote a service for transmitting small size data through the cellular network. The CIoT service may include Machine Type Communication (MTC) services. The cellular network is a concept including Core Networks as well as Radio Access Networks.

In the present invention, the data transmitted by a UE is categorized into one of user plane data and control plane data. The user plane data is application-related traffic generated in use of the Internet services or IoT services, and the control plane data is the data carrying control information that is exchanged between network entities for use of the cellular network. The above terms may be replaced by other terms distinguishing the packet carrying data and control signal for providing the communication service in the network.

For CIoT, the legacy network apparatuses may be modified. For example, there may be a dedicated CIoT eNB having the CIoT function in addition to the legacy eNB. In the present invention, for convenience the CIoT eNB is collectively referred to as CIoT RAN in the concept including both the dedicated CIoT eNB and legacy eNB having the CIoT function. The terms used in the present invention are not limitative of the invention, and they may be replaced by the terms having equivalent technical meanings. Likewise, the core network as a part of the cellular network may be configured suitable for the CIoT service. In the present invention, a core network entity for CIoT is referred to as CIoT Core Network (CN) node, and the C-SGN used in the 3GPP is not limitative of the invention and may be replaced by other terms having the equivalent technical meaning. The CIoT CN node may be an entity having the functions of the MME and serving gateway of the legacy LTE system and even the function of the PDN Gateway.

The CIoT CN node may be capable of relaying the data from a UE to an Application server or the data from the Application Server to the UE as well as performing CIoT UE context management, mobility management, and signaling session management. That is, the CIoT CN node may act as a gateway for the CIoT UE so as to route the data from the CIoT RAN to the Application Server. In the case that the CIoT CN node has the PDN Gateway function, it can transmit the user plane data to the Application Server directly.

The CIoT CN node establishes a Control Plane connection with the CIoT UE. In order for the CIoT CN node to establish the Control Plane connection with the CIoT UE, the CIoT UE establishes a Control plan bearer (A.K.A. Signaling Radio Bearer (SRB)) with the CIoT RAN, and the CIoT RAN establishes an S1 bearer connection with the CIoT CN node for communicating the Control plane data. As a consequence, the CIoT UE establishes a Control plane bearer connection with the CIoT CN node. The CIoT UE communicates with the CIoT RAN through the SRB established between the CIoT UE and CIoT RAN, and the CIoT RAN communicates with the CIoT CN node through the SI bearer established through the above procedure. Without limitation to the terms used in the present invention, SRB denotes a bearer connection established in the radio resources for control information signaling of the UE, and S1 bearer denotes the connection for control information signaling between the CIoT RAN and CIoT CN node.

Typically, the UEs, eNBs, and CN entities process the control plane data and user plane data in different priorities. The UEs, eNBs, and CN entities process the control plane data, i.e., the data carrying control information, with a priority higher than the priority of the user plane data. The types of the control plane data include Attach message, Tracking Area Update message, Service Request message, and EPS Session Management (ESM) message for managing the session for the UE. The above messages are exchanged between the UE and the CN entity and called NAS message because they are processed at the NAS layer. The Control Plane data transmitted by the UE is included in the NAS message, which is transmitted from the UE to the eNB in an RRC message. The eNB transmits the NAS message carried in the RRC message to the CN entity (MME or CIoT CN node) through a Control plane connection.

The CIoT UE is characterized by transmitting/receiving small data sporadically (infrequent small data transmission). Accordingly, there is no User Plane connection established between the CIoT UE and CIoT CN node, but the Control Plane connection capable of transmitting User Plane data is established. Thus, it is possible to omit the control information signaling process for user plane connection establishment and user plane encryption thereby improving radio resource and network operation efficiency.

The RRC layers of the UE and eNB use a Signaling Radio Bearer (SRB) to exchange RRC messages. The SRB includes SRB 0, SRB 1, and SRB 2; the UE transmits an RRC message containing the NAS message through the SRB 1 and SRB2. (Current NAS layer operation) The UE and the CN entity (e.g., MME) perform the procedure on the NAS layer. The network may control the UE, manage mobility, and establish a connection through the NAS procedure. The NAS layers of the UE and CN entity exchange NAS messages to perform the NAS procedure. Since the NAS messages contain control information, they are transmitted/received through the control plane.

If the UE transmits user data through the control plane for CIoT service, this may cause problems as follows.

Problems in RRC Layer

Since the NAS message is transmitted through SRB 1 and SRB 2 that are used for transmitting control plane data in the RRC layer, the UE may transmit the user data contained in the NAS message through the SRB that is used to transmit the control plane data. The eNB cannot distinguish among the control data transmitted by the CIoT UE and normal UE and the user data transmitted by the CIoT UE, and it recognizes all the types of data as control data. (Since the data are received through the SRB) The eNB processes the data preferentially as the control plane data. If it is difficult to receive even the control data transmitted by some UEs because of the congestion at the eNB, this may cause a problem of failure in processing the control data transmitted by the CIoT UE or normal UE because of the CIoT UE's user data over the control plane. That is, it may fail to process the NAS message containing the control data transmitted by the CIoT UE or normal UE because of the NAS message containing the user data transmitted by the CIoT UE.

Problems in NAS Layer

The CIoT CN Node does not know whether the NAS message received from the CIoT UE conveys control data or user data before it checks the data by itself. The CIoT CN node maps the control data to GTP-C and the user data to a GTP-U to transmit that data to the PDN gateway. Accordingly, the CIoT CN node checks the NAS message received from the CIoT UE to determine whether the message conveys control data or user data and then transmits the user data to the P-GW through a GTP-U tunnel. If the NAS message received from the CIoT UE conveys control data, the CIoT CN node performs a procedure corresponding thereto or configures a control message to negotiate with the P-GW through the GTP-C interface.

The traffic transmitted by a CIoT UE may be categorized into two types: 1) ACK-dependent traffic and 2) ACK-independent traffic. Since a large number of CIoT UEs connect to the network to perform small data transmission, it is necessary to use the radio resources efficiently. Accordingly, in the case of 1) ACK-dependent traffic, it is necessary to maintain the RRC connection between the CIoT UE and CIoT RAN during a predetermined period and, in the case of 2) ACK-independent traffic, it is possible to transition to the RRC IDLE state after transmitting the data to save radio resources. Although the traffic transmitted by the CIoT UE is almost all small data, there is a use case requiring a relatively large amount of data such as a software update. In this case, since the NAS message is split into several items of user data to be carried in a series of NAS messages, there is no need to maintain the connection between the CIoT UE and CIoT RAN during the predetermined time duration. If it is possible to identify whether the RRC connection in use requires successive message transmission, the UE and CIoT RAN may perform an operation for maintaining the RRC connection during a predetermined time period. In contrast, if it is not necessary to perform successive message transmission, the UE and CIoT RAN enter the RRC IDLE state to release the RRC connection and save radio resources.

Embodiment 7 of the present invention proposes a method for categorizing the CIoT traffic into multiple types and processing predetermined traffic preferentially and a method for differentiating between dedicated CIoT network apparatus and CIoT-enabled normal network apparatus and controlling the dedicated CIoT network apparatus to process more CIoT-related signals.

Embodiment 7 of the present invention is directed to UE and network entity operations for supporting IoT in a cellular network. The CIoT is characterized in that a plurality of UEs may connect to the network simultaneously and the network may transmit data to the plurality of UEs simultaneously. Accordingly, it is predicted that the network congestion is more significant than with the normal cellular system.

Although embodiment 7 of the present invention is directed to the 3GPP LTE system, the subject of the present invention may be applied to all the types of radio communication systems such as WLAN and Bluetooth. The present invention proposes a method and apparatus for exchanging information on the Relay between the core network and eNB for supporting the UE to Network delay function as one of ProSe functions for public safety service and a method and apparatus for the eNB to control the UE for supporting the Relay function.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the descriptions of the embodiments of the present invention are directed to the radio access network (RAN), LTE, and evolved packet core (EPC) as a core network of the 3rd Generation Partnership Project (3GPP) standard, it will be understood by those skilled in the art that the present invention can be applied to other communication systems having the similar technical background and channel format, with a slight modification, without departing from the spirit and scope of the present invention. The terms intended to mean control information, user data to be transmitted to the Application Server, signaling for exchanging control information between network entities, and components of the entities are just examples used for convenience of explanation. The terms used in the following description are not limitative of the invention and may be replaced by the terms having equivalent technical meanings.

For convenience of explanation, some of the terms and definitions given in the 3GPP LTE standard may be used. However, the present invention is not limited by the terms and definitions and may be applied to other systems following different standards. In the following description, the terms "LTE UE" and "IoT UE" are used to denote a mobile terminal supporting radio communication such as a Personal Digital Assistant (PDA), a smartphone, a mobile phone, a tablet computer, and a laptop computer; a measurement device for metering water, electricity, and temperature; an alert device for sensing and reporting a situation such as fire and earthquake; and an electric appliance equipped with a communication function such as air conditioner, a refrigerator, an air cleaner, a boiler, and a cleaner. In addition to the aforementioned devices, all the types of things equipped with communication functions are referred to as IoT UEs. Among the IoT UEs, a UE that uses a cellular network is referred to as a CIoT UE. In the present invention, the device, function, and operation for the CIoT service includes the device, function, and operation for small data transmission in an LTE network. The IoT data may denote the data transmitted by an IoT UE or small size data transmitted by a certain type of UE.

Figure 36:
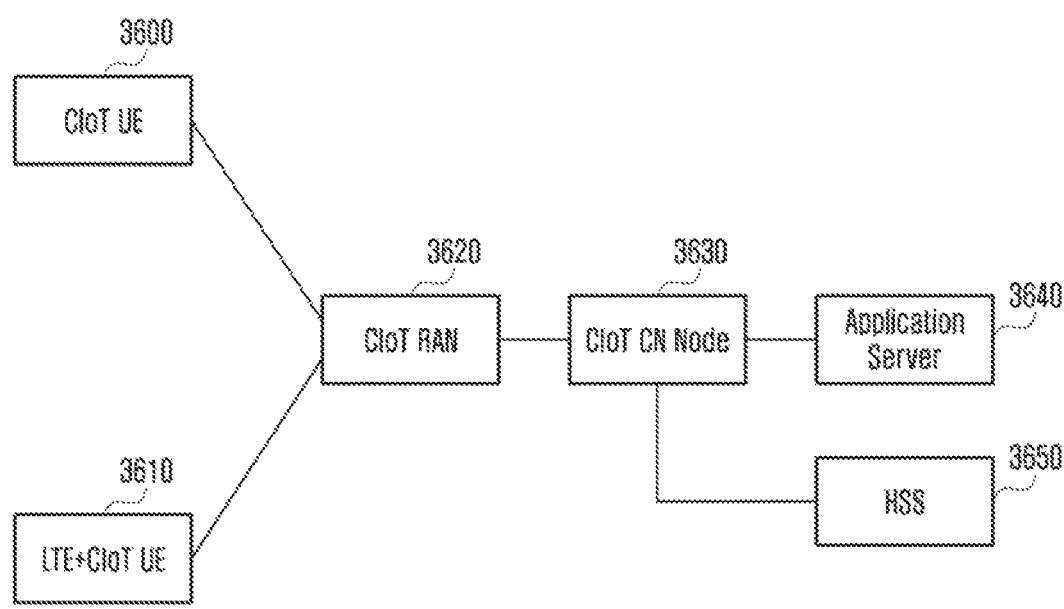
FIG. 36 is a diagram illustrating network architecture for supporting CIoT services according to embodiment 7 of the present invention.

FIG. 36 is a diagram illustrating network architecture for supporting CIoT services according to embodiment 7 of the present invention.

FIG. 36 is a diagram illustrating network architecture for CIoT. The network may include a dedicated CIoT eNB for supporting the CIoT service and a CIoT-enabled eNB implemented by adding the CIoT function to a legacy eNB.

In the present invention, the dedicated CIoT eNB and the CIoT-enabled eNB are collectively referred to as CIoT RAN 3620 for convenience of explanation. Likewise, the core network existing in a cellular network may be implemented as a dedicated CIoT Core Network. In the present invention, a core network entity for CIoT is referred to as CIoT Core Network (CN) node, and the C-SGN used in the 3GPP is not limitative of the invention and may be replaced by other terms having the equivalent technical meaning The CIoT CN node 3630 may be capable of relaying the data from a UE to an Application Server 3640 or the data from the Application Server 3640 to the UE as well as performing CIoT UE context management, mobility management, and signaling session management. That is, the CIoT CN node 3630 may act as a gateway for the CIoT UE 3600 so as to route the data from the CIoT RAN to the Application Server 3640.

In this case, the CIoT CN node 3630 may establish a control plane connection with the CIoT UE 3600 without any user plane connection to transmit the CIoT data or small size data on the control plane.

The CIoT traffic has characteristics of low data rate, small size, delay-tolerance, periodicity/aperiodicity (event-triggered), and response-dependency/independency. In more detail, the data traffic related to an event-triggered report such as smoke alert, breakdown alert, power shortage alert, and temperature alert may be transmitted in uplink in the form of small size data without requiring any response and may occur in an event-triggered manner Such traffic may occur during the public safety-related IoT service so as to have a priority higher than that of other data traffic. In the case of periodic-reporting traffic such as gas consumption measurement report, water consumption measurement report, and electricity consumption measurement report, small size data are transmitted in uplink periodically every minute/hour/day/month/year, and there may be a response to the measurement report result. In the case of the data traffic triggering a specific operation such as power-on/off of the UE, small sized data are transmitted in uplink periodically and aperiodically, and there may be a response about the operation execution result in downlink.

In this case, since the CIoT UE 3600 has to make a command or execute a received command, if the data is not delivered in a predetermined time limit, this may cause device trigger delay and degrade IoT service quality; therefore, it is necessary to process this type of data preferentially in comparison with other types of data traffic. In the case of data traffic for software/firmware update and configuration value update of the IoT UE, the data may be relatively large in both the uplink and downlink and occur relatively sporadically. Such data traffic may relate to a security information update and configuration update of an IoT apparatus added to the IoT proximity network.

Embodiment 7-1: Solutions in RRC Layer

Figure 37:
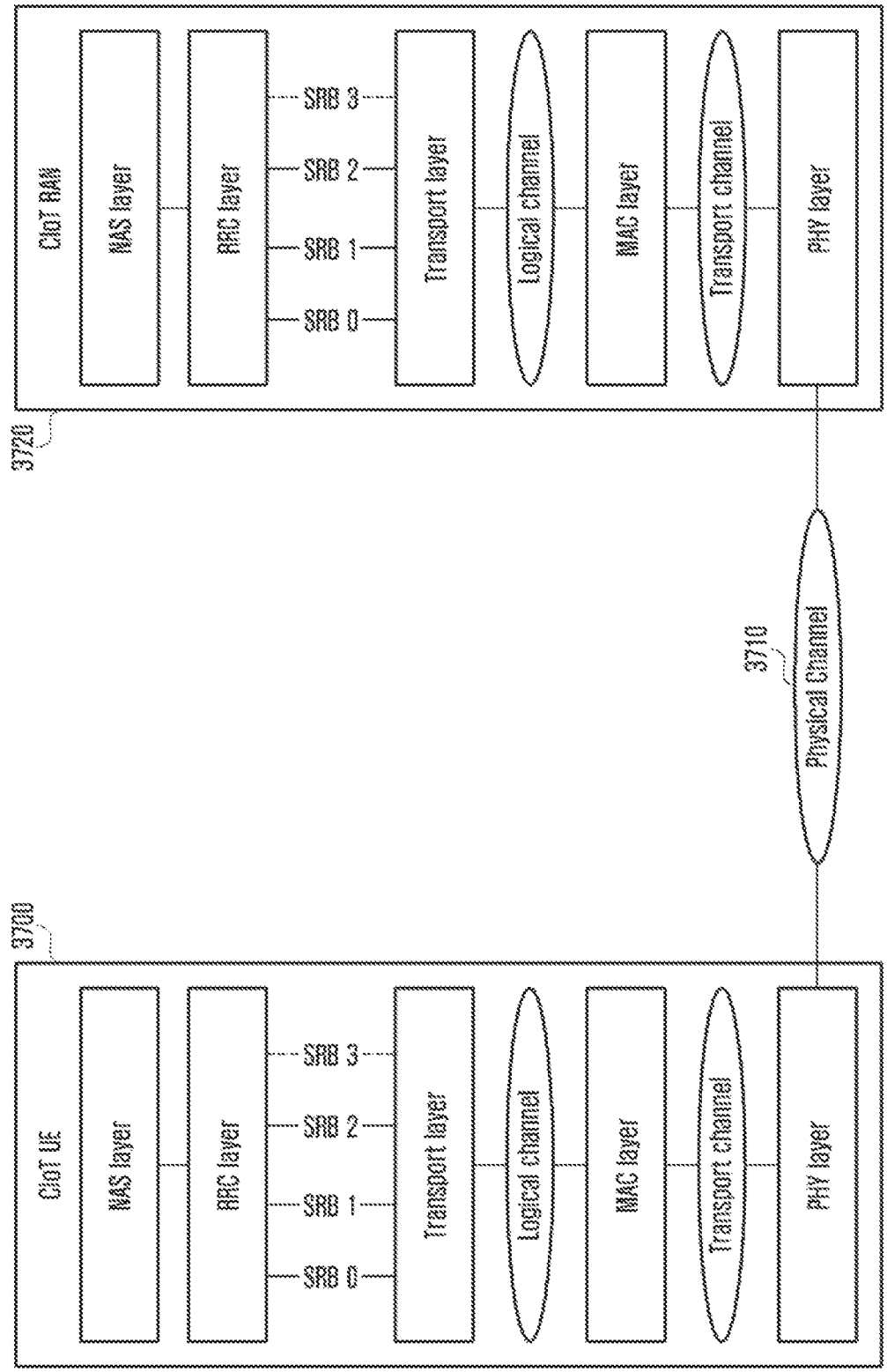
FIG. 37 is a diagram illustrating control plane data exchange between a CIoT UE and a CIoT RAN and layer-specific internal operations according to embodiment 7-1 of the present invention.

FIG. 37 is a diagram illustrating control plane data exchange between a CIoT UE and a CIoT RAN and layer-specific internal operations according to embodiment 7-1 of the present invention. In FIG. 37, a part related to the proposal of embodiment 701 is a procedure in which the NAS layer transfers an indicator indicating the CIoT RRC establishment cause and call type, when requesting for establishment of a NAS signaling connection, and the RRC layer performs access control on the CIoT call type or selects an SRB corresponding to the RRC establishment cause (regardless of whether the access control for CIoT call type has been performed or not) to transmit the RRC message on the SRB.

In the legacy LTE operation, the NAS layer (also known as an EMM layer) sends a request for RRC connection (referred to as NAS signaling connection) to the RRC layer for transmitting an NAS message. At this time, the NAS layer notifies the RRC layer of the RRC establishment cause and call type. The RRC establishment cause indicates the reason for the RRC connection request. The call type indicates the type of the connection request for access control at the RRC layer. The RRC layer determines the bearer to use, i.e., SRB or DRB, and a logical channel to use based on the RRC establishment cause and determines the access control to use based on the call type. The access control is a function for controlling congestion in the radio resources.

If it is necessary to transmit CIoT user data in the IDLE state, the CIoT UE 3700 requests for an RRC connection to the RRC layer. Since the CIoT UE 3700 according to the present invention uses an NAS message to transmit the CIoT user data, the NAS layer requests to the RRC layer for an RRC connection.

The NAS layer sends the RRC layer the NAS message including the RRC connection establishment cause and call type through an NAS procedure. The present invention defines new RRC connection establishment cause and call type for CIoT and proposes an RRC operation using newly defined RRC connection establishment cause and call type. The present invention also proposes an RRC operation for notifying the RRC layer of a new RRC Connection Establishment cause along with the legacy call type. The following description is directed to a procedure for the RRC layer to check that the RRC connection is requested for CIoT user data and to determine to perform access control according to the call type.

1. A new RRC establishment cause indicating CIoT Mobile Originated (MO) Data or CIoT Mobile Terminated (MT) data is defined for use when the NAS layer requests to the RRC layer for an NAS signaling connection to transmit CIoT user data. The phrase "Mobile Originated" suggests that the CIoT UE has data to transmit to the network, and the phrase "Mobile Terminated" suggests that the CIoT UE 3700 has data to receive from the network. The term "CIoT data" suggests small data. The CIoT data may include, but is not limited thereto, MO small data, MT small data, MO CIoT data, MT CIoT data, and RRC establishment cause values related to user data used for CIoT (in the present invention, the terms "MO CIoT Data" and "MT CIoT data" are used for convenience of purpose). The RRC establishment cause may be contained in the RRC message in the form of a parameter. If the RRC establishment cause is received from the NAS layer, the RRC layer determines that the RRC connection request is made for CIoT data. The RRC layer operation following the RRC establishment cause determination is dealt with in another part of the present invention.

The NAS layer notifies the RRC layer of the call type along with the RRC establishment cause. (Description about the meaning of legacy call types) The call type indicates one of Originating signaling (connection request for transmitting control plane data), Originating Call (connection request for transmitting user plane data), Terminating call (connection request for receiving user plane data), and emergency call (connection request for emergency service).

The present invention defines call types for connection requests for transmitting and receiving CIoT user data newly. That is, the call types called Originating CIoT data and terminating CIoT data are defined. The Call type of Originating CIoT data is the call type that suggests the connection request is for transmitting CIoT User data.

The Terminating CIoT data is the call type that suggests the connection request for transmitting CIoT user data. These types of calls may be called Originating CIoT call and Terminating CIoT call respectively. The new call types are not limited to the above terms and may be called differently, if possible, to suggest the RRC connection request for transmitting and receiving CIoT data or small data. The NAS layer notifies the RRC layer of the RRC Establishment Cause for the above described CIoT user data transmission and call type that suggests the CIoT connection. If the NAS layer sends the RRC layer the call type, the RRC layer may perform the access control matching the call type, and the description thereof is dealt with in another part of the present invention.

2. The RRC establishment cause of section 1 is redefined, and the previously defined Call type is used. For example, the RRC Establishment Causes called MO CIoT Data and MT CIoT Data are used along with the Call type of Originating Call and Terminating Call. On the basis of the received indicator, the RRC layer may determine that the RRC connection request is made for CIoT data. The related RRC layer operation is dealt with in another part of the present invention. The RRC layer uses the access control according to the received call type as specified for the legacy system.

3. The RRC establishment cause previously defined in section 1 is used, and the Call type is redefined for CIoT. For example, the RRC Establishment Cause may be set to MO data or MT data. The call types defined in section 1 are used. The RRC layer performs the access control matching the call type. Although the RRC layer uses the RRC Establishment Causes of legacy MO data and MT data, the RRC layer may determine that the RRC connection request is made for transmitting CIoT user data based on the call type set to CIoT.

Depending on operation, the RRC layer may determine that the RRC connection request from the NAS layer is made for CIoT user data. The CIoT user data is contained in the NAS message, and the NAS layer sends the RRC layer the NAS message associated with the indication along with the RRC establishment cause and call type. The RRC layer may determine that the NAS message contains the CIoT user data on the basis of the proposed RRC Establishment cause and Call type. The RRC layer generates an RRC message including the NAS message. That is, the RRC message includes the NAS message that contains the CIoT user data.

In the legacy operation, the RRC layer uses a Signaling Radio Bearer (SRB) for transmitting the NAS message. The SRB includes SRB 0, SRB 1, and SRB 2. The NAS message is transmitted on SRB 1 or SRB 2. In the case of establishing the RRC connection according to the EMM procedure (Attach, Tracking Area Update, and Service Request) of the NAS layer, the NAS message for the corresponding procedure is piggybacked on the RRC message transmitted through the SRB 1. Alternatively, the NAS message may be transmitted through the SRB 2.

In a detailed embodiment, the NAS layer may piggyback the NAS message containing the CIoT user data caused by the EMM procedure on an RRC control message. For example, it may be possible to transmit the RRC control message including the Service Request message (NAS) message) containing the CIoT User data. (An initial NAS message may be piggybacked on a legacy RRC message. The present invention is directed to the case of processing the initial NAS message containing the CIoT user data). In this case, the NAS layer may notify the RRC layer that the corresponding service request message contains the CIoT User Data using the RRC establishment cause or Call type. Upon determination of this, the RRC layer determines to transmit the NAS message piggybacked on the RRC message through SRB 2 rather than SRB 1 because the NAS message contains CIoT user data. The SRB 2 has a priority lower than that of the SRB 1. Accordingly, the legacy control data transmitted through the SRB 1 may have a priority higher that the user data transmitted by the CIoT UE. In the case of not following the proposal of the present invention, the user data transmitted by the CIoT UE is contained in an NAS message and piggybacked on an RRC control message so as to be transmitted through the SRB 1. This means that the control data transmitted by other UEs and the CIoT user data are handled as signals having the same priority; thus, the present invention is proposed to distinguish between the two different types of signals.

In an alternative example, it may be possible to determine to transmit a NAS message piggybacked on an RRC message through the SRB 2.

In an alternative example, the RRC layer may transmit the RRC message including the RRC message containing the CIoT user data through the SRB 2 along with the RRC establishment cause or call type to distinguish the NAS message from other NAS messages containing control data. That is, it may be possible to determine that the NAS message containing the CIoT User Data has a priority lower than that of other NAS messages based on the indication and transmit the CIoT user data through the SRP 2 with the corresponding priority.

In another alternative example, the RRC layer may transmit the NAS message containing the CIoT user data through an SRB 3 that is defined to have the lowest priority. The SRB 3 may be an SRB defined newly to have the lowest priority and may denote a radio bearer for transmitting CIoT data or small size data.

In another alternative example, the RRC layer may not apply AS security to the RRC message carrying the NAS message related to the RRC establishment cause or call type. The legacy operation is performed in such a way of activating Access Stratum (AS) security between the UE and eNB and then always applying the AS security to the SRB 1 and SRB 2. If the AS security is applied, this means that integrity protection and encryption are applied to the RRC message. Since the CIoT UE, according to the present invention, transmits the CIoT user data in an NAS message to which NAS security is applied, it may be possible to skip applying AS security; thus, the RRC layer checks this to determine that the AS security has already been activated and that AS security need not be applied, even though the NAS message is transmitted through the SRB 1 or SRB 2.

In another embodiment of the present invention, the RRC layer may apply the Access Control to the RRC connection request for CIoT user data transmission. In the original operation, the RRC layer of the UE receives the information on the Access control based on the SIB information broadcast by the eNB. The Access Control information may be contained in ac-BarringInfo field of the SIB, which is set to ac-BarringForMO-Data or ac-BarringFor-MO-Signalling. This information is formatted as ac-BarringConfig and defined as follows (TS 36.331):

ac-BarringFactor

If the random number drawn by the UE is lower than this value, access is allowed. Otherwise the access is barred. The values are interpreted in the range [0,1): p00=0, p05=0.05, p10=0.10, . . . , p95=0.95. Values other than p00 can only be set if all bits of the corresponding ac-BarringForSpecialAC are set to 0.

According to the present invention, since the CIoT user data is carried in a NAS message, the legacy RRC layer may recognize this as MO signaling and thus apply the ac- BarringForMO-signaling. Typically, because the barring factor for signaling is configured to access with a probability higher than that of the barring factor for data, the barring factor for signaling may be applied to even the case of transmitting the CIoT user data. The present invention proposes the following operation to overcome the above problem. The RRC layer checks the call type in the RRC connection request transmitted by the NAS layer. If the call type indicates CIoT data transmission, the barring factor for ac-BarringForMO-data is applied, even though the NAS message is transmitted through the corresponding RRC connection. If the RRC establishment cause indicates CIoT user data, but nevertheless the call type indicates MO signaling, the RRC layer may apply Ac-BarringForMO-data to the corresponding request. The SIB broadcast by the eNB may include ac-barring information for CIoT. For example, the ac-barring information may be set to ac-BarringForCIoT or ac-BarringForCIoT-data/ac-B arringForCIoT-signaling. It may be possible to apply a single barring factor to all CIoT-related transmissions or to apply different barring factors to the CIoT data and CIoT signaling. If an SIB is received, the UE may perform Access Control for CIoT depending on the ac-barring information for CIoT that is included in the SIB.

Figure 38:
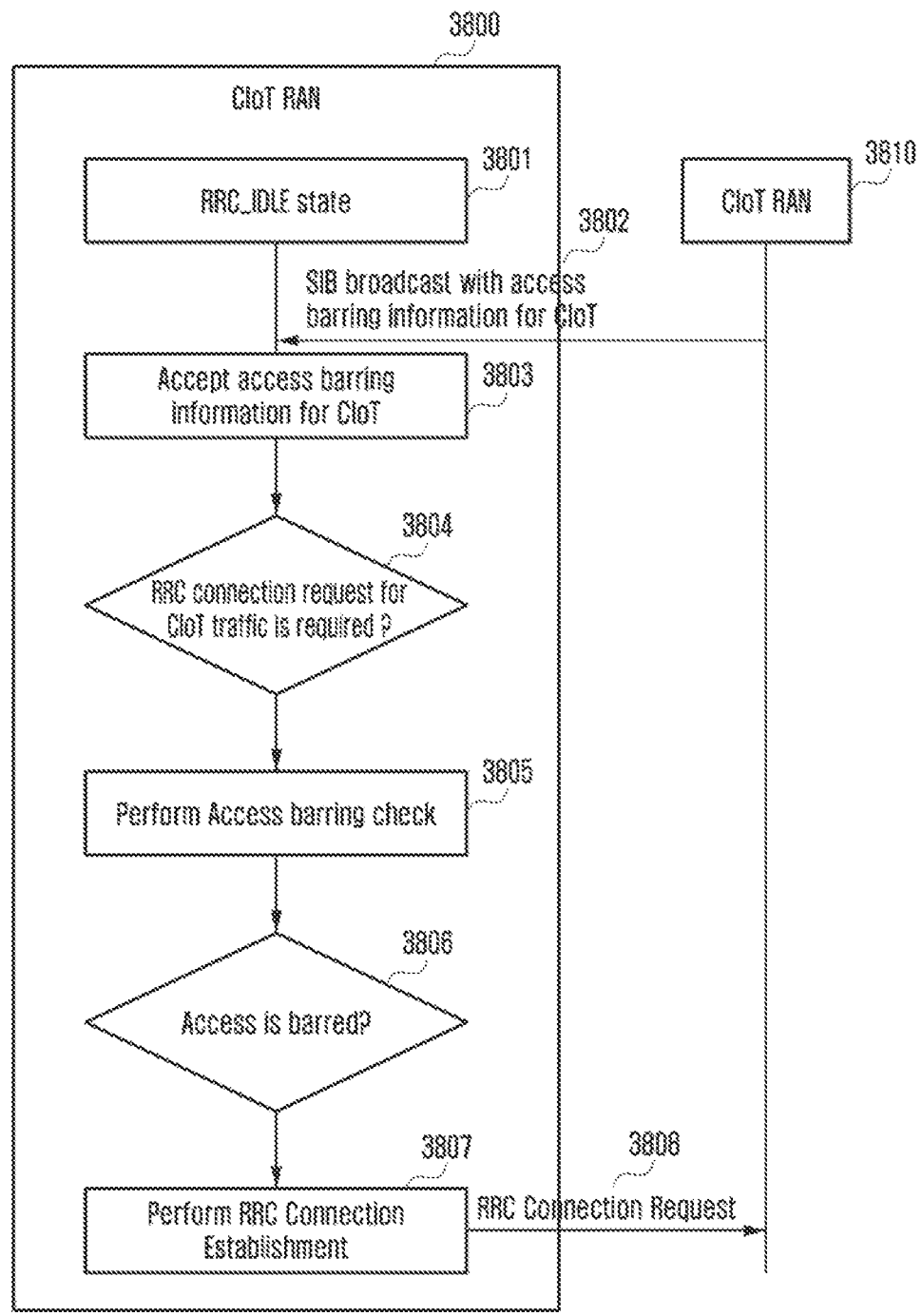
FIG. 38 is a diagram illustrating a procedure for transmitting an RRC connection request message between a CIoT UE and a CIoT RAN according to embodiment 7-1 of the present invention.

FIG. 38 is a diagram illustrating a procedure for transmitting an RRC connection request message between a CIoT UE and a CIoT RAN according to embodiment 7-1 of the present invention.

If the CIoT UE 3800 is in the RRC IDLE state at step 3801, the CIoT RAN 3810 performs SIB broadcast to the CIoT UE 3800 along with access barring information for CIoT at step 3802.

If the CIoT UE 3800 accepts the access barring information for CIoT at step 3803, it may determine at step 3804 whether an RRC connection request for CIoT is made.

If it is determined that the RRC connection request for CIoT is made, the CIoT UE 3800 performs an access barring check at step 3805. The CIoT UE 3800 determines at step 3806 whether its access is barred and, if so, performs RRC Connection Establishment at step 3807. Next, the CIoT UE 3800 sends the CIoT RAN 3810 an RRC Connection Request at step 3808.

Embodiment 7-2: Solutions in NAS Layer

The CIoT CN node has to be capable of transmitting the CIoT user data received on the control plane to the P-GW through a user plane interface called GTP-U. Although the NAS message is transmitted on the control plane, the CIoT user data is carried in the NAS message according to the present invention; thus, it is necessary to distinguish the NAS message containing CIoT user data from the other NAS messages to transmit it to the P-GW through the GTP-U. The present invention proposes a method for distinguishing between these NAS messages.

Figure 39:
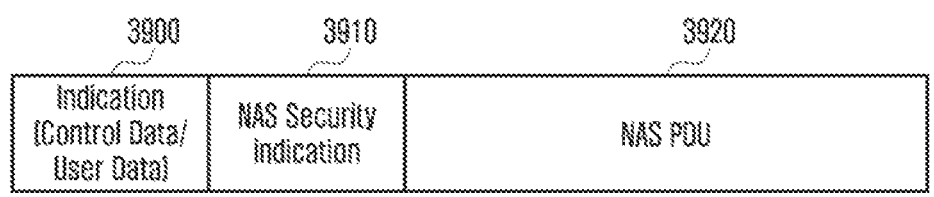
FIG. 39 is a diagram illustrating an exemplary NAS message according to embodiment 7-2 of the present invention.

FIG. 39 is a diagram illustrating an exemplary NAS message according to embodiment 7-2 of the present invention.

1. An NAS PDU for CIoT or small data transmission is configured such that the header of the NAS PDU 3920 includes indication 3900. This indication 3900 indicates whether the corresponding NAS PDU 3920 contains Control Data or User Data. This indication may be configured to indicate one of control data and user data or to indicate small data transmission. That is, the indication 3900 is not limited to any form or name, but it is configured as an identifier for use by the CIoT CN node to distinguish between the control data and user data.

The header of the proposed NAS PDU 3920 may include the NAS security indication 3910 as shown in FIG. 39. Since the NAS PDU 3902 is integrity-protected with NAS security material and encrypted, a key index value for indicating the key used for the integrity protection/encryption may be included. It may be possible to provide information of the algorithm (EIA: Integrity Algorithm; EEA: Encryption Algorithm) used along with the key index.

2. The CIoT RAN uses the indication indicating that the Initial UE message transmitted to the CIoT CN node contains CIoT user data. The CIoT RAN also uses the indication indicating that the Uplink NAS Transport message transmitted to the CIoT CN node contains CIoT user data. These messages are exchanged through an interface between the CIoT RAN and CIoT CN node. The CIoT RAN uses the Initial UE message or Uplink NAS Transport message to transmit the NAS message from the UE to the CIoT CN node.

In the case of using the Initial UE message, the RRC Establishment Cause included in the Initial UE message is set to a value indicating that the CIoT user data is contained. On the basis of this message, the CIoT CN node may determine that the NAS message conveys the CIoT user data.

In the case of using the Uplink NAS Transport message, a newly defined message type is used to indicate the CIoT user data. The messages exchanged through the interface between the CIoT RAN and CIoT CN node has a field called Message type, and an information element of this field that is called Type of Message is set to a value indicating a newly defined type of message for transmitting the CIoT user data.

3. The message being exchanged between the CIoT RAN and CIoT CN node has a field called Message type, and an information element of this field that is called Type of Message is set to a value indicating a newly defined type of message containing the CIoT user data transmitted through the interface between the CIoT RAN and CIoT CN node.

If it is determined that the NAS message transmitted by the CIoT UE contains control data as a result of the operations of sections 1, 2, and 3, the CIoT CN node sends the NAS message to the P-GW through the GTP-C and, otherwise, if it is determined that the NAS message contains user data, the CIoT CN node sends the NAS message to the P-GW via the S-GW (legacy MME is implemented to operate in this way).

In an alternative embodiment of the present invention, the traffic transmitted by a CIoT UE is categorized into two types. The first type of traffic requires ACK corresponding to the data transmitted by the UE, and the second type of traffic does not require any ACK corresponding to the data transmitted by the UE.

1. In the case that the CIoT UE transmits data that requires ACK, the CIoT UE and CIoT RAN maintain the RRC connection during a predetermined period for receiving the ACK. If the RRC connection is broken before receiving the ACK, RRC signaling occurs to reestablish the RRC connection; thus, in order to avoid any unnecessary process, it is preferable to maintain the RRC connection established with the CIoT UE that has transmitted the data requiring ACK during a predetermined time period.

2. In the case that the CIoT UE transmits data that requires no ACK, the CIoT UE and the CIoT RAN can release the RRC connection immediately. Since infrequent small data transmission is assumed, it is preferable for the CIoT UE to release the RRC connection immediately after transmitting the data requiring an ACK to save radio resources.

As solutions for the above two cases, methods are proposed as follows.

First, the data type is identified based on the RRC establishment cause. That is, the RRC establishment cause may be set to a value indicating CIoT Data with ACK or CIoT Data without ACK to provide information on whether the corresponding RRC connection request is made for the data requiring ACK or the data requiring no ACK. However, the data is not limited to the term "CIoT" and may be called as any other name such as small data transmission with/without ACK and may also include the meaning for the RRC connection request for small data transmission.

Second, the data type is identified based on the RRC mode. That is, the CIoT UE requests to the CIoT RAN for an RRC connection with a distinguished RRC mode. There may be two modes: one is a mode for maintaining the connection during a predetermined period, the other is a mode for transitioning to the IDLE state immediately. The two modes may be called by different names. For example, the mode for maintaining the connection during a predetermined period may be called a default mode or normal mode, or the mode for releasing the RRC connection (transitioning to the RRC IDLE state) immediately may be called as a default mode or normal mode. The modes proposed in the present invention include all of the modes for maintaining the connection during a predetermined period and the mode for transitioning to the IDLE state immediately.

Third, an indication may be added to the NAS PDU. This aims to allow the CIoT CN Node to know the RRC connection maintenance/release operation.

FIG. 40 is a diagram illustrating another exemplary NAS message according to embodiment 7-2 of the present invention.

In reference to FIG. 40, the indication (Control Data/User Data) 4000 and the NAS Security indication 4010 follow another example of the present invention. In this example, an acknowledge indication 4030 is added to the NAS PDU 4020 such that the CIoT CN node may determine whether it is necessary to transmit ACK to the CIoT UE depending on the acknowledgement indication.

If it is necessary to transmit ACK, a signal may be transmitted to the CIoT RAN to maintain the RRC connection. If it is not necessary to transmit ACK, a signal may be transmitted to the CIoT RAN to release the RRC connection. The signal may include an identifier for identifying the CIoT UE, e.g., IMSI.

Although the CIoT UE basically operates to transmit small data infrequently, it may occur that the small data is transmitted successively to report software update or continuous data reporting. It may occur that a large amount of data for software update is transmitted or received through several NAS messages or several different items of CIoT User Data are transmitted or received through different NAS messages. The CIoT RAN or CIoT CN node may detect the presence of the continuous uplink or downlink traffic and control to maintain the radio resources during a predetermined period or release the radio resources for saving available radio resources.

The first solution is to use an RRC mode indication. The RRC mode indication may be set to connection maintenance or connection release. This method is identical with those proposed in other embodiments of the present invention. In the case of being used after entering the mode for maintaining the RRC connection, however, the UE may request to the CIoT RAN for a RRC release request using an RRC message (currently, the eNB operates so as to command the UE to release the connection). The CIoT RAN may release the RRC connection.

In the case of using the normal RRC connection method, i.e., if the eNB determines whether to maintain the RRC connection using an RRC inactivity timer, the CIoT UE may send the CIoT RAN an RRC connection release request (currently, the eNB operates so as to command the UE to release the connection). The RRC Connection release request message from the CIoT UE includes a cause value indicating the cause of release, and the cause value may indicate completion of all transmissions. If this message is received, the CIoT RAN may send the UE an RRC Connection Release message to release the RRC connection.

Figure 41:
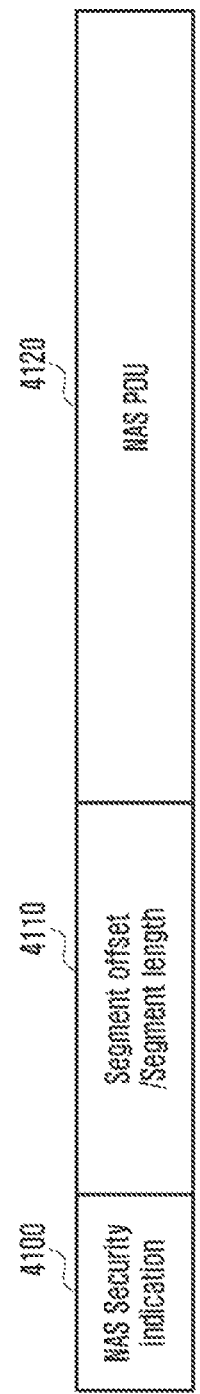
FIG. 41 is a diagram illustrating a method for segmenting large data and then informing of a segmentation offset of the current NAS PDU in association with the total segmentation length.

FIGS. 41 and 42 are diagrams illustrating other exemplary NAS messages having a header to which an indication is added to notify the CIoT CN node that continuous data transmission is performed. The message may be configured as follows.

The method of FIG. 41 segments large data and then provides information of the segmentation offset of the current NAS PDU in comparison with the total segmentation length 4110. For example, if the data is a large size data segmented into 100 segments, information is provided that the 58$^{th}$ segment is the segment offset of 58.

The method of FIG. 42 is to use an indication 4210 indicating whether the current NAS PDU is the last one of the successively transmitted NAS PDUs. For example, if the indication 4210 is set to true, i.e., if the current NAS PDU is the last NAS PDU, the CIoT CN node assumes no more PDU transmission and commands the CIoT RAN to release the RRC connection or the user plane connection for the CIoT UE (e.g., GTP UE connection with the P-GW and tunneling connection with the Application server) to save available resources. If the indication is set to false, i.e., if the current NAS PDU is not the last NAS PDU, the CIoT CN node assumes further PDU transmission and commands the CIoT RAN to maintain the RRC connection or user plane connection for the CIoT UE (e.g., GTP UE connection with the P-GW and tunneling connection with the Application server).

The NAS security indication of the first and second examples is identical with that described in another part of the present invention.

What is claimed is:

1. An operation method by a relay user equipment (UE) in a mobile communication system, the method comprising:
   transmitting, to a network node connected to the relay UE, a remote UE report message including remote UE information about a remote UE connected to a network via the relay UE or disconnected from the relay UE, wherein the remote UE information includes Internet protocol (IP) address information allocated to the remote UE;
   starting a timer upon transmitting the remote UE report message to the network node;
   receiving, from the network node, a response message in reply to the remote UE report message; and
   stopping the timer upon receipt of the response message from the network node,
   wherein the IP address information includes an IP address and port information of the remote UE in case that IP version 4 (IPv4) is used as an address type.

2. The method of claim 1, wherein the remote UE information comprises user information associated with the remote UE.

3. The method of claim 2, wherein the IP address information further includes an IP address or IPv6 prefix of the remote UE in case that IP version 6 (IPv6) is used as the address type.

4. The method of claim 2, wherein the user information comprises at least one of International Mobile Subscriber Identity (IMSI), mobile subscriber integrated services digital network number (MSISDN), a session initiation protocol (SIP) uniform resource identifier (URI), user information for proximity-based service (ProSe), and Subscription Permanent Identifier (SUPI), Generic Public Subscription Identifier (GPSI).

5. The method of claim 1, wherein the remote UE report message is a control message for a packet data network (PDN) connection in order for the relay UE to use the remote UE as a relay.

6. An operation method by a network node in a mobile communication system, the method comprising:
receiving, from a relay user equipment (UE), a remote UE report message including remote UE information about a remote UE connected to a network via the relay UE or disconnected from the relay UE, wherein the remote UE information includes Internet protocol (IP) address information allocated to the remote UE; and
transmitting, to the relay UE, a response message in reply to the remote UE report message,
wherein the IP address information includes an IP address and port information of the remote UE in case that IP version 4 (IPv4) is used as an address type.

7. The method of claim 6, wherein the remote UE information comprises user information associated with the remote UE.

8. The method of claim 7, wherein the IP address information includes an IP address or IPv6 prefix of the remote UE in case that IP version 6 (IPv6) is used as the address type.

9. The method of claim 7, wherein the user information comprises at least one of International Mobile Subscriber Identity (IMSI), mobile subscriber integrated services digital network number (MSISDN), a session initiation protocol (SIP) uniform resource identifier (URI), user information for proximity-based service (ProSe), and Subscription Permanent Identifier (SUPI), Generic Public Subscription Identifier (GPSI).

10. The method of claim 6, wherein the remote UE report message is a control message for a packet data network (PDN) connection in order for the relay UE to use the remote UE as a relay.

11. A relay user equipment (UE) operating in a mobile, communication system, the relay UE comprising:
a transceiver; and
a controller coupled with the transceiver and configured to control to:
transmit, to a network node connected to the relay UE, a remote UE report message including remote UE information about a remote UE connected to a network via the relay UE or disconnected from the relay UE, wherein the remote UE information includes Internet protocol (IP) address information allocated to the remote UE,
start a timer upon transmitting the remote UE report message to the network node,
receive, from the network function, a response message from the network node in reply to the remote UE report message, and
stop the timer upon receipt of the response message from the network node,
wherein the IP address information includes an IP address and port information of the remote UE in case that IP version 4 (IPv4) is used as an address type.

12. The relay UE of claim 11, wherein the remote UE report message is a control message for a packet data network (PDN) connection in order for the relay UE to use the remote UE as a relay, and the remote UE information comprises Internet protocol (IP) address information allocated to the remote UE and user information associated with the remote UE.

13. A network node operating in a mobile communication system, the network node comprising:
a transceiver; and
a controller coupled with the transceiver and configured to control to:
receive, from a relay user equipment (UE), a remote UE report message including remote UE information about a remote UE connected to a network via the relay UE or disconnected from the relay UE, wherein the remote UE information includes Internet protocol (IP) address information allocated to the remote UE, and
transmit, to the relay UE, a response message in reply to the remote UE report message,
wherein the IP address information includes an IP address and port information of the remote UE in case that IP version 4 (IPv4) is used as an address type.

* * * * *